(12) United States Patent
Asano et al.

(10) Patent No.: US 7,203,968 B2
(45) Date of Patent: Apr. 10, 2007

(54) METHOD AND APPARATUS FOR SELECTIVELY EXECUTING INFORMATION RECORDING USING A COGNIZANT MODE AND A NON-COGNIZANT MODE

(75) Inventors: Tomoyuki Asano, Kanagawa (JP); Yoshitomo Osawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 861 days.

(21) Appl. No.: 09/947,556

(22) Filed: Sep. 6, 2001

(65) Prior Publication Data

US 2002/0044657 A1    Apr. 18, 2002

(30) Foreign Application Priority Data

Sep. 7, 2000    (JP) .............................. 2000-270920

(51) Int. Cl.
*G06F 1/26* (2006.01)
*G06F 11/00* (2006.01)
*H04N 7/167* (2006.01)
*G08B 13/00* (2006.01)
*H04L 9/32* (2006.01)

(52) U.S. Cl. ........................... 726/31; 726/32; 726/33; 380/201; 713/189; 705/51; 705/57

(58) Field of Classification Search ................ 380/201; 713/189; 705/51, 57; 726/31, 32, 33
See application file for complete search history.

(56) References Cited

U.S. PATENT DOCUMENTS

| | | | | |
|---|---|---|---|---|
| 5,659,613 A | * | 8/1997 | Copeland et al. ........... | 380/202 |
| 5,948,136 A | * | 9/1999 | Smyers ....................... | 710/107 |
| 5,987,126 A | * | 11/1999 | Okuyama et al. ........... | 380/203 |
| 6,298,196 B1 | * | 10/2001 | Shima et al. ................. | 386/94 |
| 6,298,406 B1 | * | 10/2001 | Smyers ....................... | 710/107 |
| 6,314,518 B1 | * | 11/2001 | Linnartz ...................... | 713/176 |
| 6,526,146 B1 | * | 2/2003 | Hashimoto et al. ......... | 380/201 |
| 6,834,349 B1 | * | 12/2004 | Higurashi et al. .......... | 713/193 |
| 2004/0161108 A1 | * | 8/2004 | Ando et al. ................. | 380/201 |

FOREIGN PATENT DOCUMENTS

EP    860823 A1 *    8/1998

(Continued)

OTHER PUBLICATIONS

Patent Abstracts of Japan vol. 2000, No. 07, Sep. 29, 2000 & JP 2000-100067 a (Sony Corp), Apr. 7, 2000.

*Primary Examiner*—Kambiz Zand
*Assistant Examiner*—Michael J. Simitoski
(74) *Attorney, Agent, or Firm*—Finnegan, Henderson, Farabow, Garrett & Dunner, L.L.P.

(57) ABSTRACT

When the recording mode of an information recording/playback device is a cognizant mode which analyzes embedded copy control information, the information recording/playback device performs content encryption using a content-encryption key generated by using a cognizant key as a content-encryption-key generating key in the cognizant mode. When the recording mode of the information recording/playback device is a non-cognizant mode which does not analyze the embedded copy control information, the information recording/playback device performs content encryption using a content-encryption key generated by using a cognizant key as a content-encryption-key generating key in the non-cognizant mode. By using these techniques, the above two recording modes are clearly distinguished and separately executed. This prevents an encryption mode indicator as copy control information and embedded copy control information from being mismatched.

5 Claims, 50 Drawing Sheets

FOREIGN PATENT DOCUMENTS

| | | |
|---|---|---|
| EP | 0 903 736 | 9/1999 |
| EP | 959467 A2 * | 11/1999 |
| EP | 0 969 462 | 1/2000 |
| EP | 994621 A2 * | 4/2000 |
| EP | 1 001 624 | 7/2000 |
| EP | 1 032 204 | 8/2000 |
| EP | 1193975 A1 * | 4/2002 |
| WO | WO 9922372 A1 * | 5/1999 |

* cited by examiner

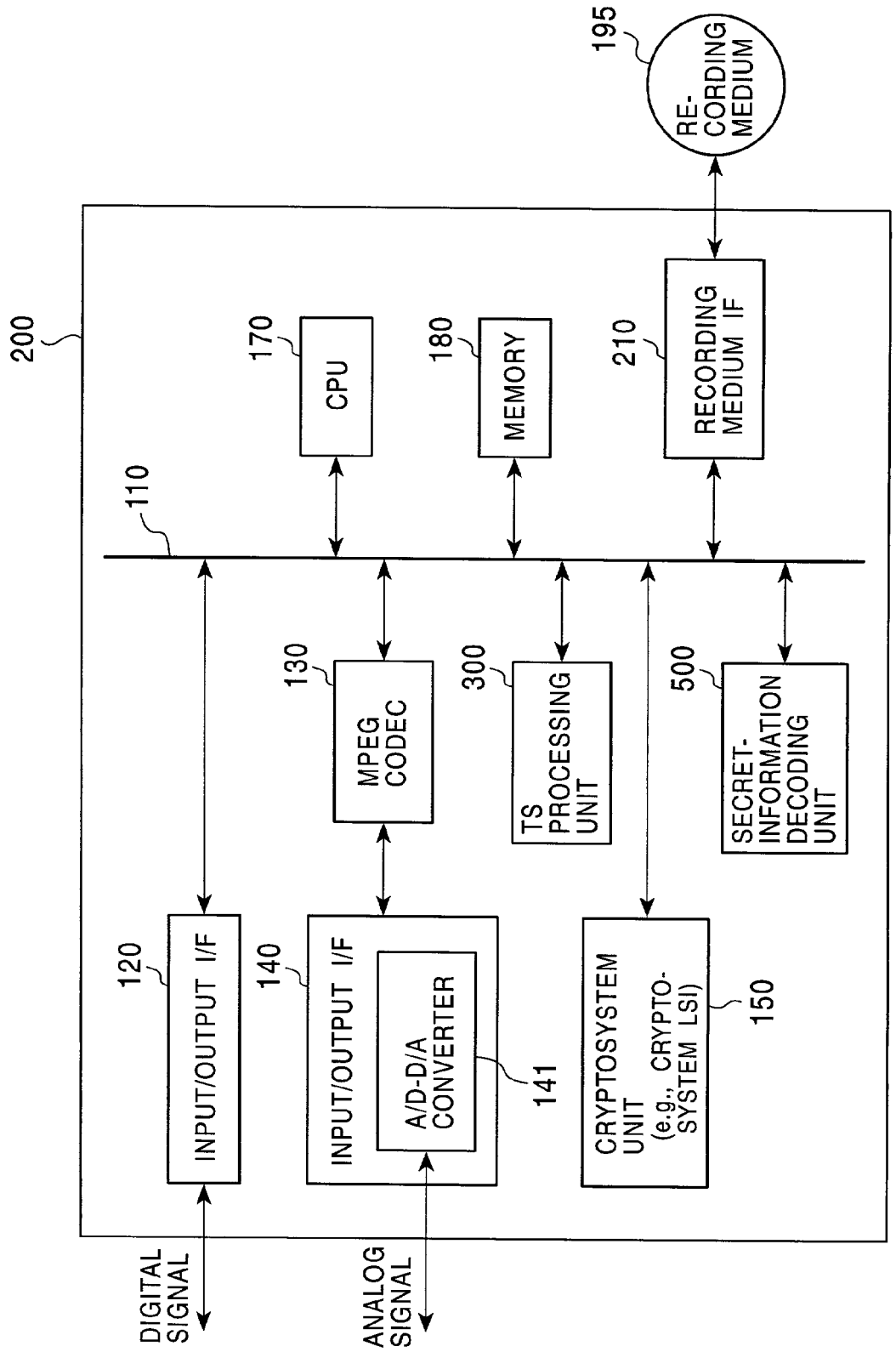

FIG. 12A

| GENERATION : t | |
|---|---|
| INDEX | ENCRYPTION KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG. 12B

| GENERATION : t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

METHOD AND APPARATUS FOR SELECTIVELY EXECUTING INFORMATION RECORDING USING A COGNIZANT MODE AND A NON-COGNIZANT MODE

BACKGROUND OF THE INVENTION

1. Field of the Invention

The present invention relates to information recording devices, information playback devices, information recording methods, information playback methods, and information recording media and program providing media used therewith. In particular, the present invention relates to an information recording device, an information playback device, an information recording method, and an information playback method in which, by using tree-structure, hierarchical key distribution to reduce the number of messages, reductions can be achieved in a data distribution load which is generated when a key such as master key or media key is updated, and in which two recording modes in connection with content-copy control, namely, a cognizant mode and a non-cognizant mode are clearly distinguished and separately performed, and to an information recording medium and a program providing medium which are used therewith.

Specifically, the present invention provides a construction which separately perform information recording in accordance with a cognizant mode which analyzes embedded copy control information in a data part of a packet having a header part and the data part, and information recording in accordance with a non-cognizant mode which does not analyze the embedded copy control information. The present invention relates to an information recording device, an information playback device, an information recording method, and an information playback method in which, by setting a content-encryption key for the information recording in accordance with the cognizant mode and a content-encryption key for the information recording in accordance with the non-cognizant mode so that the content-encryption key differ from each other, the two type of information recording are clearly distinguished and separately executed. The present invention also relates to an information recording medium and a program providing medium which are used with the information recording device, the information playback device, the information recording method, and the information playback method.

2. Description of the Related Art

With the progress and development in digital signal processing technology, the use of recording devices and recording media for digital data recording has become widespread in recent years. By using the recording devices and recording media, images and sound can be recorded and played back repeatedly without a deterioration in quality. In this manner, digital data can be repeatedly copied, while maintaining image and sound quality. Accordingly, if illegally copied recording media are distributed in the market, the profits to copyright holders for various type contents, such as music and movies, or appropriate dealership owners decrease. Nowadays, to prevent such unauthorized copying of digital data, various mechanisms (systems) are being incorporated into digital recording devices and recording media.

By way of example, the Serial Copy Management System (SCMS) is employed in Minidisk (MD) (trademark) devices as a method of preventing unauthorized copying. In the SCMS, a data playback side outputs an SCMS signal with audio data from a digital interface, and the data recording side controls, based on the SCMS signal, recording of the audio data from the data playback side so that unauthorized copying can be prevented.

Specifically, the SCMS signal represents an audio data type among "Copy Free" type in which the audio data may be copied any number of times, "Copy Once Allowed" type in which copying the audio data can be performed only once, and "Copy Prohibited" type in which the copying of the audio data is prohibited. When receiving the audio data from the digital interface, the data recording side detects the SCMS signal which is transmitted with the audio data. When the SCMS signal received represents the Copy Free type, the data recording side records the audio data on the Minidisk with the SCMS signal. When the SCMS signal represents the Copy Once Allowed type, the data recording side records the audio data on the Minidisk after changing the type of the audio data to the Copy Prohibited type. When the SCMS signal represents the Copy Prohibited type, the data recording side does not record the audio data. By using SCMS control, the Minidisk device prevents copyrighted audio data from being illegally copied.

However, it is difficult for the SCMS to cope with a case in which a Minidisk device having no mechanism for performing SCMS control is produced because the SCMS is based on the condition that a data recording device itself must have the above structure for performing control based on an SCMS signal of the recording of audio data from the playback side. Accordingly, for example, digital versatile disk (DVD) players use a content scramble system to prevent copyrighted data from being illegally copied.

In the content scramble system, video data, audio data, etc., are recorded in a DVD-ROM in encrypted form, and a key (decryption key) for decrypting the encrypted data is given to a licensed DVD player. The license is given to a DVD player designed to obey predetermined operation rules such as not performing unauthorized copying. Accordingly, the licensed DVD player can play back images and sound from the DVD-ROM by using the given key to decrypt the encrypted data in the DVD-ROM.

Conversely, an unlicensed DVD player cannot decrypt the encrypted data in the DVD-ROM because it does not have the key for decrypting the encrypted data. In the scramble system, a DVD player that does not meet the conditions required for licensing is not allowed to play back a DVD-ROM containing digital data, thereby preventing unauthorized copying.

In each content, whether or not the content can be copied under what conditions is designated beforehand by a content provider. Accordingly, in network connection, the designated conditions must be correctly posted from a device to another device. In the DTCP system, a method using copy control information is used to solve this problem. Concerning copy control information, there are two types of transmission techniques in accordance with device performance.

"Encryption Mode Indicator (EMI)" is a mechanism in which the two upper Sy bits in a packet header are used to send copy control information. By using this mechanism, a receiver device can easily perform accessing, and a content can be securely sent because the value of the Encryption Mode Indicator acts on a key for encrypting the content.

The Encryption Mode Indicator is used to indicate the encryption mode of the packet, and the generation modes of content encryption and decryption keys are designated. By disposing the Encryption Mode Indicator in an IEEE 1394 packet header, a receiver device is allowed to easily know the type of a mode for encryption of the content, for example, without extracting an embedded copy control information (described later) in an MPEG transport stream.

The 2-bit EMI information defines a different type of treatment in accordance with the set value. Specifically, value "00" is "Copy Free" indicating that neither authentication nor encryption is not required and that a content can be freely copied. Value "01" is "Copy One Generation" indicating that 1-generation copying is allowed. Value "10" is "No More Copies" indicating that re-copying after the above Copy One Generation is recorded once is inhibited. Value "11" is "Never Copy" indicating that a content is inhibited from being copied when being released.

Conversely, in a format (e.g., DV-format) in which an area for sending copy control information is reserved, the copy control information can be sent as part of a content. Copy control information that is embedded as part of the content, as described above, is called "embedded copy control information". Normally, when a content is encrypted and transferred, embedded copy control information is similarly encrypted and transferred. It is considered that an intentional change of the embedded copy control information is difficult.

Here, in the case of a content having both the above 2-bit EMI copy control information and the embedded copy control information, a recording device that performs content recording updates the two types of copy control information, namely, both the Encryption Mode Indicator and the embedded copy control information. However, in the case of a recording device that does not have ability to analyze the embedded copy control information, the Encryption Mode Indicator is updated but the embedded copy control information is not updated.

A recording technique in which in a content recording mode, after updating embedded copy control information transmitted as part of a content, a recording device records the content with the updated embedded copy control information, is called a "cognizant mode". In comparison between the cognizant mode and the non-cognizant mode, the non-cognizant mode causes a small load and can be easier employed because the updating of the embedded copy control information does not need to be performed. However, the DTCP has a rule in which in order that a device may perform MPEG decoding of a content and may output a video signal from an analog terminal, the device must employ the cognizant mode. Accordingly, a device having a decoding/display function must have a function of executing the cognizant mode.

Accordingly, it is possible that a content recording device execute the cognizant mode for a specified data format or implementing a specified function, and executes the non-cognizant mode for recording a content having a different data format.

As described above, in circumstances in which two type of copy control information, namely, Encryption Mode Indicator and embedded copy control information exist, and both a device that executes the cognizant mode and a device that executes the non-cognizant mode exit, it is preferable to distinguish between a content recorded in the cognizant mode and a communication network recorded in the non-cognizant mode.

In other words, when the cognizant mode is used to perform content recording, both types of copy control information, namely, Encryption Mode Indicator and embedded copy control information are updated, but when the non-cognizant mode is used to perform content recording, only Encryption Mode Indicator is updated and embedded copy control information is not updated. As a result, mismatching occurs between the Encryption Mode Indicator and the embedded copy control information recorded on a recording medium, and the mismatched Encryption Mode Indicator and embedded copy control information mix to cause confusion. That is why the distinction of the contents is preferable. Therefore, in order to prevent the two types of copy control information from being mismatched, for the content recorded in the cognizant mode, cognizant-mode recording/playback processing must be executed, and for the content recorded in the non-cognizant mode, non-cognizant-mode recording/playback processing must be executed.

Accordingly, one idea is that the cognizant mode and the non-cognizant mode are treated as separate recording modes. In this case, in order for a device to selectively execute both modes, the device must have processing configurations for executing both modes. This causes a problem in that the cost of the device is increased.

SUMMARY OF THE INVENTION

Accordingly, the present invention is made in view of the foregoing problems, and it is an object of the present invention to provide an information recording device, an information playback device, an information recording method, and an information playback method in which two recording types in connection with content-copy control, namely, recording using a cognizant mode and recording using a non-cognizant mode are clearly distinguished and separately executed, and an information recording medium and a program providing medium used therewith.

Specifically, the present invention is intended to provide a construction which separately perform information recording in accordance with a cognizant mode which analyzes embedded copy control information in a data part of a packet having a header part and the data part, and information recording in accordance with a non-cognizant mode which does not analyze the embedded copy control information. It is another object of the present invention to provide an information recording device, an information playback device, an information recording method, and an information playback method in which, by setting a content-encryption key for the information recording in accordance with the cognizant mode and a content-encryption key for the information recording in accordance with the non-cognizant mode so that the content-encryption key differ from each other, the two type of information recording are clearly distinguished and separately executed, and an information recording medium and a program providing medium which are used with the information recording device, the information playback device, the information recording method, and the information playback method.

To these ends, according to a first aspect of the present invention, there is provided an information recording device for recording information on a recording medium, the information recording device comprising unit for selectively executing information recording using a cognizant mode which analyzes embedded copy control information in a data part of a packet having a header part and the data part, and information recording using a non-cognizant mode which does not analyze the embedded copy control information. When the information recording using the cognizant mode is selected, the unit executes the generation of record information in which a block seed including copy control information based on the embedded copy control information is added to block data formed by at least one packet, and when the information recording using the non-cognizant mode is selected, the unit executes the generation of record information in which a block seed including copy control information based on an encryption-mode indicator as copy control information included in the packet is added to the block data.

Preferably, the information recording device further includes a cryptosystem unit for executing encryption processing on data to be stored on the recording medium, and a transport-stream processing unit for adding an arrival time stamp to each of transport packets constituting a transport stream, wherein the cryptosystem unit generates a block key as an encryption key for block data formed by at least one transport packet to which the arrival time stamp is added, and executes encryption processing on the block data by using the block key.

According to a second aspect of the present invention, there is provided an information recording device for recording information on a recording medium, comprising cryptosystem unit for executing encryption processing on data to be stored on the recording medium. When an information recording mode is a cognizant mode which analyzes embedded copy control information in a data part of a packet having a header part and the data part, the cryptosystem unit generates a content-encryption key by using a cognizant key as a key for generating a content-encryption key in the cognizant mode, and executes content-encryption processing. When the information recording mode is a non-cognizant mode which does not analyze the embedded copy control information, the cryptosystem unit generates the content-encryption key by using a non-cognizant key as a content-encryption key in the non-cognizant mode, and executes the content-encryption processing.

Preferably, the information recording device possesses node keys unique to nodes constituting a hierarchical tree structure having a plurality of different information recording devices as leaves, and leaf keys unique to the information recording devices, the cryptosystem unit generates the content-encryption key based on either of the cognizant key and the non-cognizant key, and encryption-key generating data stored in the information recording device, and the encryption-key generating data can be updated by using an enabling key block generated such that one node key is encrypted by using a key including at least one of a node key and a leaf key which are positioned at a lower level.

The encryption-key generating data may be one of a master key common to the information recording devices and a media key unique to a specified recording medium.

The encryption-key generating data may correspond to a generation number as updating information, and when the encrypted data is stored on the recording medium, the generation of the encryption-key generating data may be stored as a recording-mode generation number on the recording medium.

According to a third aspect of the present invention, there is provided an information recording device for recording information on a recording medium, comprising cryptosystem unit for executing encryption processing on data to be stored on the recording medium. The cryptosystem unit executes the encryption processing using one of different cryptosystem keys in accordance with a type of information recording mode among a cognizant mode which analyzes embedded copy control information in a data part of a packet having a header part and the data part, and a non-cognizant mode which does not analyze the embedded copy control information, and the cryptosystem unit executes a process of storing, on the recording medium, recording-mode data representing the type of information recording mode among the cognizant mode and the non-cognizant mode.

According to a fourth aspect of the present invention, there is provided an information recording device for recording information on a recording medium, which includes a recording unit for executing information recording processing in accordance with only a cognizant mode which analyzes embedded copy control information in a data part of a packet having a header part and the data part, and a cryptosystem unit for executing encryption processing on data to be stored on the recording medium. The cryptosystem unit generates a content-encryption key by using a cognizant key as a content-encryption-key generating key in the cognizant mode, and executes content-encryption processing using the content-encryption key, and the cryptosystem unit executes a process of storing, on the recording medium, recording-mode data representing the cognizant mode.

According to a fifth aspect of the present invention, there is provided an information recording device for recording information on a recording medium, which includes a recording unit for executing information recording processing in accordance with only a non-cognizant mode which does not analyze embedded copy control information in a data part of a packet having a header part and the data part, and a cryptosystem unit for executing encryption processing on data to be stored on the recording medium. The cryptosystem unit generates a content-encryption key by using a non-cognizant key as a content-encryption-key generating key in the cognizant mode, and executes content-encryption processing using the content-encryption key, and the cryptosystem unit executes a process of storing, on the recording medium, recording-mode data representing the non-cognizant mode.

According to a sixth aspect of the present invention, there is provided an information playback device for playing back information recorded on a recording medium, which includes a playback unit for selectively executing playback processing on information recorded in accordance with a cognizant mode which analyzes embedded copy control information in a data part of a packet having a header part and the data part, and playback processing on information recorded in accordance with a non-cognizant mode which does not analyze the embedded copy control information, and a cryptosystem unit for executing decryption processing on the information recorded on the recording medium. The cryptosystem unit executes, in accordance with an information recording mode stored on the recording medium, in one of different modes, one of the playback processing on the information recorded in accordance with the cognizant mode and the playback processing on the information recorded in accordance with the non-cognizant mode.

According to a seventh aspect of the present invention, there is provided an information playback device for playing back information recorded on a recording medium, comprising cryptosystem unit for executing decryption processing on the information recorded on the recording medium. When the recording mode of the information recorded on the recording medium is a cognizant mode which analyzes embedded copy control information in a data part of a packet having a header part and the data part, the cryptosystem unit generates a content-decryption key by using a cognizant key as a content-decryption-key generating key in the cognizant mode, and executes content-decryption processing using the content-decryption key, and when the recording mode of the information recorded on the recording medium is a non-cognizant mode which does not analyze the embedded copy control information, the cryptosystem unit generates a content-decryption key by using a non-cognizant key as a content-decryption-key generating key in the non-cognizant mode, and executes content-decryption processing using the content-decryption key.

Preferably, the information playback device possesses node keys unique to nodes constituting a hierarchical tree structure having a plurality of different information playback devices as leaves, and leaf keys unique to the information playback devices, the cryptosystem unit generates the content-decryption key based on one of the cognizant key and the non-cognizant key, and decryption-key generating data stored in the information playback device, and the decryption-key generating data can be updated by using an enabling key block generated such that a node key is encrypted by using a key including at least one of a node key and a leaf key which are positioned at a lower level.

The decryption-key generating data may be one of a master key common to the information playback devices and a media key unique to a specified recording medium.

The decryption-key generating data may correspond to a generation number as updating information, and when encrypted data from the recording medium is decrypted, the cryptosystem unit may read from the recording medium the generation number of encryption-key generating data used when encryption processing is performed to generate the encrypted data, and may generate a decryption key by using decryption-key generating data corresponding to the read generation number.

According to an eighth aspect of the present invention, there is provided an information playback device for playing back information recorded on the recording medium, which includes a playback unit for executing only playback processing on information recorded in accordance with a cognizant mode which analyzes embedded copy control information in a data part of a packet having a header part and the data part, and a cryptosystem unit for executing playback processing on data stored on the recording medium. The cryptosystem unit generates a content-decryption key by using a cognizant key as a content-decryption-key generating key for information recorded in accordance with the cognizant mode, and executes content-decryption processing using the content-decryption key.

According to a ninth aspect of the present invention, there is provided an information playback device for playing back information recorded on the recording medium, which includes a playback unit for executing only playback processing on information recorded in accordance with a non-cognizant mode which analyzes embedded copy control information in a data part of a packet having a header part and the data part, and a cryptosystem unit for executing playback processing on data stored on the recording medium. The cryptosystem unit generates a content-decryption key by using a non-cognizant key as a content-decryption-key generating key for information recorded in accordance with the non-cognizant mode, and executes content-decryption processing using the content-decryption key.

According to a tenth aspect of the present invention, there is provided an information recording method for recording information on a recording medium, which includes the steps of selectively executing information recording using a cognizant mode which analyzes embedded copy control information in a data part of a packet having a header part and the data part, and information recording using a non-cognizant mode which does not analyze the embedded copy control information, executing, when the information recording using the cognizant mode is selected, the generation of record information in which a block seed including copy control information based on the embedded copy control information is added to block data formed by at least one packet, and executing, when the information recording using the non-cognizant mode is selected, the generation of record information in which a block seed including copy control information based on an encryption-mode indicator as copy control information included in the packet is added to the block data.

Preferably, the information recording method further includes a transport-stream processing step which adds an arrival time stamp to each of transport packets constituting a transport stream, and an encryption step which generates a block key as an encryption key for block data formed by at least one transport packet to which the arrival time stamp is added, and executes encryption processing on the block data by using the block key.

According to an eleventh aspect of the present invention, there is provided an information recording method for recording information on a recording medium, which includes a cryptosystem step for executing encryption processing on data to be stored on the recording medium. When an information recording mode is a cognizant mode which analyzes embedded copy control information in a data part of a packet having a header part and the data part, the cryptosystem step generates a content-encryption key by using a cognizant key as a key for generating a content-encryption key in the cognizant mode, and executes content-encryption processing, and when the information recording mode is a non-cognizant mode which does not analyze the embedded copy control information, the cryptosystem step generates the content-encryption key by using a non-cognizant key as a content-encryption key in the non-cognizant mode, and executes the content-encryption processing.

Preferably, the information recording device further includes an updating step which executes updating processing on encryption-key generating data for generating an encryption key by which encryption processing on the data to be stored on the recording medium is executed by using at least one of a node key unique to each node forming a hierarchical tree structure having a plurality of different information recording devices as leaves, and a cryptosystem step which generates an encryption key based on the encryption-key generating data updated in the updating step and one of the cognizant key and the non-cognizant key, and executes the encryption processing on the data to be stored on the recording medium by using the encryption key.

The encryption-key generating data may be one of a master key common to the information recording devices and a media key unique to a specified recording medium.

The encryption-key generating data may correspond to a generation number as updating information, and in the cryptosystem step, when the encrypted data is stored on the recording medium, the generation of the encryption-key generating data may be stored as a recording-mode generation number on the recording medium.

According to a twelfth aspect of the present invention, there is provided an information recording method for recording information on a recording medium, which includes an encryption step which executes the encryption processing using one of different cryptosystem keys in accordance with a type of information recording mode among a cognizant mode which analyzes embedded copy control information in a data part of a packet having a header part and the data part, and a non-cognizant mode which does not analyze the embedded copy control information, and a storing step which executes a process of storing, on the recording medium, recording-mode data representing the type of information recording mode among the cognizant mode and the non-cognizant mode.

According to a thirteenth aspect of the present invention, there is provided an information playback method for playing back information recorded on a recording medium, which includes the steps of selectively executing playback processing on information recorded in accordance with a cognizant mode which analyzes embedded copy control information in a data part of a packet having a header part and the data part, and playback processing on information recorded in accordance with a non-cognizant mode which does not analyze the embedded copy control information, and executing, in accordance with an information recording mode stored on the recording medium, in one of different modes, one of the playback processing on the information recorded in accordance with the cognizant mode and the playback processing on the information recorded in accordance with the non-cognizant mode.

According to a fourteenth aspect of the present invention, there is provided an information playback method for playing back information recorded on a recording medium, which includes a cryptosystem step for executing decryption processing on the information recorded on the recording medium. When the recording mode of the information recorded on the recording medium is a cognizant mode which analyzes embedded copy control information in a data part of a packet having a header part and the data part, the cryptosystem step generates a content-decryption key by using a cognizant key as a content-decryption-key generating key in the cognizant mode, and executes content-decryption processing using the content-decryption key, and when the recording mode of the information recorded on the recording medium is a non-cognizant mode which does not analyze the embedded copy control information, the cryptosystem step generates a content-decryption key by using a non-cognizant key as a content-decryption-key generating key in the non-cognizant mode, and executes content-decryption processing using the content-decryption key.

Preferably, the decryption step includes a step which generates the content-decryption key based on one of the cognizant key and the non-cognizant key, and decryption-key generating data stored in the information playback device, and the decryption-key generating data can be updated by using an enabling key block generated such that a node key is encrypted by using a key including at least one of a node key and a leaf key which are positioned at a lower level.

The decryption-key generating data may be one of a master key common to the information playback devices and a media key unique to a specified recording medium.

The decryption-key generating data may correspond to a generation number as updating information, and when encrypted data from the recording medium is decrypted, the cryptosystem step reads from the recording medium the generation number of encryption-key generating data used when encryption processing is performed to generate the encrypted data, and generates a decryption key by using decryption-key generating data corresponding to the read generation number.

According to a fifteenth aspect of the present invention, there is provided an information recording medium containing data recorded by information recording in accordance with one of a cognizant mode which analyzes embedded copy control information in a data part of a packet having a header part and the data part, and a non-cognizant mode which does not analyze the embedded copy control information, and mode information representing one of the cognizant mode and the non-cognizant mode, which is used for information recording.

According to a sixteenth aspect of the present invention, there is provided a program providing medium for providing a computer program which controls a computer system to execute information recording processing for recording information on a recording medium. The computer program includes the steps of selectively executing information recording using a cognizant mode which analyzes embedded copy control information in a data part of a packet having a header part and the data part, and information recording using a non-cognizant mode which does not analyze the embedded copy control information, executing, when the information recording using the cognizant mode is selected, the generation of record information in which a block seed including copy control information based on the embedded copy control information is added to block data formed by at least one packet, and executing, when the information recording using the non-cognizant mode is selected, the generation of record information in which a block seed including copy control information based on an encryption-mode indicator as copy control information included in the packet is added to the block data.

According to a seventeenth aspect of the present invention, there is provided a program providing medium for providing a computer program which controls a computer system to execute information recording processing for recording information on a recording medium. The computer program includes the steps of selectively executing playback processing on information recorded in accordance with a cognizant mode which analyzes embedded copy control information in a data part of a packet having a header part and the data part, and playback processing on information recorded in accordance with a non-cognizant mode which does not analyze the embedded copy control information, and executing, in accordance with an information recording mode stored on the recording medium, in one of different modes, one of the playback processing on the information recorded in accordance with the cognizant mode and the playback processing on the information recorded in accordance with the non-cognizant mode.

Each of the program providing media according to the sixteenth and seventeenth aspects of the present invention provides a computer program in a computer-readable form to a general-purpose computer system which can execute various program codes. The form of the recording medium is not particularly limited, but may be a recording medium such as compact disk, floppy disk, or magneto-optical disk, or a transmission medium such as a network.

This type of program providing medium defines a cooperative relationship in structure and function between the computer program and the providing medium for implementing on a computer system the functions of a predetermined computer program. In other words, by using the providing medium to install the computer program in the computer system, the computer system exhibits cooperative operation, and operation and advantages similar to those obtained in the other aspects of the present invention can be obtained.

As described above, in the case of a cognizant mode which analyzes embedded copy control information in a data part of a packet having a header part and the data part, a content-encryption key is generated by using a cognizant key as a content-encryption-key generating key in the cognizant mode, and content-encryption processing using the content-encryption key is executed, and in the case of a non-cognizant mode which does not analyze the embedded copy control information, a content-encryption key is generated by using a non-cognizant key as a content-encryption-key generating key in the non-cognizant mode, and content-encryption processing using the content-encryption key is executed. Therefore, in different recording mode, different encryption keys are used, so that the use of different-mode processes to a single content is prevented.

According to the present invention, concerning, for example, a content recorded using the cognizant mode, a device that has only a non-cognizant-mode recording/playback function can be prevented from executing, by a bug, manipulation of data, or unauthorized change of recording/playback program, mistaken or dishonest recording/playback.

According to the present invention, recording in accordance with a cognizant mode and recording a non-cognizant mode are clearly distinguished and separately executed, whereby, when content recording is performed using the cognizant mode, an encryption mode indicator and embedded copy control information, which are copy control information, are updated, and when content recording is performed using the non-cognizant mode, only the encryption mode indicator is updated. This prevents an encryption mode indicator and embedded copy control information on a recording medium from being mismatched.

Further objects, features and advantages of the present invention will become apparent from the following description of the preferred embodiments with reference to the attached drawings.

BRIEF DESCRIPTION OF THE DRAWINGS

FIG. 2 is a block diagram showing an example of an information recording/playback device of the present invention;

FIGS. 12A and 12B are charts showing enabling key blocks used for distributing keys such as master key and media key to an information recording/playback device of the present invention;

DESCRIPTION OF THE PREFERRED EMBODIMENTS

System Configuration

Figure 1:
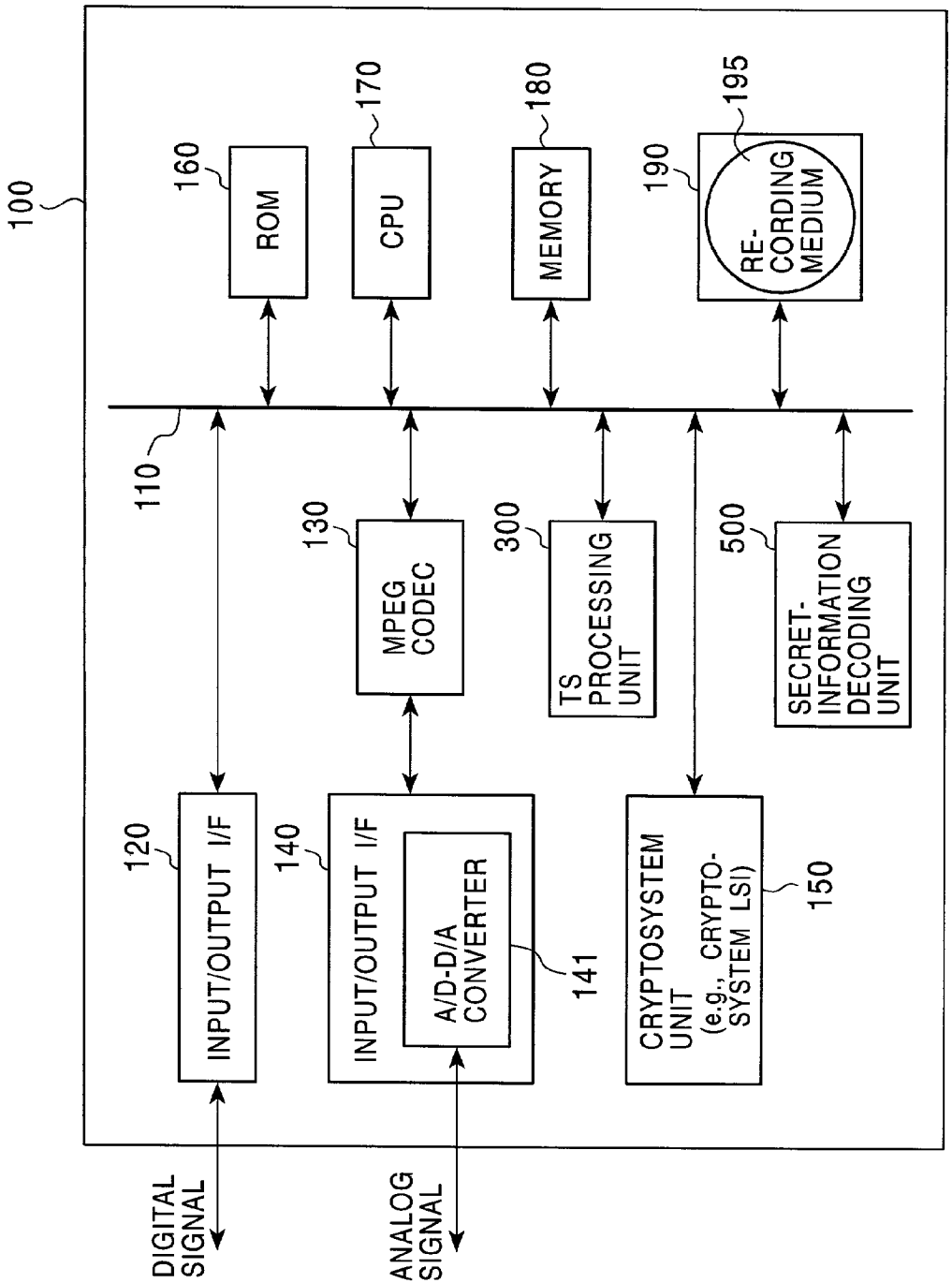
FIG. 1 is a block diagram showing an example of an information recording/playback device of the present invention.

FIG. 1 is a block diagram showing an embodiment of a recording/playback device 100 to which the present invention is applied. The recording/playback device 100 includes an input/output interface (I/F) 120, an MPEG (Moving Picture Experts Group) codec 130, an input/output I/F 140 including an analog-to-digital and digital-to-analog (A/D-D/A) converter 141, an cryptosystem unit 150, a read-only memory (ROM) 160, a central processing unit (CPU) 170, a memory 180, a drive 190 for a recording medium 195, a transport-stream (TS) processing unit 300, and a secret-information decoding unit 500. These are connected to one another by a bus 110.

The input/output I/F 120 receives a digital signal representing various contents which are externally supplied, such as image, sound, and program, and outputs the received digital signal to the bus 110. The input/output I/F 120 also receives a digital signal on the bus 110 and outputs the digital signal to the exterior. MPEG-encoded data which is supplied via the bus 110 is MPEG-decoded and output to the input/output I/F 140 by the MPEG codec 130. Also, a digital signal which is supplied from the input/output I/F 140 is MPEG-encoded and output to the bus 110 by the MPEG codec 130. The input/output I/F 140 includes the A/D-D/A converter 141. The input/output I/F 140 receives an analog signal as an externally supplied content, and outputs, to the MPEG codec 130, a digital signal obtained by using the A/D-D/A converter 141 to perform analog-to-digital conversion on the analog signal. The input/output I/F 140 outputs to the exterior an analog signal obtained by using the A/D-D/A converter 141 to perform digital-to-analog conversion on a digital signal from the MPEG codec 130.

The cryptosystem unit 150 is formed by, for example, a single-chip large-scale integrated circuit (LSI). A digital signal as a content supplied via the bus 110 is encrypted or decrypted and output by the cryptosystem unit 150. The cryptosystem unit 150 is not limited to the single-chip LSI, but can be formed by combining various types of software or various types of hardware. The structure of a processing unit formed by software is described later.

The ROM 160 stores, for example, leaf keys, as device keys, which are unique to recording/playback devices or which are unique to groups of recording/playback devices, and node keys which are common to a plurality of recording/playback devices or to groups thereof. The CPU 170 controls the MPEG codec 130, the cryptosystem unit 150, etc., by executing a program stored in the memory 180. The memory 180 is, for example, a nonvolatile memory, and stores programs executed by the CPU 170, and data required for the operation of the CPU 170. By driving the recording medium 195, to/from which digital data can be recorded/played back, the drive 190 reads (plays back) and outputs digital data from the recording medium 195 to the bus 110, and supplies digital data supplied via the bus 110 so that the digital data is recorded on the recording medium 195. The device keys may be stored in the memory 180.

The recording medium 195 is a medium that can store digital data, for example, an optical disk such as digital versatile disk (DVD) or compact disk (CD), magneto-optical disk (MO), magnetic disk, magnetic tape, or semiconductor memory such as RAM. In this embodiment, the recording medium 195 can be loaded/unloaded into/from the drive 190. However, the recording medium 195 may be built into the recording/playback device 100.

The TS processing unit 300, which is fully described later with reference to FIG. 6 and the following drawings, performs data processing that, after extracting transport packets corresponding to a specified program from a transport stream in which a plurality of TV programs (contents) are multiplexed, stores appearance-timing information of the extracted transport packets on the recording medium 195, with each packet, and appearance-timing-control processing in the mode of reading from the recording medium 195.

In the transport stream, an arrival time stamp (ATS) is set as appearance-timing information of each transport packet. This timing is determined in an encoding mode so as not to break a transport stream system target decoder (T-STD) which is a virtual decoder defined in MPEG-2. When the transport stream is played back, an arrival time stamp that is added to each transport packet controls the appearance timing. The TS processing unit 300 executes control of these steps. For example, for recording a transport packet on the recording medium 195, the transport packet is recorded as a source packet in which intervals of packets are shortened. By recording the transport stream on the recording medium 195 with the appearance timing of each transport stream, the output timing of each transport packet can be controlled in playback mode. When recording data on the recording medium 195 such as DVD, the TS processing unit 300 additionally records an arrival time stamp representing the input timing of each transport packet.

In the recording/playback device 100 of the present invention, encryption of a content composed of a transport stream to which the arrival time stamp is added is executed, and the encrypted content is stored on the recording medium 195. The cryptosystem unit 150 executes decoding on the encrypted content which is stored on the recording medium 195. The details of these processes are described later.

The secret-information decoding unit 500 is a processing unit that executes the reading and decoding of secret information which can be read by performing a special reading process stored on the recording medium 195. The secret information stored on the recording medium 195 includes, for example, a stamper ID set for each stamper in disk production, a disk ID differently set for each disk, a content ID differently set for each content, and various identification data and cryptographic keys, such as keys for use in cryptosystem processing.

The secret-information decoding unit 500 reads and decodes the secret information stored on the recording medium 195, and transfers the decoded secret information to the cryptosystem unit 150. The cryptosystem unit 150 uses the secret information to generate a cryptographic key which is used when a content is recorded/read on/from the recording medium 195. The secret information, decoded by the secret-information decoding unit 500, is used only when a content-encryption key is generated in the cryptosystem unit 150, without being stored in a storage unit which is readable from the outside of the recording/playback device 100, so that the secret information is prevented from leaking to the exterior.

The cryptosystem unit 150, the TS processing unit 300, and the secret-information decoding unit 500 are shown as separate blocks for ease of understanding. However, the units 150, 300, and 500 may be formed as one or a plurality of LSIs that execute the functions of the units. Also, any of the functions may be implemented by combining software and hardware.

The construction shown in FIG. 2 can be used as an embodiment of a recording/playback device in addition to the construction shown in FIG. 1. In a recording/playback device 200 shown in FIG. 2, a recording medium 205 can be removably loaded into a recording medium interface (I/F) 210 as a drive unit, and data reading and writing can be performed, even if the recording medium 205 is loaded into another recording/playback device.

Data-recording Process and Data Reading Process

Next, with reference to the flowcharts shown in FIGS. 3A to 4B, a process of recording data on the recording medium 195 and a process of playback of data from the recording medium 195 in the recording/playback device 100 or 200 in FIG. 1 or 2 are described below.

Figure 3A:
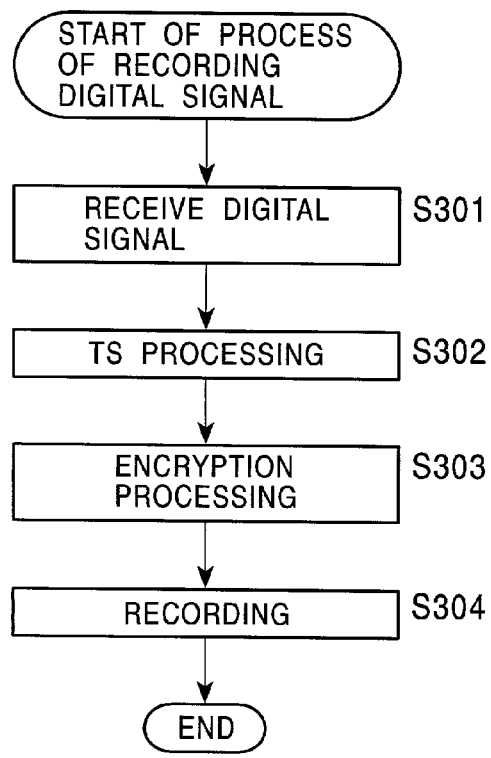
FIGS. 3A and 3B are flowcharts showing a process of recording a digital signal and a process of recording an analog signal.

When a digital-signal content from the exterior is recorded on the recording medium 195, a recording process in accordance with the flowchart shown in FIG. 3A is performed.

Specifically, a digital-signal content (digital content) is supplied to the input/output I/F 120 via, for example, an IEEE (Institute of Electrical and Electronic Engineers) 1394 serial bus or the like, in step S301, the supplied content is received and output to the TS processing unit 300 via the bus 110.

In step S302, the TS processing unit 300 generates block data in which an arrival time stamp is added to each transport packet forming a transport stream, and outputs the block data to the cryptosystem unit 150 via the bus 110.

In step S303, the cryptosystem unit 150 executes encryption processing on the received content, and outputs the obtained encrypted content to the drive 190 or the recording medium I/F 210 via the bus 110. The encrypted content is recorded (step S304) on the recording medium 195 via the drive 190 or the recording medium I/F 210, and the recording process ends. The encryption processing in the cryptosystem unit 150 is described later.

Five companies including the assignee of the present Application, Sony Corporation, has established the Five Company Digital Transmission Content Protection (hereinafter referred to as the "5CDTCP" or "DTCP") system as a standard for protecting digital contents in a case in which the digital contents are transmitted between devices connected by an IEEE 1394 serial bus. In the DTCP, when a digital content having no copy-free information is transmitted between devices, authentication which determines whether or not copy-control information for copy control is properly treated is mutually performed before performing data transmission. After that, the digital content is encrypted and transmitted at a transmitting end, and the encrypted digital content (hereinafter referred to also as the "encrypted content") is decrypted at the receiving end.

In data transmission/reception based on the DTCP standard, in step S301, the input/output I/F 120 at the data receiving end receives the encrypted content via the IEEE 1394 serial bus. After decrypting the encrypted content in accordance with the DTCP standard, the input/output I/F 120 outputs the content as plaintext to the cryptosystem unit 150.

Digital content encryption based on the DTCP is performed by using a time-changing key after generating the key. The encrypted digital content is transmitted on the IEEE 1394 serial bus, including a key used for the encryption, and at the receiving end, the encrypted digital content is decrypted by using the key included therein.

According to the DTCP, accurately, an initial value of the key, and a flag representing timing of changing a key for use in encryption of the digital content are included in the digital content. At the receiving end, by changing the initial value of the key included in the encrypted content, based on the timing of the flag included in the encrypted content, a key used for encryption is generated and the encrypted content is decoded. Here, it may be considered that the encrypted content is equivalent to a case in which a key for decrypting the encrypted content is included therein. Concerning the DTCP, on a Web page specified by a uniform resource locator (URL) of, for example, http://www.dtcp.com, an information version can be obtained.

Figure 3B:
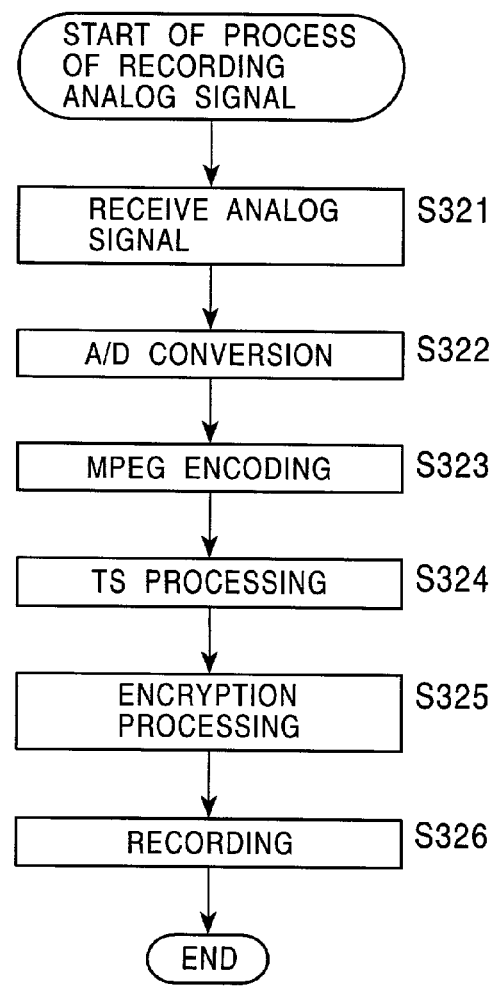

Next, with reference to the flowchart in FIG. 3B, a case in which an analog signal content from the exterior is recorded on the recording medium 195 is described below.

When the analog signal content (hereinafter referred to also as the "analog content") is supplied to the input/output I/F 140, in step S321, the input/output I/F 140 receives the analog content. In step S322, the input/output I/F 140 generates a digital signal content (digital content) by using the A/D-D/A converter 141 to perform analog-to-digital conversion on the analog content.

The digital content is supplied to the MPEG codec 130. In step S323, the MPEG codec 130 performs MPEG encoding or encoding processing using MPEG compression on the digital content, and supplies the encoded content to the cryptosystem unit 150 via the bus 110.

After that, steps S324, S325, and S326 are performed identically to steps S302, S303, and S304 in FIG. 3A. In other words, the addition of an arrival time stamp to each transport packet by the TS processing unit 300 and the encryption processing by the cryptosystem unit 150 are performed. The resulted encrypted content is recorded on the recording medium 195, and the recording processing is terminated.

With reference to the flowcharts shown in FIGS. 4A and 4B, processing in which a content recorded on the recording medium 195 is played back and output as a digital content or an analog content is described below.

Figure 4A:
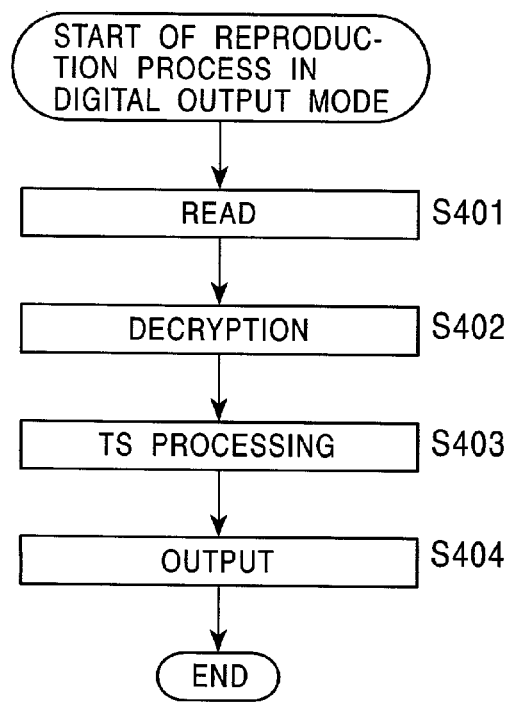
FIGS. 4A and 4B are flowcharts showing reproduction processes in digital and analog output modes.

A process of outputting the content as a digital content to the exterior is executed as a playback process in accordance with the flowchart in FIG. 4A. Specifically, in step S401, the encrypted content recorded on the recording medium 195 is read by the drive 190 or the recording medium I/F 210, and is output to the cryptosystem unit 150 via the bus 110.

In step S402, the cryptosystem unit 150 performs decryption processing on the encrypted content supplied from the drive 190 or the recording medium I/F 210, and outputs the decrypted data to the TS processing unit 300 via the bus 110.

In step S403, the TS processing unit 300 determines output timing from the arrival time stamp of each transport packet forming the transport stream, performs control in accordance with the arrival time stamp, and supplies the transport packet to the input/output I/F 120 via the bus 110. The input/output I/F 120 outputs the digital content from the TS processing unit 300 to the exterior and terminates the playback processing. The processing of the TS processing unit 300 and the digital-content decoding processing of the cryptosystem unit 150 are described later.

In step S404, when outputting the digital content via the IEEE 1394 serial bus, the input/output I/F 120 performs mutual authentication with another device, as described above, and succeedingly transmits the digital content in an encrypted form.

When the content recorded on the recording medium 195 is played back and output as an analog content to the exterior, a playback process in accordance with the flowchart in FIG. 4 is performed.

Specifically, steps S421, S422, and S423 are performed identically to steps S401, S402, and S403. These supply the MPEG codec 130 via the bus 110 with the decoded digital content obtained in the cryptosystem unit 150.

In step S424, the MPEG codec 130 performs MPEG decoding or decompression processing on the digital content, and supplies the decompressed content to the input/output I/F 140. In step S425, the input/output I/F 140 generates an analog content by using the built-in A/D-D/A converter 141 to perform digital-to-analog conversion on the MPEG-decoded digital content. In step S426, the input/output I/F 140 outputs the analog content to the exterior and terminates the playback process.

Data Format

Next, with reference to FIG. 5, a data format on the recording medium 195 in the present invention is described below.

In the present invention, a minimum unit for reading/writing data from/on the recording medium 195 is called a "block". One block has a size of 192 by X bytes (e.g., X=32).

In the present invention, a 4-byte arrival time stamp is added to a 188-byte transport stream packet in accordance with MPEG-2 so that the total size is 192 bytes, and X ATS-added transport stream packets constitute one block of data. An arrival time stamp is data of 24 to 32 bits which represents an arrival time. An arrival time stamp is formed as random data in accordance with the arrival time of each packet. In one block (sector) of the recording medium 195, X ATS-added transport stream packets are recorded. In the present invention, by using an arrival time stamp added to the first transport stream packet of each block forming a transport stream, a block key for encrypting the data of the block (sector) is generated.

By using the random arrival time stamp to generate the encryption block key, different unique keys for blocks are generated. The generated block unique keys are used to perform encryption processing on blocks. Also, by employing the ATS-used generation of the block keys, the need for the area of the recording medium 195 required for the encryption keys is eliminated, and a main data area can be effectively used. This eliminates the need for accessing data other than the main data in data recording and reading modes, so that efficient processing can be performed.

Figure 5:
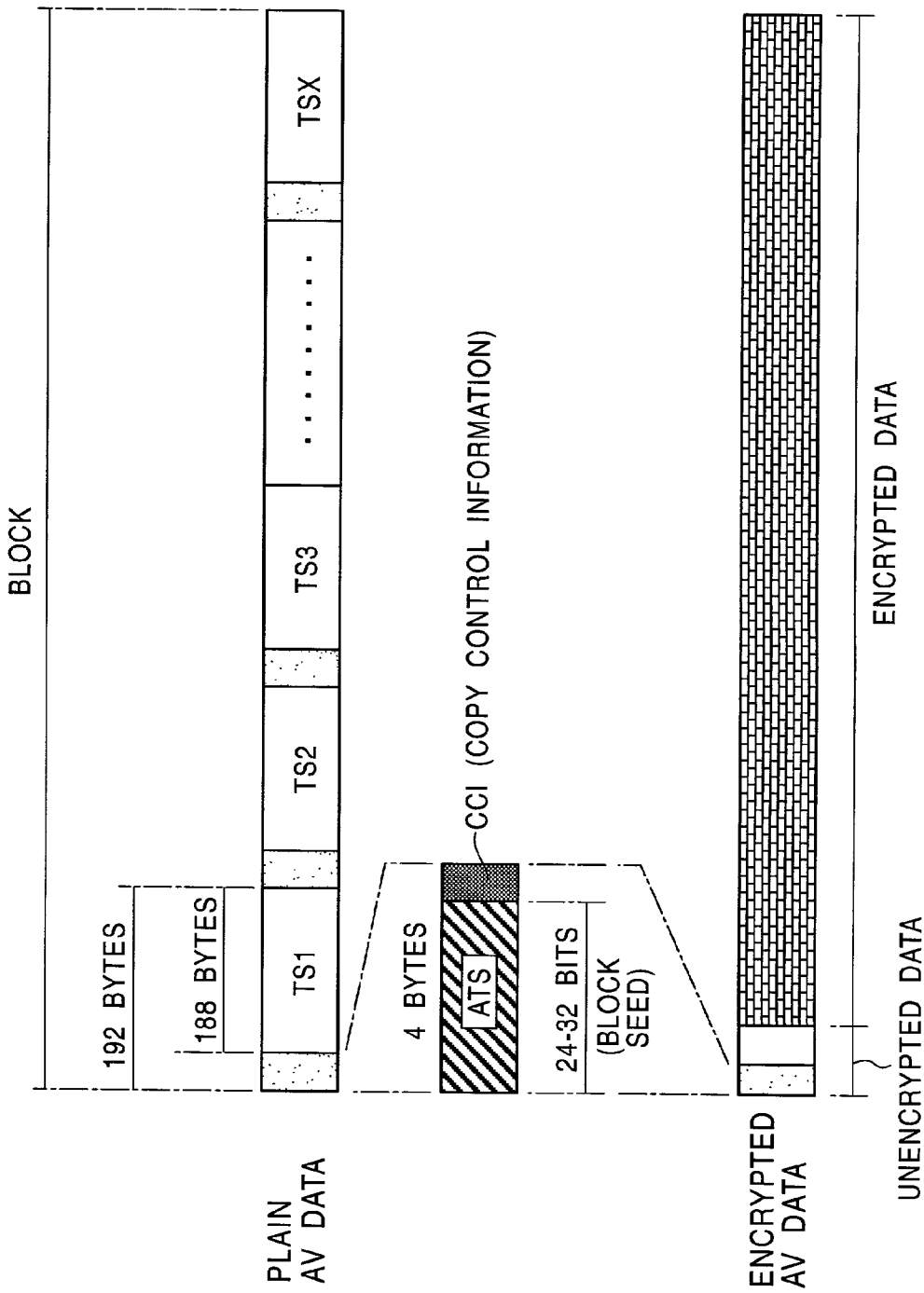
FIG. 5 consists of illustrations of a data format processed in an information recording/playback device of the present invention.

The block seed shown in FIG. 5 is additional information including the arrival time stamp. The block Seed may include not only the arrival time stamp but also copy control information (hereinafter referred to also as "CCI"). In this case, by using the arrival time stamp and the copy control information, each block key can be generated.

The copy control information included in the block seed, which is described later, is copy control information proposed as a joint proposal of five enterprises by the DTCP system. The copy control information reflects one of two types of information in accordance with device performance, namely, encryption mode indicator (EMI), and embedded CCI which is copy control information embedded in a content and which is applied to a format having a predetermined portion for sending copy control information.

In the present invention, when data is stored on a recording medium such as a DVD, most of content data is encrypted, but first m bytes (e.g., m=8 or 16) of the block are not encrypted and recorded as unencrypted data, and the remaining data (byte m+1 or greater) is encrypted, as is indicated by the bottom image in FIG. 5. This is because encrypted data length is restricted by performing the encryption processing in units of eight bytes. If the encryption processing can be performed not in units of eight bytes but in units of one byte, all portions excluding the block seed may be encrypted using m=4.

Processing by TS Processing Unit 300

The function of the arrival time stamp is described below.

As described above, the arrival time stamp is added in order to store the appearance timing of each transport packet in an input transport stream.

Figure 7:
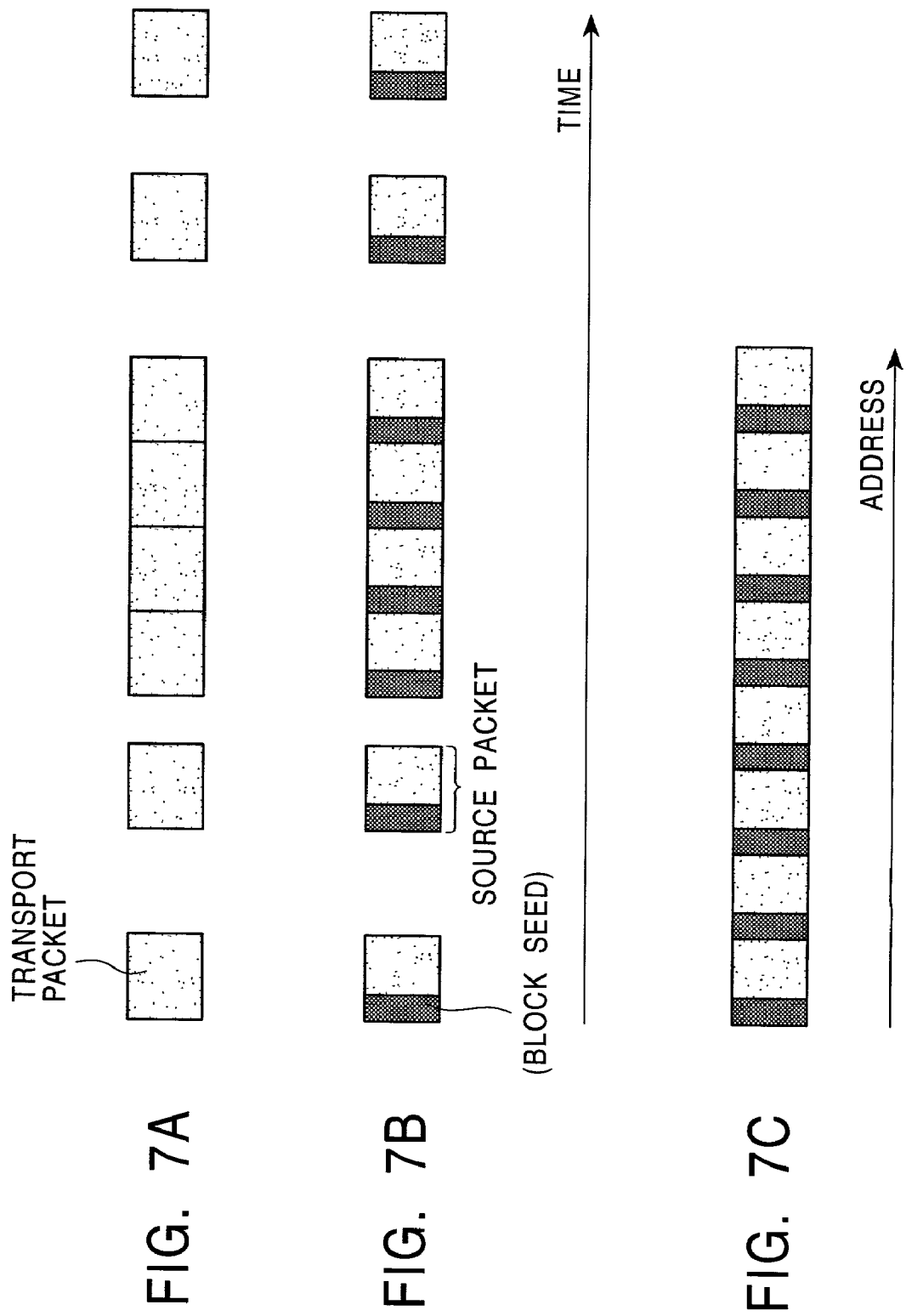
FIGS. 7A, 7B, and 7C are illustrations of transport streams processed in an information recording/playback device of the present invention.

Specifically, when one or more TV programs (contents) are extracted from a transport stream in which a plurality of TV programs (contents) are multiplexed, transport stream packets constituting the transport stream appear irregularly (see FIG. 7A). In the transport stream, the appearance timing of each transport packet has important meaning. The appearance timing is determined in encoding mode so as not to break a transport stream system target decoder (T-STD) which is a virtual decoder defined in MPEG-2 (ISO/IEC 13818-1).

When the transport stream is played back, the appearance timing is controlled by the arrival time stamp added to each transport packet. Accordingly, when recording transport packets on the recording medium 195, the input timing of each transport packet must be stored. Thus, when recording the transport packet on the recording medium 195, an arrival time stamp that represents the input timing of each transport packet is additionally recorded.

Figure 6:
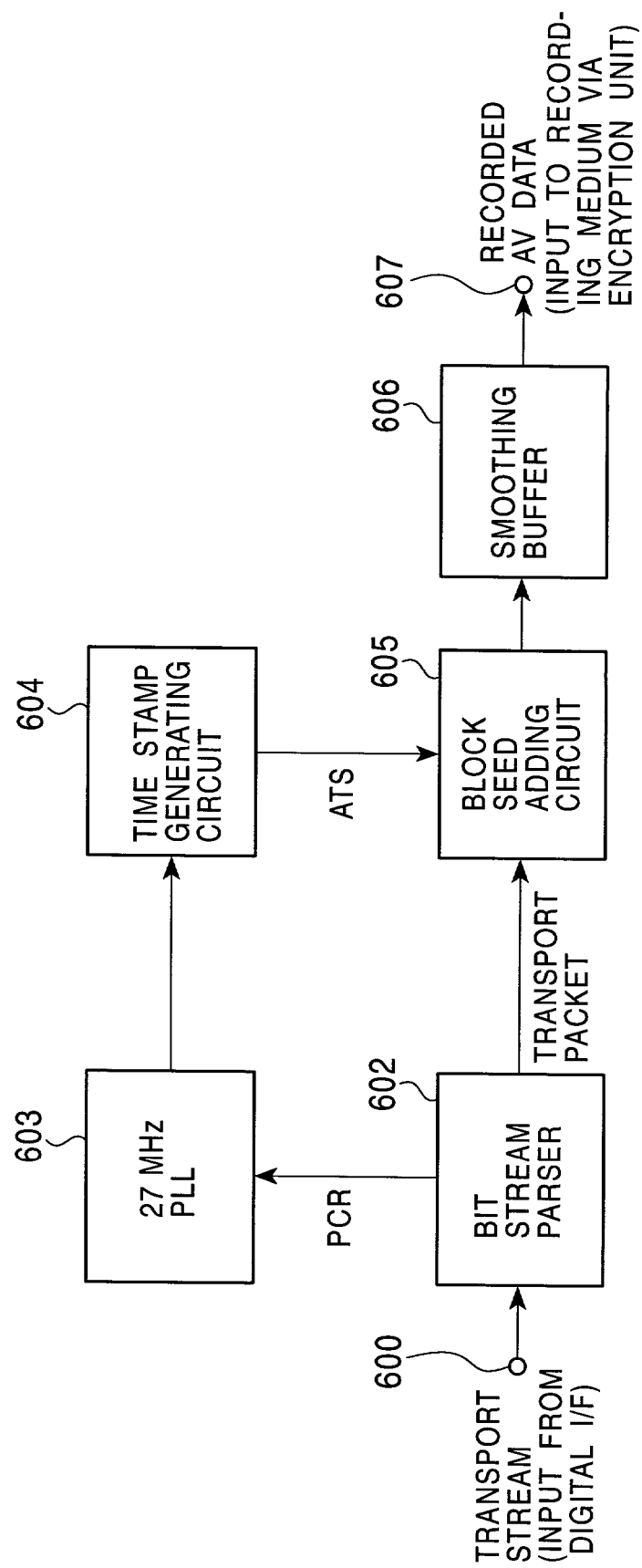
FIG. 6 is a block diagram showing a transport stream processing unit in an information recording/playback device of the present invention.

FIG. 6 is a block diagram illustrating processing executed by the TS processing unit 300 when a transport stream input via a digital interface is recorded on a storage medium as the recording medium 195. From a terminal 600, a transport stream is input as digital data of digital broadcasting. In FIG. 1 or 2, the transport stream is input from the terminal 600 either via the input/output I/F 120 or via the input/output I/F 140 and the MPEG codec 130.

The transport stream is input to a bit stream parser 602. The bit stream parser 602 detects a program clock reference (PCR) packet from the input transport stream. The PCR packet is such that PCR defined in MPEG-2 is encoded. The PCR packet is obtained by performing encoding at time intervals of 100 milliseconds or less. The PCR represents a time at which a transport packet arrives at the receiving side, with precision of 27 MHz.

In a 27-MHz phase-locked loop (PLL) 603, the 27-MHz clock signal of the recording/playback device is locked in the program clock reference of the transport stream. A time stamp generating circuit 604 generates a time stamp based on a count of clocks of the 27-MHz clock signal. A block seed adding circuit 605 uses a time stamp obtained when the first byte of a transport stream is input to a smoothing buffer 606, as an arrival time stamp, and adds the arrival time stamp to the transport stream.

The ATS-added transport packet passes through the smoothing buffer 606 and is output from a terminal 607 to the cryptosystem unit 150. After the ATS-added transport packet is encoded by the cryptosystem unit 150, the encoded transport packet is recorded on the recording medium 195 as a storage medium via the drive 190 (FIG. 1) or the recording medium I/F 210 (FIG. 2).

FIGS. 7A to 7C show an example of a process performed when the input transport stream is recorded on the recording medium 195. FIG. 7A shows input transport packets constituting a specified program (content), where the vertical axis is a time base indicating time on the transport stream. As shown in FIG. 7A, the input transport packets appear with irregular timing.

FIG. 7B shows an output from the block seed adding circuit 605. The block seed adding circuit 605 outputs source packets by adding, to each transport packet, a block seed including an arrival time stamp representing a time on the stream of the packets. FIG. 7C shows source packets recorded on the recording medium 195. By recording the source packets at shortened intervals as shown in FIG. 7C, the recording area of the recording medium 195 can be effectively used.

Figure 8:
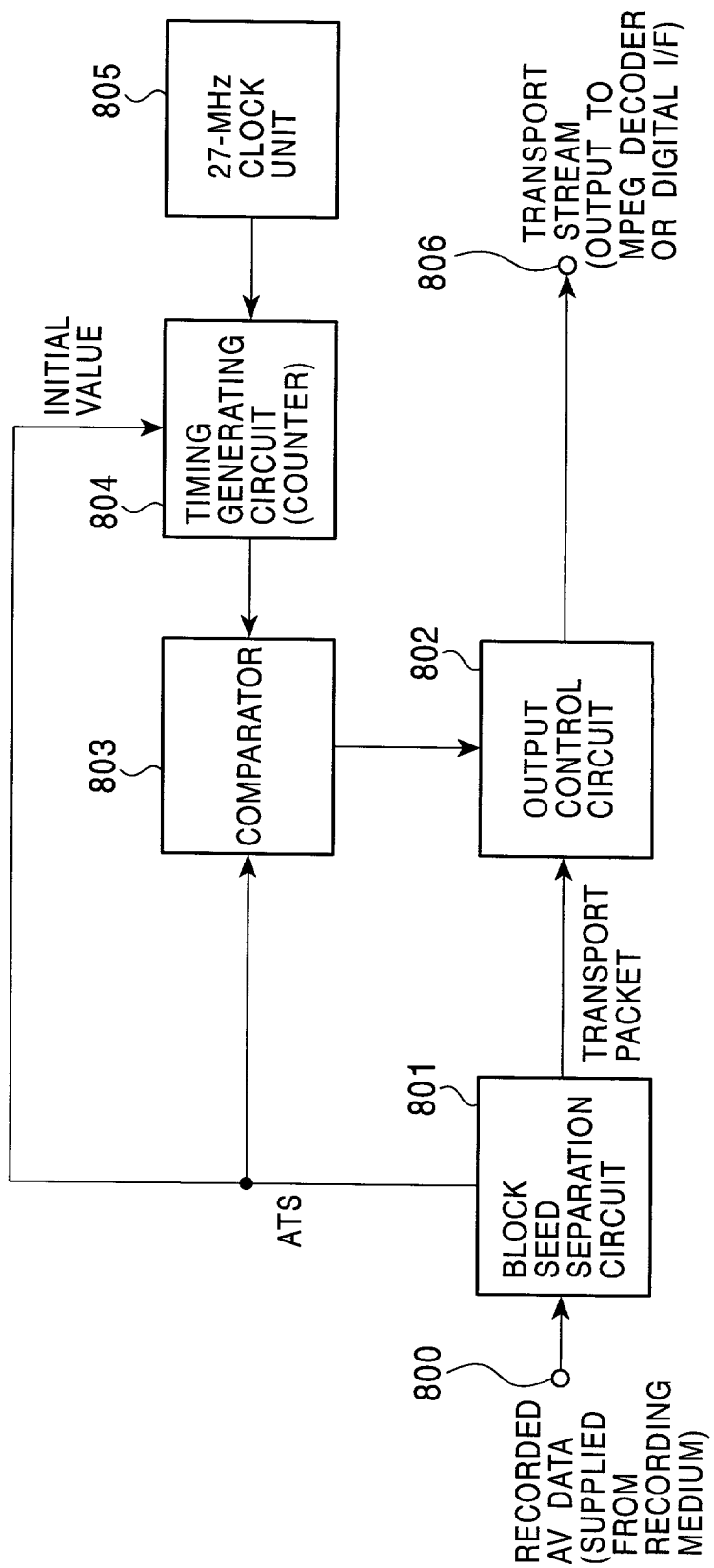
FIG. 8 is a block diagram showing a transport stream processing unit in an information recording/playback device.

FIG. 8 shows a processing configuration of the TS processing unit 300 in a case in which the transport stream recorded on the recording medium 195 is played back. An ATS-added transport packet, decoded by an cryptosystem unit (described later), is input from a terminal 800 to a block seed separation circuit 801, and is separated into an arrival time stamp and a transport packet. A timing generating circuit 804 calculates a time based on a clock counter value of a 27-MHz clock unit 805 of the TS processing unit 300 when it performs playback.

At the start of playback, the first arrival time stamp is set as an initial value in a timing generating circuit 804. A comparator 803 compares the arrival time stamp with the present time input from the timing generating circuit 804. When the time generated by the timing generating circuit 804 is equal to the arrival time stamp, an output control circuit 802 outputs the transport packet to the MPEG codec 130 or the input/output I/F 120.

Figure 9:
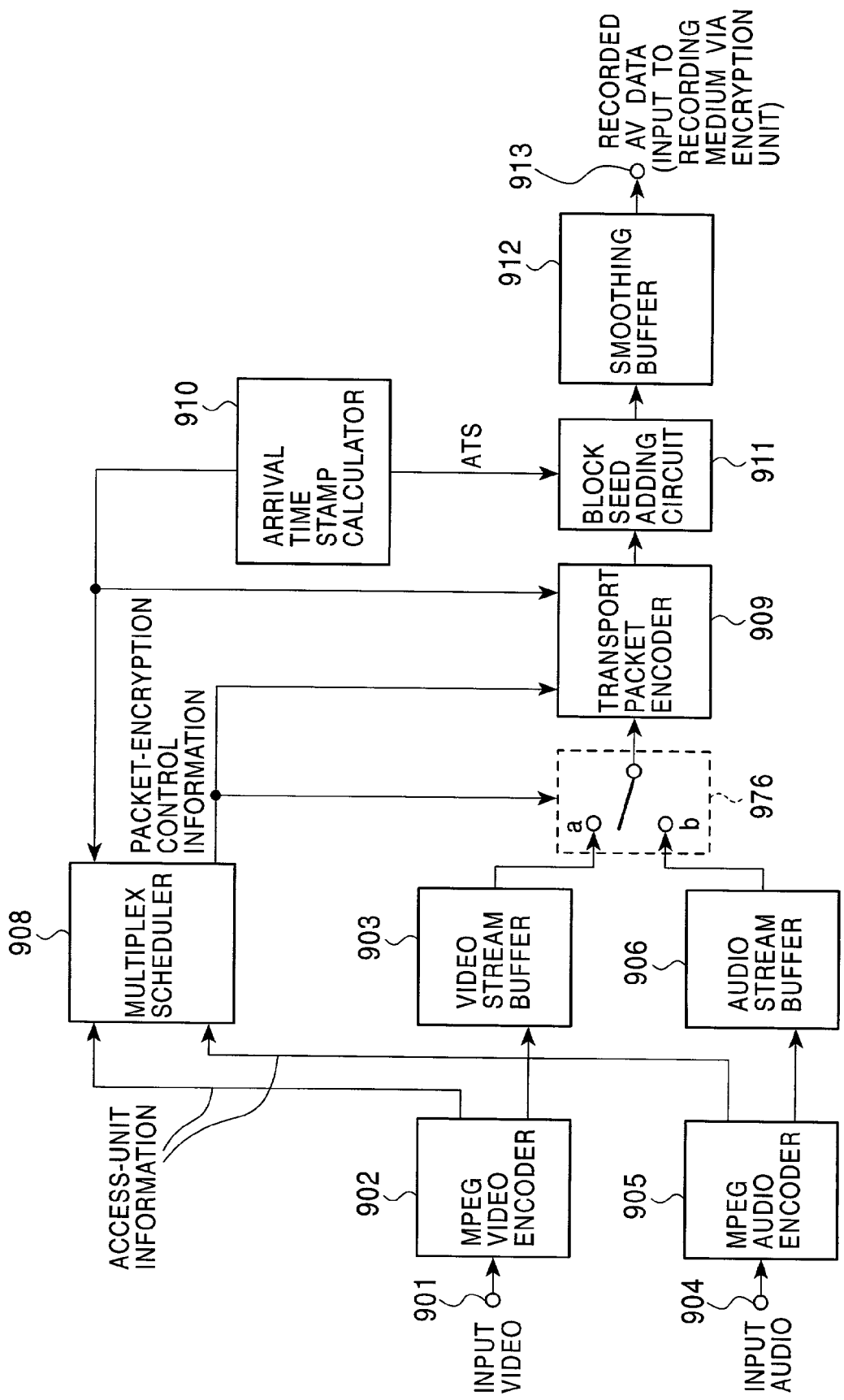
FIG. 9 is a block diagram showing a transport stream unit in an information recording/playback device of the present invention.

FIG. 9 is a block diagram showing a case in which an input AV signal is MPEG-encoded by the MPEG codec 130 of the recording/reproducing unit 100, and a transport stream is encoded by the TS processing unit 300. Accordingly, FIG. 9 is a block diagram showing a combination of the MPEG codec 130 and the TS processing unit 300 in FIG. 1 or 2.

A video signal is input from a terminal 901 to an MPEG video encoder 902.

The MPEG video encoder 902 encodes the input video signal to generate an MPEG video stream, and outputs the MPEG video stream to a video stream buffer 903. The MPEG video encoder 902 outputs access-unit information on the MPEG video stream to a multiplex scheduler 908. An access unit is a picture, and the access-unit information is the picture type of each picture, an amount of encoded bits, and a decode-time stamp. The picture type is I/P/B picture information. The decode-time stamp is information defined in MPEG-2.

An audio signal is input from a terminal 904 to an MPEG audio encoder 905. The MPEG audio encoder 905 encodes the input audio signal to generate an MPEG audio stream, and outputs the stream to an audio stream buffer 906. The MPEG audio encoder 905 also outputs access-unit information on the MPEG audio stream to the multiplex scheduler 908. An access unit of an audio stream is an audio frame, and the access-unit information is an amount of encoded bits in each audio frame and a decode-time stamp.

Access-unit information on video and audio is input to the multiplex scheduler 908. Based on the input access-unit information, the multiplex scheduler 908 controls a method of encoding a video stream and an audio stream to generate transport packets. The multiplex scheduler 908 includes a 27-MHz-precision clock generator for generating a reference time, and determines packet-encoding control information for a transport packet so as to satisfy a transport stream system target decoder as a virtual decoder model. The packet-encoding control information is a type of a stream to be formed in packet and the length of a stream.

When the packet-encoding control information represents a video packet, a switch 976 connects to the side a, so that video data is read which has a payload data length designated by the packet-encoding control information from the video stream buffer 903, and is input to a transport packet encoder 909.

When the packet-encoding control information represents an audio packet, the switch 976 connects to the side b, so that audio data is read which has a payload data length designated by the audio stream buffer 906, and is input to the transport packet encoder 909.

When the packet-encoding control information represents a program clock reference packet, the transport packet encoder 909 captures a program clock reference input from the multiplex scheduler 908, and outputs a program clock reference packet. When the packet-encoding control information indicates that packet encoding is not performed, nothing is input to the transport packet encoder 909.

When the packet-encoding control information indicates that packet encoding is not performed, the transport packet encoder 909 does not output any transport packet. In cases other than that, based on the picture, the transport packet encoder 909 generates and outputs transport packets. Accordingly, the transport packet encoder 909 intermittently outputs transport packets. Based on the program clock reference input from the multiplex scheduler 908, an arrival time stamp calculator 910 calculates, an arrival time stamp representing a time at which the first byte of the transport packet arrives at the receiving side.

The program clock reference input from the multiplex scheduler 908 represents an arrival time at which the tenth byte of a transport packet defined in MPEG-2 arrives at the receiving side. Thus, the value of the arrival time stamp is an arrival time of a byte that is positioned ten bytes before the time of the program clock reference.

A block-seed adding circuit 911 adds an arrival time stamp (ATS) to the transport packet output from the transport packet encoder 909. The ATS-added transport packet which is output from the block-seed adding circuit 911 passes through a smoothing buffer 912 to be input to the cryptosystem unit 150. After the input ATS-added transport packet is encrypted as described later, the encrypted ATS-added transport packet is recorded on the recording medium 195 as a storage medium.

Before being encrypted by the cryptosystem unit 150, the ATS-added transport packets to be recorded on the recording medium 195 are input, with the intervals of the packets shortened. After that, the encrypted ATS-added transport packets are recorded on the recording medium 195. Even if transport packets are recorded with the intervals thereof shortened, a time at which the transport packets are input can be controlled.

The length of an arrival time stamp is not limited to 32 bits, but may be 24 to 31 bits. The longer the bit length of the arrival time stamp, the greater each cycle of a time counter for arrival time stamp. For example, when the time counter for arrival time stamp is a binary counter with precision of 27 MHz, the time required for a cycle of a 24-bit-length arrival time stamp is approximately 0.06 seconds. This time is sufficient for an ordinary transport stream. This is because under provision of MPEG-2, each packet interval of transport streams is a maximum of 0.1 seconds. However, the arrival time stamp may have 24 or more bits for sufficient tolerance.

In the above cases in which the bit length of the arrival time stamp is variously set, there are a plurality of possible configurations for a block seed as an additional data to block data.

Figure 10:
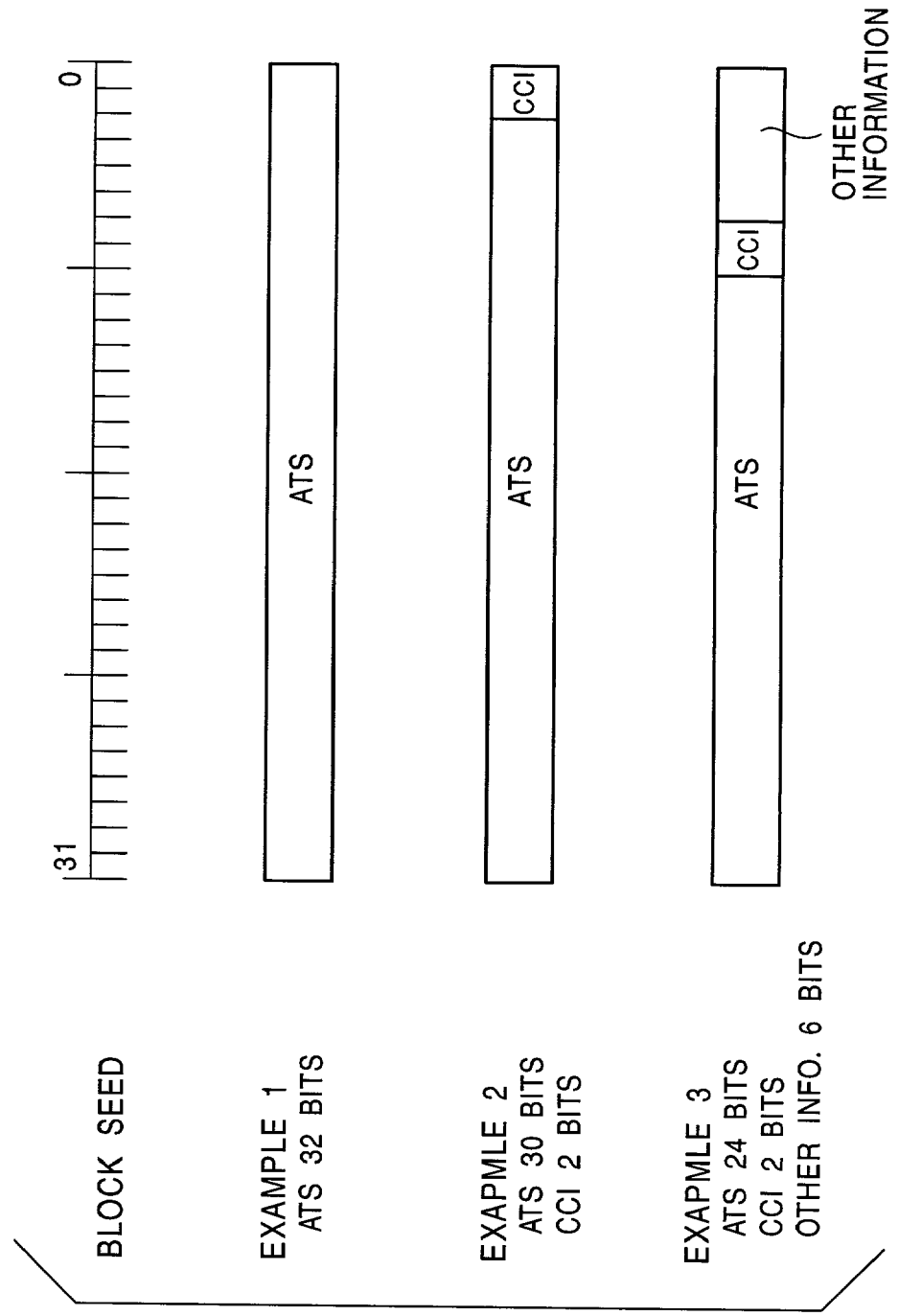
FIG. 10 consists of illustrations of a block data as a block seed as additional information of block data processed by an information recording/playback device of the present invention.

FIG. 10 shows block seed configurations. In example 1 in FIG. 10, thirty-two bits are used for the arrival time stamp. In example 2 in FIG. 10, thirty bits are used for the arrival time stamp, and two bits are used for copy control information. Copy control information represents a state of copy control in data to which the copy control information is added. Concerning copy control information, the Serial Copy Management System (SCMS) and the Copy Generation Management System (CGMS) are famous. By using copy control information based on these systems, types of information can be shown, such as "Copy Free" information indicating that data to which Copy Free information is added may be limitlessly copied, "One Generation Copy Allowed" information indicating that the copying of data to which One Generation Copy Allowed information is added can be performed only in one generation, and "Copy Prohibited" information indicating that the copying of data to which Copy Prohibited information is added is prohibited.

In example 3 in FIG. 10, twenty-four bits are used for the arrival time stamp, two bits are used for the copy control information, and six bits are used for other information. Various types of information, such as information representing the switching on/off of a Macrovision as an analog-picture-copy-control mechanism in a case in which other-information-included data is analog-output, can be used as other information.

Tree Structure as Key Distribution Configuration

Next, a configuration is described below in which the recording/playback device 100 or 200 in FIGS. 1 or 2 distributes, to each device, the master key required for recording data on a recording medium or for playing back data from the recording medium 195.

Figure 11:
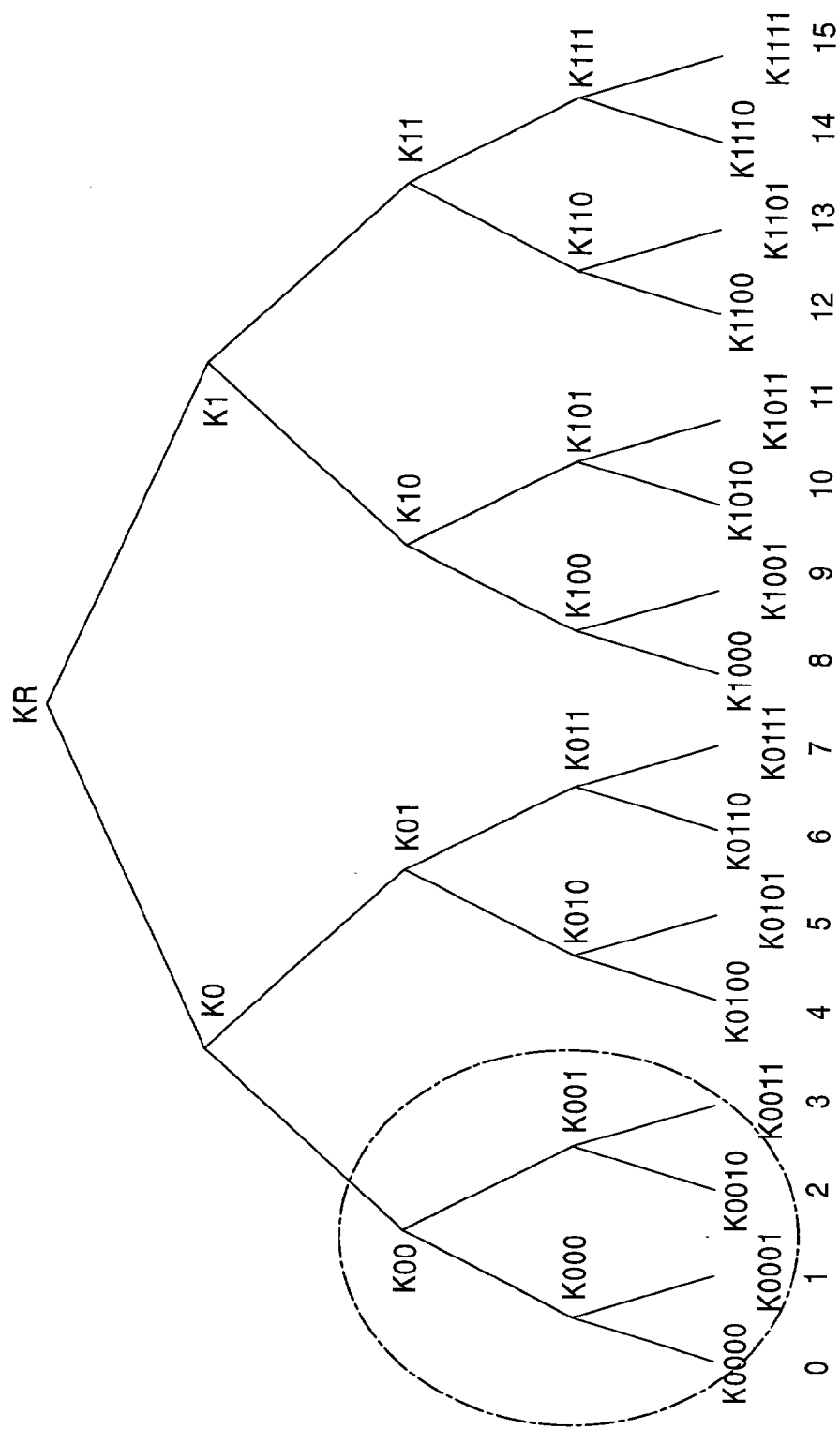
FIG. 11 is a tree structure chart illustrating encryption of keys as master key and media key for an information recording/playback device of the present invention.

FIG. 11 illustrates the distribution of a key for each recording/playback device in a recording system using the configuration. In FIG. 11, the numbers 0 to 15 shown at the bottom indicate recording/playback devices, respectively. The leaves of the tree structure shown in FIG. 11 correspond to the devices.

Each of the devices 0 to 15 stores node keys assigned to nodes from its leaf as a node to the root, and a leaf key corresponding to its leaf. The alphanumeric representations K0000 to K1111 shown in the bottom of FIG. 11 are leaf keys assigned to the devices 0 to 15. In FIG. 11, the top node KR to the nodes K000 to K111 in the second row from the bottom are node keys.

In the tree structure shown in FIG. 11, for example, device 0 possesses leaf key K0000, and node keys K000, K00, K0, and KR. Device 5 possesses leaf key K0101, and node keys K010, K01, K0, and KR. Device 15 possesses leaf key K1111, and node keys K111, K11, K1, and KR. Although the tree structure shown in FIG. 11 includes only the sixteen devices 0 to 15 and has four levels and balanced symmetry, it may include more devices and a different number of levels in each portions of the tree.

The devices 0 to 15 as recording/playback devices include various types of recording/playback devices that use various types of recording media such as DVDs, CDs, MDs, and Memory Sticks (™). Also, it is possible that various application services coexist. The key distribution in FIG. 11 is applied to a configuration in different devices and different applications coexist.

In this system in which various devices and applications coexist, for example, the portion surrounded by the dotted line in FIG. 11, specifically, devices 0, 1, 2, and 3 are treated as a group using a single recording medium. To devices 0, 1, 2, and 3 included in this group, a process of simultaneously sending by a provider a common content in an encrypted form, a process of sending a master key for use in common, and a process of outputting content-charge-payment data in an encrypted form from each device to a provider are performed. An authority that transmits/receives data to/from each device, such as a content provider or a settlement authority, treats the portion surrounded by the dotted line in FIG. 11 as one group and performs simultaneous data-transmission processing. Similar groups exist in the tree in FIG. 11.

Node keys and leaf keys may be controlled by a single key, or may be controlled for each group by an authority that transmits/receives data to/from each group, such as a provider or a settlement authority. These node keys and leaf keys are updated, for example, when a leak of a key occurs, and the process of updating is executed by a key-control center, a provider, a settlement authority, etc.

As is clear from FIG. 11, in the tree structure, the three devices 0, 1, 2, and 3 included in one group possess common keys K00, K0, and KR as node keys. By using this node-key sharing system, for example, a common master key can be provided to a limited number of devices 0, 1, 2, and 3. For example, by using node key K00 itself, which is possessed in common, as a master key, only devices 0, 1, 2, and 3 can use the master key in common without receiving a new key. In addition, by distributing, to devices 0, 1, 2, and 3, code Enc(K00, $K_{master}$) obtained by encrypting new master key $K_{master}$ using node key K00 via a network or by using a recording medium containing the value, only devices 0, 1, 2, and 3 decrypt code Enc(K00, $K_{master}$) with shared master key K00, which is possessed by them, and can obtain $K_{master}$. Data obtained by using $K_a$ to encrypt $K_b$ is represented by Enc($K_a$, $K_b$).

When it is discovered at time "t" that the keys of device 3, K0011, K001, K00, K0, and KR have been analyzed and exposed by a hacker, device 3 must be cut off from the system in order to protect data transmitted and received in the system (the group of devices 0, 1, 2, and 3) after time "t". Accordingly, node keys K001, K00, K0, and KR must be updated to generate new keys K(t)001, K(t)00, K(t)0, K(t)R, respectively, and the new keys must be posted to devices 0, 1, 2, and 3. Here, K(t)aaa represents an updated key in generation "t" of key Kaaa.

A process for distributing the updated keys is described below.

Key updating is performed by distributing, to devices 0, 1, and 2, a table formed by block data called an "enabling key block (EKB)" (shown in FIG. 12A), for example, via a network or by using recording media containing the table.

In the enabling key block shown in FIG. 12A, only devices in which node keys must be updated are shown as block data having an updatable data arrangement. The example shown in FIG. 12A is block data formed for the purpose of distributing updated node keys in generation "t" in connection with devices 0, 1, and 2 in the tree structure in FIG. 11. As is clear from FIG. 11, devices 0 and 1 need K(t)00, K(t)0, and K(t)R as updated keys, device 2 needs K(t)001, K(t)00, K(t)0, and K(t)R as updated keys.

As the enabling key block in FIG. 12A shows, the enabling key block includes a plurality of encryption keys. The bottom encrypted key is Enc(K0010, K(t)001). This is updated node key K(t)001 obtained by performing encryption using leaf key K0010 of device 2. Device 2 can obtain K(t)001 by using its own leaf key to decrypt encrypted key Enc(K0010, K(t)001). By using K(t)001 obtained by decryption, the second encrypted key Enc(K(t)001, K(t)00) from the bottom in FIG. 12A can be decrypted. This makes it possible to obtain updated node key K(t)00.

Similarly, by decrypting the second encrypted key Enc(K(t)00, K(t)0) from the top in FIG. 12A, updated node key K(t)0 can be obtained. By decrypting the first encrypted key Enc(K(t)0, K(t)R) from the top in FIG. 12A, K(t)R can be obtained.

In the case of devices 0 and 1, node key K000 is not included in what to update. Necessary node keys are K(t)00, K(t)0, and K(t)R. In devices 0 and 1, by decrypting the third encrypted key Enc(K000, K(t)00), K(t)00 can be obtained.

Subsequently, by decrypting the second encrypted key Enc(K(t)00, K(t)0) from the top in FIG. 12A, updated node key K(t)0 can be obtained. By decrypting the top encrypted key Enc(K(t)0, K(t)R), K(t)R can be obtained.

By using the above operation, devices 0, 1, and 2 can obtain updated key K(t)R. The "INDEX" in FIG. 12A indicates the absolute address of a node key or a leaf key used as a decryption key.

In a case in which upper node keys K0 and K0 in the tree structure in FIG. 11 do not need to be updated, and only node key K00 must be updated, updated node key K(t)00 can be distributed to devices 0, 1, and 2 by using the enabling key block in FIG. 12B.

The enabling key block in FIG. 12B can be used in the case of distributing a new master key that is shared in a specified group. It is assumed as a specific example that devices 0, 1, 2, and 3 in the dotted-line group in FIG. 11 use certain recording media and need new common master key $K(t)_{master}$. Then, data Enc(K(t), $K(t)_{master}$) is distributed which is obtained by encrypting updated master key $K(t)_{master}$ with K(t)00 obtained by updating node key K00 common to devices 0, 1, 2, and 3. Thus, data Enc(K(t), $K(t)_{master}$) is distributed, as data that is not decrypted, to the devices of other groups, such as device 4.

In other words, devices 0, 1, and 2 can obtain master key $K(t)_{master}$ at time "t" by decrypting the above data using K(t)00 obtained by processing the enabling key block.

Distribution of Master Key Using Enabling Key Block

Figure 13:
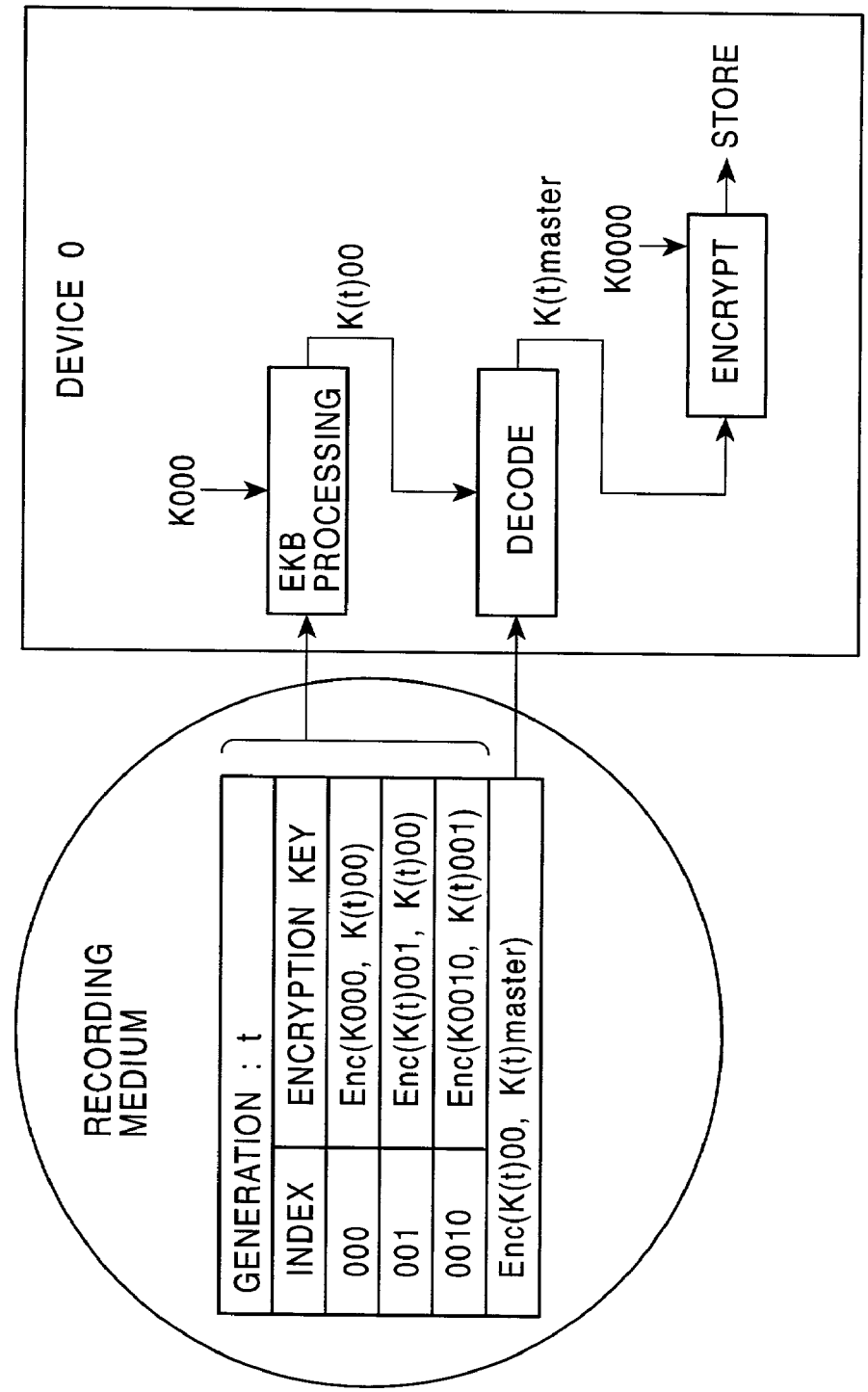
FIG. 13 is an illustration of the distribution and decryption by enabling key block of a master key in an information recording/playback device of the present invention.

FIG. 13 shows, as a processing example of obtaining master key $K(t)_{master}$ at time "t", processing of device 0 that receives, via a recording medium, data Enc(K(t)00, $K(t)_{master}$) obtained by using K(t)00 to encrypt new common master key $K(t)_{master}$, and the enabling key block shown in FIG. 12B. As shown in FIG. 13, device 0 generates node key K(t)00 by performing enabling-key-block processing similar to the above, using the enabling key block at time as a generation recorded on the recording medium. After decrypting updated master key $K(t)_{master}$ using decrypted updated node key K(t)00, device 0 encrypts the master key using its own leaf key K0000 and records the encrypted master key so that the master key can be used afterward. When device 0 can securely store updated master key $K(t)_{master}$, the encryption using leaf key K0000 is not required.

With reference to the flowchart shown in FIG. 14, a process for acquiring the updated master key is described below. It is assumed that the latest master key $K(c)_{master}$ is given to each recording/playback device when it is shipped and is stored in an internal memory securely (specifically, for example, in a form in which the given master key is encrypted using the device's leaf key).

When the recording medium that contains updated master key $K(n)_{master}$ and the enabling key block is loaded into the recording/playback device, in step S1401, the recording/playback device reads the time (generation) number "n" (represented by pre-recording generation information #n") of the recorded master key $K(n)_{master}$ from the recording medium. On the recording medium, the time (generation) number "n" of the recorded master key $K(n)_{master}$ is recorded beforehand. In step S1402, after reading self-retained encryption master key C, the recording/playback device compares the "generation c" of the encryption master key and the "generation n" of the pre-recording generation information, and determines the order of the generations.

In step S1402, if the recording/playback device has determined that "generation n" represented by pre-recording generation information #n does not follow (is not newer than) the "generation c" of encrypted master key C stored in the internal memory, in other words, when the "generation c" of encrypted master key C is identical to or follows "generation n" represented by pre-recording generation information #n, steps S1403 to S1408 are skipped and the master key updating process is terminated. In this case, the master key $K(c)_{master}$ stored in the internal memory is not updated since it does not need to be updated.

In step S1402, if the recording/playback device has determined that "generation n" represented by pre-recording generation information #n follows (is newer than) the "generation c" of encrypted master key C stored in the internal memory, in other words, when the "generation c" of encrypted master key C is older than "generation n" represented by pre-recording generation information #n, the recording/playback device proceeds to step S1403 and reads the enabling key block from the recording medium.

In step S1404, the recording/playback device calculates key K(t)00 of node K00 at pre-recording generation information #n by using the enabling key block read in step S1403, and the leaf key (K0000 in device 0 in FIG. 11) and the node keys (K000, K00, etc., in device 0 in FIG. 11) which are stored in the internal memory.

In step S1405, the recording/playback device determines whether it has obtained K(t)00 in step S1404. If the recording/playback device has not obtained K(t)00, it is indicated that the recording/playback device is revoked from the group in the tree structure that time. Accordingly, steps S1406 to S1408 are skipped and the master key updating process is terminated.

If the recording/playback device has obtained K(t)00, it proceeds to step S14606 and reads, from the recording medium, Enc(K(t)00, K(t)$_{master}$), which is a code obtained by using K(t)00 to encrypt the master key at time "t". In step S1407, the recording/playback device uses K(t)00 to decrypt the code and calculates K(t)$_{master}$.

In step S1408, in the recording/playback device, K(t)$_{master}$ is encrypted using its leaf key (K0000 in device 0 in FIG. 11) and is stored in the internal memory. After that, the master key updating process ends.

Although master keys are used in ascending order from the key at time (generation) zero (0), it is preferable that the master keys from the new generation to the older generation be structured by computation, as required by the component units of the system. In other words, the recording/playback device retains unidirectional "function f", and creates a desired master key by applying its own master key to the unidirectional "function f" a number of times which corresponds to the difference between the generation of the master key and the generation of the required master key.

Specifically, by way of example, when the generation of the master key MK stored in the recording/playback device is i+1, and the generation of the master key MK required for reading data is i–1, master key $K(i-1)_{master}$ is generated such that in the recording/playback device, unidirectional "function f" is used twice to calculate $f(f(K(i+1)_{master}))$.

When the generation of the master key MK stored in the recording/playback device is i+1, and the generation of the master key MK required for reading data is i–2, master key $K(i-2)_{master}$ is generated such that in the recording/playback device, unidirectional "function f" is used three times to calculate $f(f(f(K(i+1)_{master})))$.

In this operation, for example, the hash function can be used as the unidirectional "function f". Specifically, MD5 (Message Digest 5), SHA-1 (Secure Hash Algorithm-1), etc., can be employed. A key issuing authority uses these unidirectional functions to beforehand calculate master keys by which generations older than their generations can be formed, namely, $K(0)_{master}$, $K(1)_{master}$, $K(2)_{master}$, ..., $K(N)_{master}$. Specifically, initially, by setting N-generating master key $K(N)_{master}$, and applying the unidirectional function to master key $K(N)_{master}$ for each time, older generation master keys, $K(N-1)_{master}$, $K(N-2)_{master}$, ..., $K(1)_{master}$, $K(0)_{master}$ are sequentially generated. After that, the generated master keys are used in sequence from smaller generation master key $K(0)_{master}$. It is assumed that unidirectional function that is used to generate master keys having generations older than the generation of a master key be set in all recording/playback devices.

Also, for example, public key cryptosystem technology can be used as a unidirectional function. In this case, a key issuing authority possesses a secret key for a public key cryptosystem and provides a public key corresponding to the secret key to all reproducing devices. The key issuing authority sets zero-th generation master key $K(0)_{master}$, and begins to use $K(0)_{master}$. Specifically, when requiring master key $K(i)_{master}$ subsequent to the first generation, the key issuing authority generates and uses master key $K(i)_{master}$ by using the secret key to convert master key $K(i-1)_{master}$ which is older one generation. In this case, the key issuing authority does not need to generate an N-th generation master key beforehand by using the unidirectional function. According to this method, theoretically, master keys of a limitless number of generations can be generated. If each recording/playback device retains a master key of a generation, it can obtain a master key of a generation older than the generation by using a public key to convert the master key.

Figure 15:
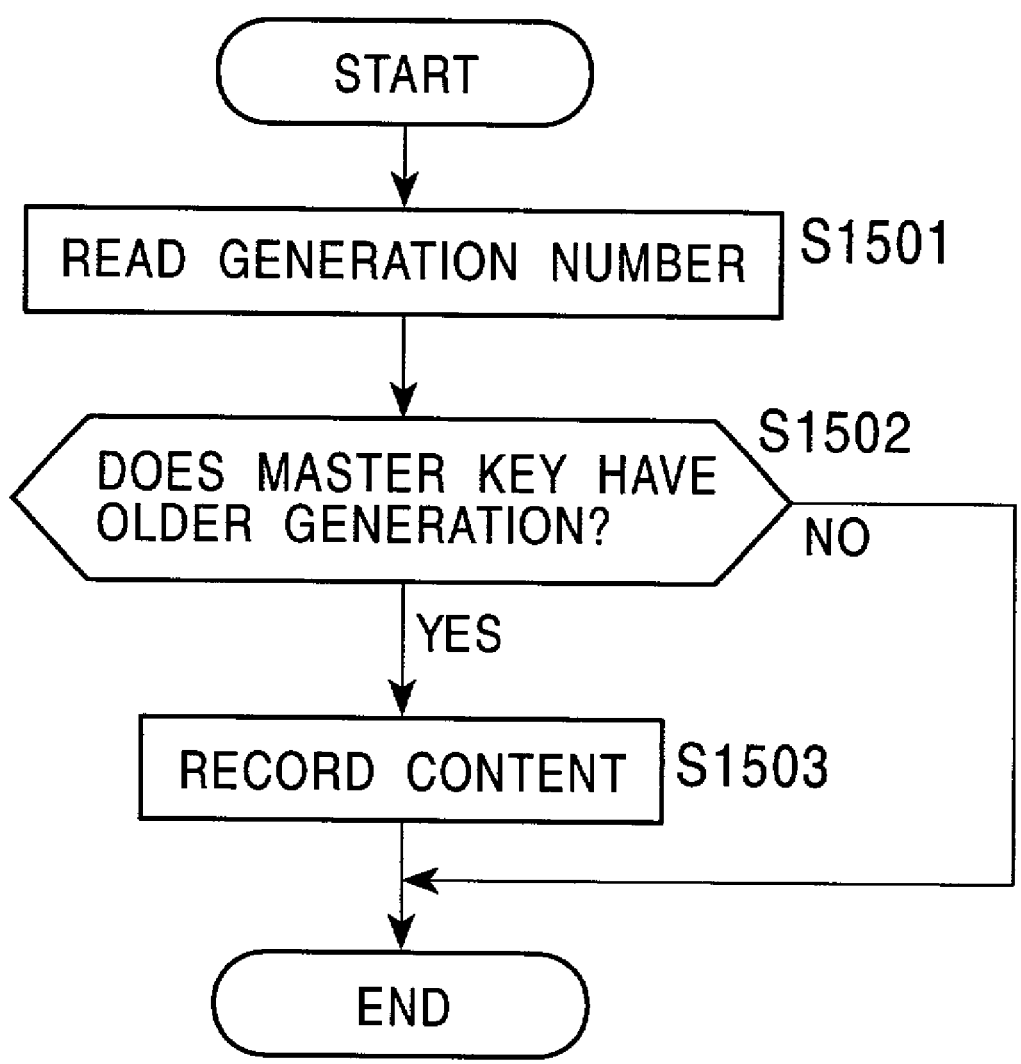
FIG. 15 is a flowchart showing a process for comparing the generations of a master key in content recording processing in an information recording/playback device of the present invention.

Next, with reference to the flowchart shown in FIG. 15, a process by the recording/playback device is described below which is performed when the recording/playback device records a content on its own recording medium.

Content data is encrypted using a master key of a generation and is distributed from a content provider to each recording/playback device via a network or using recording media.

In step S1501, the recording/playback device reads pre-recording generation information #n from the recording medium. The recording/playback device also acquires the "generation c" of encrypted master key C stored in its own memory.

In step S1502, the recording/playback device compares the "generation c" of the encrypted master key C and "generation n" represented by pre-recording generation information #n, and determines the order of the generations.

In step S1502, if the recording/playback device has determined that the "generation c" of encrypted master key C stored in its own memory does not follow "generation n" represented by pre-recording generation information #n, in other words, when the "generation c" of encrypted master key C stored in its own memory is older than "generation n" represented by pre-recording generation information #n, the recording/playback device skips over step S1503 and does not perform a content data recording process In step S1502, if the recording/playback device has determined that the "generation c" of encrypted master key C stored in its own memory follows "generation n" represented by pre-recording generation information #n, in other words, when the "generation c" of encrypted master key C stored in its own memory is identical to or newer than "generation n" represented by pre-recording generation information #n, the recording/playback device goes to step S1503 and performs the content data recording.

Content Data Encryption and Recording Processing Using Generation-Controlled Master Keys A process in which a recording/playback device performs encryption of content data using generation-controlled master keys and records the encrypted data on its own recording medium is described below. Here, a process is described in which a block key is generated based on data using the generation-controlled master key, and data composed of the above transport stream is encrypted using the block key and is stored on a recording medium.

With reference to the block diagrams shown in FIGS. 16 and 17, and the flowchart shown in FIG. 18, the above process is described below.

An optical disk is used as an example of a recording medium. In the embodiment shown in FIGS. 16 to 18, in order to prevent the copying of data on the recording medium bit by bit, disk ID that is identification information unique to the recording medium is controlled to operate on a key for encryption of data.

In accordance with FIGS. 16 and 17, an outline of data-encryption processing performed by the cryptosystem unit 150 is described below.

A recording/playback device 1600 reads a master key 1601, an analyzing data-recording key (hereinafter referred to as a "cognizant key") 1631 or a non-analyzing data-recording key (hereinafter referred to as a "noncognizant key") 1632, which are stored in an internal memory like the memory 180 (FIG. 1 or 2). The cognizant key 1631 and the non-cognizant key 1632 are described later.

Figure 14:
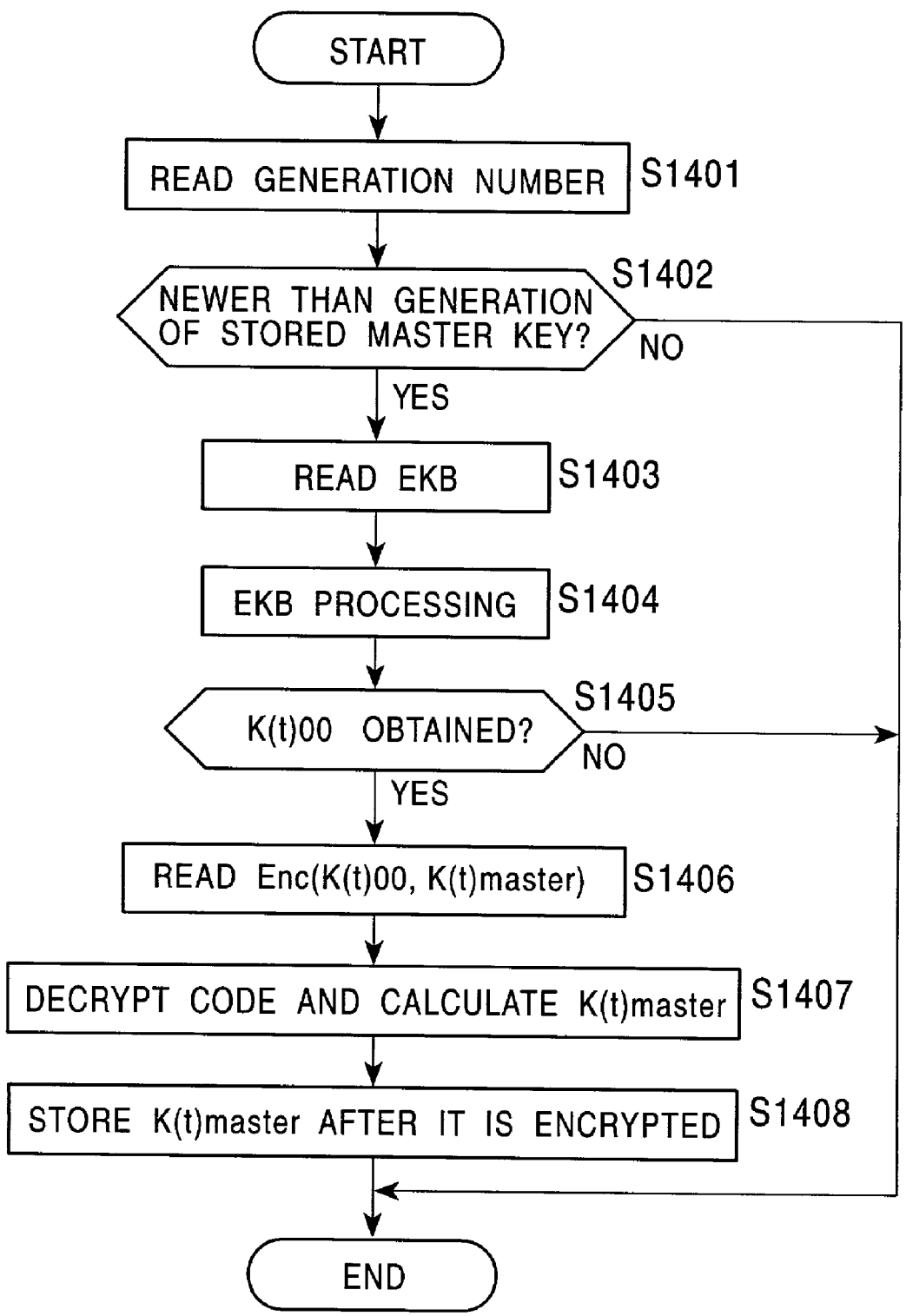
FIG. 14 is a flowchart showing a process for decryption by enabling key block of a master key in an information recording/playback device of the present invention.

The master key 1601 is a secret key stored in the memory of the recording/playback device 1600 as shown in the flow of FIG. 14. The generation of the master key 1601 is controlled as described above, and a generation number is correlated with each generation. The master key 1601 is a key used in common in a plurality of recording/playback devices, for example, a key common to devices 0 to 3 belonging to the dotted-line group shown in FIG. 11. A device ID is the identifier of the recording/playback device 1600 and is an identifier stored beforehand therein, such as a serial number in production. The device ID may be open to the public. The cognizant key 1631 and the non-cognizant key 1632 correspond to recording modes, respectively, and are common to a plurality of recording/playback devices. These keys are stored beforehand in the memory of the recording/playback device 1600.

The recording/playback device 1600 checks the recording medium 1620 as an optical disk about whether the disk ID 1603 as identification information has already been recorded. If the disk ID 1603 has been recorded, the recording/playback device 1600 reads the disk ID 1603 (FIG. 16). If the disk ID 1603 has not been recorded, a disk ID 1701 is generated randomly or by a predetermined method such as random number generation by an cryptosystem unit 150, and is recorded on the recording medium (FIG. 17). The disk ID 1603 can be stored in a lead-in area or the like since the disk needs to have one disk ID.

The recording/playback device 1600 generates a disk unique key 1602 by using the master key 1601, a stamper ID 1680 that is recorded as secret information readable from the disk only in a special reading method, and the disk ID 1603.

Figure 19A:
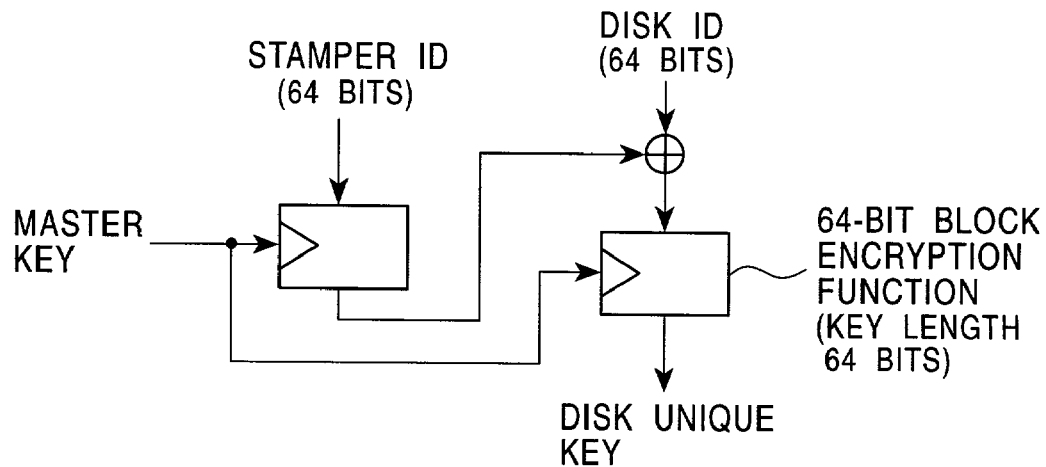
FIGS. 19A and 19B are illustrations of the generation of disk unique keys in an information recording/playback device of the present invention.
Figure 19B:
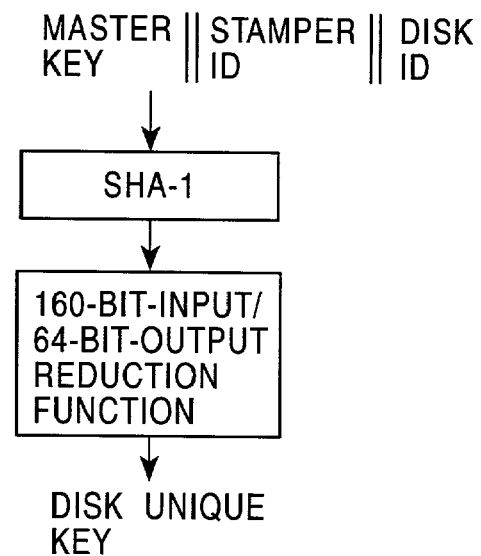

The following two methods shown in FIG. 19 can be used as specific methods for generating the disk unique key 1602 by using the master key 1601, the stamper ID 1680 as secret information, and the disk ID 1603. In one method (example 1), the master key 1601, the stamper ID 1680, and the disk ID 1603 are input to a hash function using a block encryption function, and the obtained result is used. In another method (example 2), data which is obtained by the bit concatenation of the master key 1601, the stamper ID 1680 as secret information, and the disk ID 1603 is input to hash function SHA-1 defined in Federal Information Standard Publication (FIPS PUB) 180-1, and from the resultant 160-bit output, a necessary data length is used as the disk unique key 1602.

As described above, the stamper ID 1680 is highly secret information recorded on the disk. Arithmetic processes, such as the reading of the stamper ID 1680, and the generation of the disk unique key 1602 by using the stamper ID 1680, are executed inside the cryptosystem unit 150 so that secrecy is maintained. In other words, the secret information read from the disk is securely protected in the cryptosystem unit 150.

In the present invention, secret information that can be read by only a special reading method is read by only an appropriate device, that is, a device capable of reading the secret information. Under secure protection, the secret information is used for the process of generating keys for encrypting contents in, for example, a cryptosystem unit which is mounted in an LSI and which performs the generation of a highly protected cryptographic key, so that the secret information is not stored in an externally readable memory. Accordingly, there is no possibility that the secret information leaks, and playback of abnormal contents can be effectively prevented.

As described above, secret information such as a stamper ID is written in a disk in a manner different from an ordinary data writing technique, and can be read in a technique different from ordinary data reading. The processes of writing and reading the secret information are described later.

In the recording/playback device 1600, the cryptosystem unit 150 (see FIG. 1 or 2) generates a title key 1604 as a unique key for each time of recording, randomly or by a predetermined method such as random number generation, and records the title key 1604 on the disk 1620.

After that, a flag 1633 that indicates which of a cognizant mode or a non-cognizant mode is set as a recording mode 1635, and the recording mode 1635 is recorded on the disk 1620.

Here, the cognizant mode and the non-cognizant mode are described below.

In each content, whether or not the content can be copied under what conditions is designated beforehand by a content provider. Accordingly, in network connection, the designated conditions must be correctly posted from a device to another device. In the DTCP system, a method using copy control information is used to solve this problem. Concerning copy control information, there are two types of transmission techniques in accordance with device performance.

"Encryption Mode Indicator (EMI)" is a mechanism in which the two upper Sy bits in a packet header are used to send copy control information. By using this mechanism, a receiver device can easily perform accessing, and a content can be securely sent because the value of the Encryption Mode Indicator acts on a key for encrypting the content.

The Encryption Mode Indicator is used to indicate the encryption mode of the packet, and the generation modes of content encryption and decryption keys are designated. By disposing the Encryption Mode Indicator in an IEEE 1394 packet header, a receiver device is allowed to easily know the type of a mode for encryption of the content, for example, without extracting an embedded copy control information (described later) in an MPEG transport stream.

Figure 20:
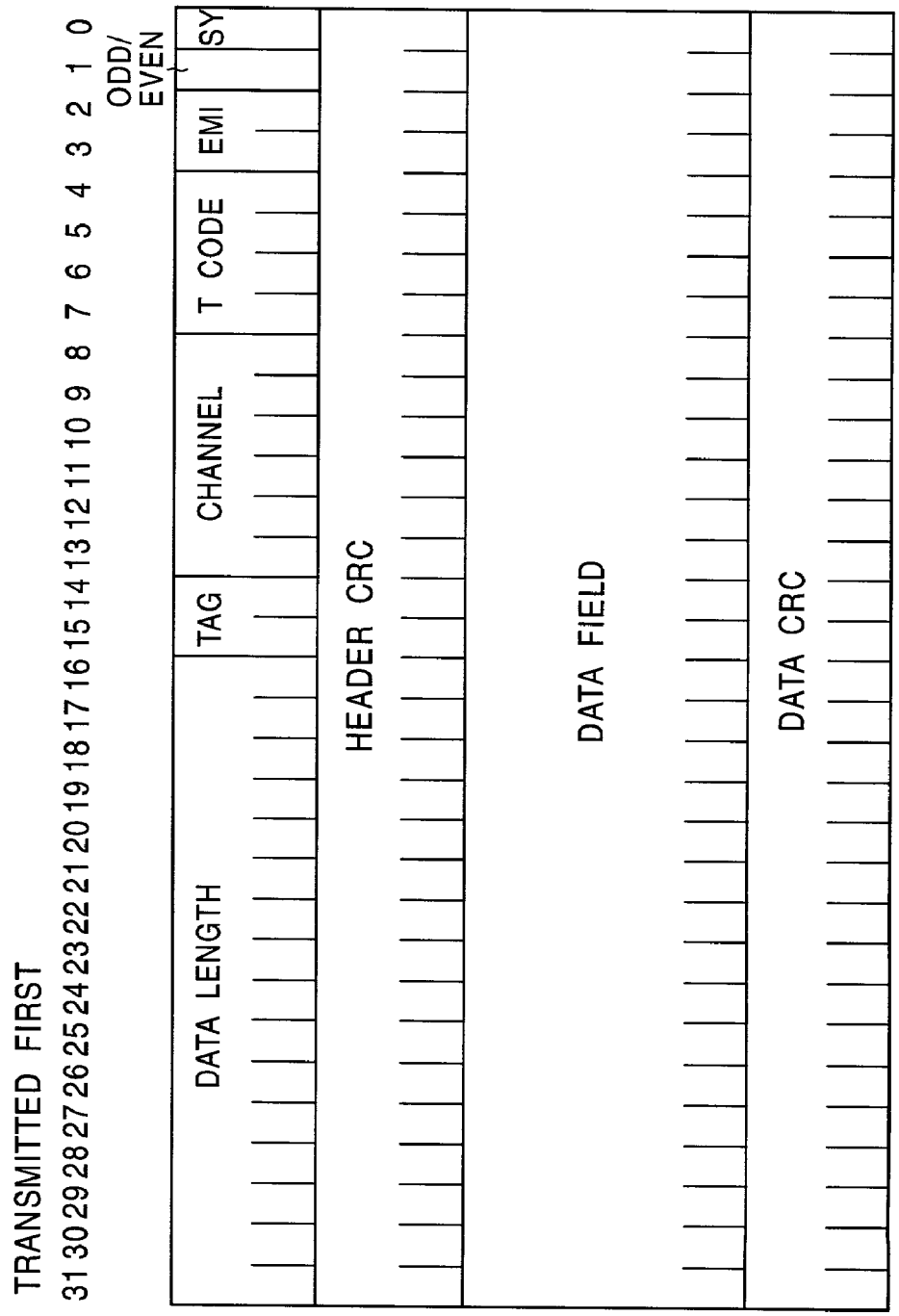
FIG. 20 is an illustration of the position of an Encryption Mode Indicator stored in an IEEE 1394 packet for transmission which is processed in an information recording/playback device of the present invention.

FIG. 20 shows an IEEE 1394 packet format. In "Data Field", various types of contents, such as music data and image data, are stored. The Encryption Mode Indicator (EMI) as copy control information is set as two upper Sy bits in a packet header.

The 2-bit EMI information defines a different type of treatment in accordance with the set value. Specifically, value "00" is "Copy Free" indicating that neither authentication nor encryption is not required and that a content may be freely copied. Value "01" is "Copy One Generation" indicating that 1-generation copying may be performed. Value "10" is "No More Copies" indicating that, after the above Copy One Generation is recorded once, recopying is inhibited. Value "11" is "Never Copy" indicating that the copying of a content is inhibited from the release thereof.

In the non-cognizant recording mode, in order that a bit stream recorder, such as D-VHS or hard disk, which does not recognize the format of data to be recorded may correctly treat copyrighted material, it is only necessary to update the Encryption Mode Indicator, without requiring the updating (e.g., Copy One Generation to No More Copies) the embedded copy control information when content recording is performed.

Conversely, in a format (e.g., DV-format) in which an area for sending copy control information is reserved, the copy control information can be sent as part of a content. Copy control information that is embedded as part of the content, as described above, is called "embedded copy control information". Normally, when a content is encrypted and transferred, embedded copy control information is similarly encrypted and transferred. It is considered that an intentional change of the embedded copy control information is difficult.

Here, in the case of a content having both the above 2-bit EMI copy control information and the embedded copy control information, a recording device that performs content recording updates the two types of copy control information, namely, both the Encryption Mode Indicator and the embedded copy control information. However, in the case of a recording device that does not have ability to analyze the embedded copy control information, the Encryption Mode Indicator is updated but the embedded copy control information is not updated.

A recording technique in which in a content recording mode, after updating embedded copy control information transmitted as part of a content, a recording device records the content with the updated embedded copy control information, is called a "cognizant mode". In comparison between the cognizant mode and the non-cognizant mode, the non-cognizant mode causes a small load and can be easier employed because the updating of the embedded copy control information does not need to be performed. However, the DTCP has a rule in which in order that a device may perform MPEG decoding of a content and may output a video signal from an analog terminal, the device must employ the cognizant mode. Accordingly, a device having a decoding/display function must have a function of executing the cognizant mode.

In addition, in order to execute the cognizant mode, it is necessary to completely know the position and meaning of the embedded copy control information which is embedded as part of the content. For example, concerning a new or updated data format established after a certain device goes on the market, an old device may have a great difficulty in executing the cognizant mode in the new or updated data format.

Accordingly, it is possible that, for a specified data format or implementing a specified function, a content recording device execute the cognizant mode, while for recording a content having a different data format, the content recording device execute the non-cognizant mode.

There is a type of device that only performs recording using the non-cognizant mode for all contents. Conversely, there may be a type of device that only executes processing for contents having formats capable of understanding embedded copy control information, in other words, a type of device that only executes the cognizant mode.

As described above, in circumstances in which two type of copy control information, namely, Encryption Mode Indicator and embedded copy control information exist, and both a device that executes the cognizant mode and a device that executes the non-cognizant mode exit, it is preferable to distinguish between a content recorded in the cognizant mode and a communication network recorded in the non-cognizant mode.

In other words, when the cognizant mode is used to perform content recording, both types of copy control information, namely, Encryption Mode Indicator and embedded copy control information are updated, but when the non-cognizant mode is used to perform content recording, only Encryption Mode Indicator is updated and embedded copy control information is not updated. As a result, mismatching occurs between the Encryption Mode Indicator and the embedded copy control information recorded on a recording medium, and the mismatched Encryption Mode Indicator and embedded copy control information mix to cause confusion. That is why the distinction of the contents is preferable. Therefore, in order to prevent the two types of copy control information from being mismatched, for the content recorded in the cognizant mode, cognizant-mode recording/playback processing must be executed, and for the content recorded in the non-cognizant mode, non-cognizant-mode recording/playback processing must be executed.

Accordingly, one idea is that the cognizant mode and the non-cognizant mode are treated as separate recording modes. In this case, in order for a device to selectively execute both modes, the device must have processing configurations for executing both modes. This causes a problem in that the cost of the device is increased.

According to the present invention, in accordance with either the cognizant mode or the non-cognizant mode, by generating a content-encryption key which is different from that used in the other mode, the two recording modes can be distinguished in accordance with the device and the recording mode used for recording the content, and a situation can be eliminated in which recording is performed with the two modes used in disorder. This implements a content processing configuration using either recording mode in accordance with the device and the recording mode used for recording the content, without increasing the configuration and processing load of the device.

Specifically, an encryption/decryption-key generating key (cognizant key) as secret information (necessary for playback) for cognizant-mode recording is provided and stored in only a device having a function of recording or playback using the cognizant mode, and an encryption/decryption-key generating key (non-cognizant key) as secret information (necessary for playback) for cognizant-mode recording is provided and stored in only a device having a function of recording or playback using the non-cognizant mode.

In this construction, concerning, for example, a content recorded using the cognizant mode, a device that has only a non-cognizant-mode recording/playback function can be prevented from executing, by a bug, manipulation of data, or unauthorized change of recording/playback program, mistaken or dishonest recording/playback.

Referring back to FIGS. 16 and 17, the description of the content recording processing is continued.

The recording/playback device 1600 further acquires the generation number of the master key for use, namely, the generation number (generation #n) 1650 of the master key to be stored by itself, and stores the acquired generation number as a recording-mode generation number 1651 on the recording medium 1620.

On the recording medium 1620 as a disk, there is a data management file that stores information about which data forms which title. In the data management file, a title key 1605, the recording mode flag 1635, and the recording-mode generation number 1651 can be stored.

On the recording medium 1620, pre-recording-mode generation numbers are recorded beforehand. Only each content stored after being encrypted using a master key of a generation which is identical to a pre-recording-mode generation number or is newer than the pre-recording-mode generation number can be played back. This construction is described in playback processing described later.

Next, among combinations, namely, a combination of a disk unique key and a title key, and combinations of a cognizant key or a disk unique key, the title key, and the non-cognizant key, any combination is used to generate a title unique key.

Specifically, when the recording mode is the cognizant mode, the disk unique key, the title key, and the cognizant key are used to generate the title unique key. When the recording mode is the non-cognizant mode, the disk unique key, the title key, and the non-cognizant key are used to the title unique key.

As described above, the encryption/decryption-key generating key (cognizant key) as secret information for cognizant-mode recording is stored in only the device having the function of recording or playback using the cognizant mode, while the encryption/decryption-key generating key (non-cognizant key) as secret information for cognizant-mode recording is stored in only the device having a function of recording or playback using the non-cognizant mode. Accordingly, in a device adapted for either recording mode, either recording mode is selected and content recording is executed. In other words, the use of the recording mode is limited to either the use of the cognizant key or the user of the non-cognizant key.

In the case of a device in which both keys are stored and both recording modes can be executed, a process is required which determines whether either recording mode should be executed. This mode determination process, that is, a process for determining whether the cognizant mode or the non-cognizant mode is used to perform content recording is described below with reference to FIG. 21.

Basically, it is preferable to perform content recording by the cognizant mode if possible. This is, as described above, because Encryption Mode Indicator and embedded copy control information are prevented from being mismatched. However, there is a possibility that a data analysis error, etc., occurs due to emergence of a new data format, etc., as described above. In such a case, recording using the non-cognizant mode is executed.

Figure 21:
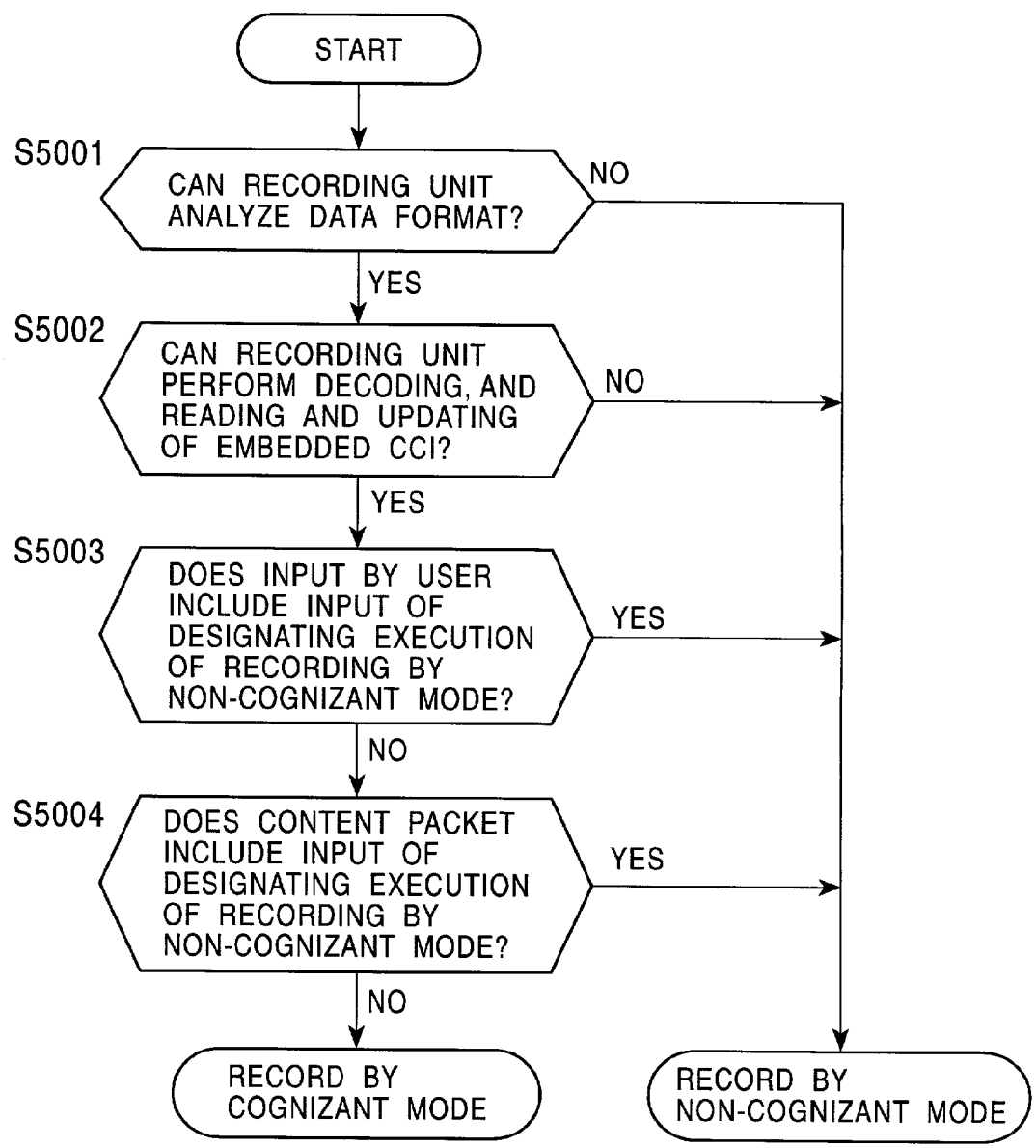
FIG. 21 is a flowchart illustrating a process of determining which of a cognizant mode and a non-cognizant mode should be used for executing content recording in an information recording/playback device of the present invention.

Each step in FIG. 21 is described below.

In step S5001, a recording device determines whether it can analyze a data format. As described above, embedded copy control information is embedded in a content, and impossibility of the data format analysis indicates that the reading of the copy control information is impossible. In this case, recording using the non-cognizant mode is executed.

When the data format analysis is possible, the recording device proceeds to step S5002, and determines whether it can perform data (content) decoding, the reading of embedded copy control information, and updating. The content and the embedded copy control information are normally encoded, so that the reading of the embedded copy control information requires the execution of decoding. For example, in a case in which the device cannot perform decoding processing for the reason that a decoding circuit has already been used when multichannel simultaneous recording is performed, the embedded copy control information cannot be read, so that recording using the non-cognizant mode is executed.

In step S5002, if the recording device has determined that it can perform data (content) decoding, the reading of embedded copy control information, and updating, in step S5003, the recording device determines whether or not an input to the recording device by a user includes an input designating the execution of recording using the non-cognizant mode. Step S5003 is a step that is executed in only a device in which mode selection designated by the user can be performed, and is not executed in an ordinary device, that is, a device that does not allow the user to designate a mode. When the user inputs designation of the non-cognizant mode, recording using the non-cognizant mode is executed.

In step S5004, the recording device determines whether or not a content packet (e.g., received data) includes designation of executing recording using the non-cognizant mode. If the determination is affirmative, recording using the non-cognizant mode is executed. If the determination is negative, recording using the cognizant mode is executed.

In the device that can selectively execute recording using the cognizant mode and recording using the non-cognizant mode, the above-described mode determination process is used to determine the execution of recording using either mode. However it is understood from FIG. 21 that when recording using the cognizant mode is possible, recording using the cognizant mode is basically executed.

As described above, when the cognizant mode is used as the recording mode, the disk unique key, the title key, and the cognizant key are used to generate the title unique key, while when the non-cognizant mode is used the recording mode, the disk unique key, the title key, and the non-cognizant key are used to generate the title unique key.

Figure 22A:
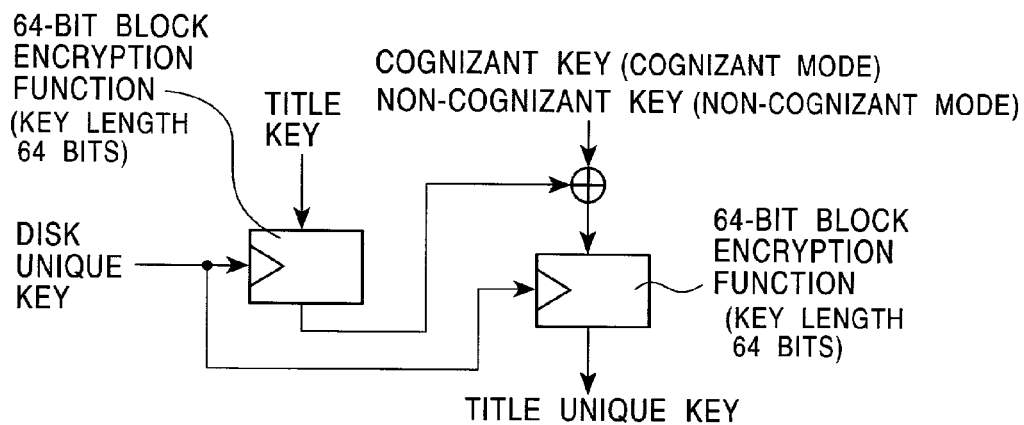
FIGS. 22A and 22B are illustrations of the generation of title unique keys in the recording of data in an information recording/playback device of the present invention.
Figure 22B:
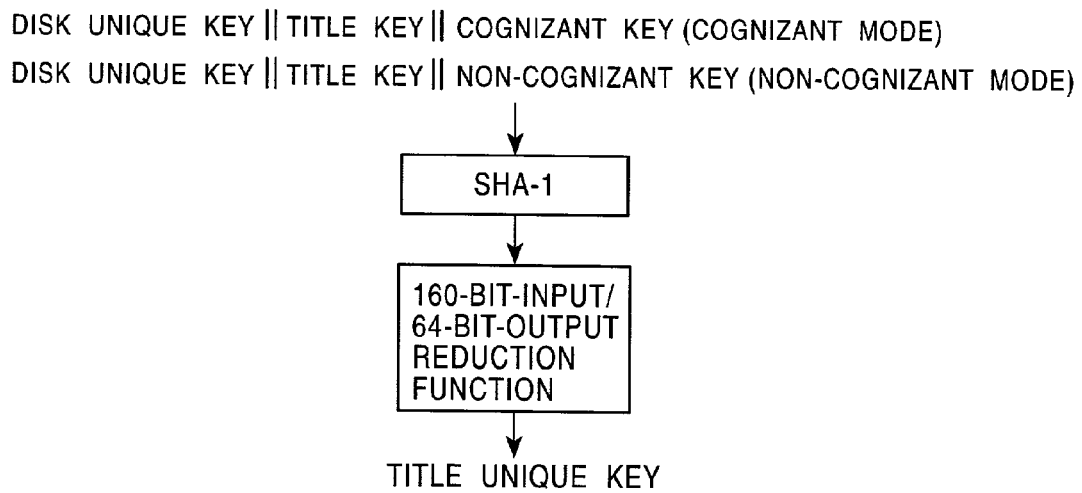

FIG. 22 shows specific methods for generating the title unique key.

One method (example 1) uses a result obtained by inputting, to a hash function using a block encryption function, the title key, the disk unique key, and the cognizant key (in the case of the cognizant mode) or the non-cognizant key (in the case of the non-cognizant key).

In another method, after inputting, to hash function SHA-1 defined in FIPS PUB 180-1, data generated by the bit concatenation of the master key, the disk ID, and the cognizant key (in the case of the cognizant mode) or the non-cognizant key (in the case of the non-cognizant key), only a necessary data length in the resultant 160-bit output is used as the title unique key.

In the above description, the master key, the stamper ID, and the disk ID are used to generate the disk unique key, and the disk unique key, and either the cognizant key or the non-cognizant key are used to generate each title unique key. However, without using the disk unique key, by using the master key, the disk ID, the title key, and either the cognizant key or the non-cognizant key, the title unique key may be directly generated. Also, without using the title key, by using the master key, the disk ID, and either the cognizant key or the non-cognizant key, a key corresponding to the title unique key may be generated.

By way of example, when one of transmission formats defined in the above DTCP is used, there is a case in which data is transmitted by TS packets in MPEG-2. For example, when a set-top box (STB) which receives a satellite broadcast uses the DTCP to transmit the broadcast to a recording device, it is preferable that the STB send MPEG-2 TS packets transmitted via the satellite broadcast link, also on the IEEE 1394 because data conversion does not need to be performed.

The recording/playback device 1600 receives content data to be recorded in the form of TS packets, and uses the TS processing unit 300 to add an arrival time stamp, which is information on the reception time of each TS packet. As described above, the block seed which is added to the block data may be formed by a combination of the arrival time stamp, the copy control information, and other information.

By arranging X (e.g., 32) ATS-added TS packets, one block of block data is formed (see the upper image in FIG. 5). As shown in FIG. 16 or 17, from a block seed having a 32-bit arrival time stamp, which is output by separating (selector 1608) the first to fourth bytes of the start of the block data input as data to be encrypted, and the already generated title unique key, a block key as a key for encrypting the data of the block data is generated (1607).

FIG. 23 shows two methods for generating the block key. In each method, from a 32-bit block seed and a 64-bit title unique key, a 64-bit block key is generated.

In the upper example 1, an encryption function is used which has a key length of 64 bits and an input/output length of 64 bits. A title unique key is used as a key for the encryption function, and a result that is obtained by inputting to the encryption function a concatenation value of a block seed and a 32-bit constant is used as a block key.

In the lower example 2, hash function SHA-1 defined in FIPS PUB 180-1 is used. Reduced data having 64 bits is used as a block key. For example, a concatenation value of a title unique key and a block seed is input to hash function SHA-1, and from the resultant 160-bit output, only lower-64-bit part is used.

Using FIG. 23, examples in which the disk unique key, the title unique key, and the block key are generated have been described. However, without executing the generation of the disk unique key and the title unique key, the block key may be generated by using, for each block, a master key, a stamper ID, a disk ID, a title key, a block seed, and a cognizant key (in the case of the cognizant mode) or a non-cognizant key (in the case of the non-cognizant mode).

After the block key is generated, the generated block key is used to encrypt block data. As the bottom of FIGS. 16 and 17 shows, the initial first to m-th (e.g., m=8) bytes of the block data including the block seed are separated (by a selector 1608) and are not encrypted. The (m+1)th byte to the final byte are encrypted (1609). The m bytes that are not encrypted include the first to fourth bytes as a block seed. The block data after the (m+1)th byte which is separated by the selector 1608 are encrypted (1609) in accordance with an encryption algorithm preset in the cryptosystem unit 150. For example, the Data Encryption Standard (DES) defined in FIPS 46-2 can be used as the encryption algorithm.

As described above, the block seed may include copy control information. Accordingly, when recording using the cognizant mode is executed, copy control information that corresponds to embedded copy control information, which is embedded in content data, is recorded. When recording using the non-cognizant mode is executed, copy control information that reflects the Encryption Mode Indicator (EMI) in the packet header in FIG. 20 is recorded.

In other words, in the case of information recording processing using the cognizant mode, record-information generating processing is executed in which a block seed including copy control information based on embedded copy control information in data part is added to a block data composed of at least one packet. In the case of information recording processing using the non-cognizant mode, record-information generating processing is executed in which a block seed including copy control information based on the Encryption Mode Indicator as copy control information included in a packet is added to a block data composed of at least one packet.

Here, when the block length (input/output data size) of an encryption algorithm for use is eight bytes as in the DES, by letting X be 32, and m be a multiple of 8, the entire block after the (m+1)-th byte can be encrypted without generating a fraction.

In other words, when assuming that the number of TS packets to be stored in one block is x, the input/output data size of the encryption algorithm is L bytes, and n is an arbitrary natural number, by determining X, m, and L so that $192*X=m+n*L$ can hold, the need for fraction processing is eliminated.

The encrypted block data after the (m+1)th byte is combined with the data of the first to m-th bytes by the selector 1610, and the combination is stored as encrypted content on the recording medium 1620.

In the above-described processing, in units of blocks, contents are encrypted using a block key generated based on a block seed including a generation-controlled master key and an arrival time stamp, and are stored on a recording medium.

As described above, according to the present invention, content data is encrypted using a generation-controlled master key, and is recorded on a recording medium. Thus, for enabling decoding or playback, it is conditioned that playback processing on the recording medium is performed by a recording/playback device having the generation of a master key which is at least identical to or newer than the generation of a master key used for recording data.

As described above, in the case of recording using the cognizant mode, the block key is generated based on the cognizant key, while in the case of recording using the non-cognizant mode, the block key is generated based on the non-cognizant key. The data encrypted using the modes can be read only by a device having a key (the cognizant key or the non-cognizant key) corresponding to a mode identical to that used for recording.

In other words, the cognizant key is supplied only to a device that can recognize and update embedded copy control information which is embedded in a stream when performing recording and to a device allowed to read the data. A device that does not have the cognizant key cannot read a content recorded using the cognizant mode.

Similarly, the non-cognizant key is supplied only to a device having a non-cognizant recording mode that does not recognize embedded copy control information in a stream when recording is performed and to a device allowed to read data recorded in the mode. A device that does not have the non-cognizant key is designed so as not to a content recorded using the non-cognizant mode. Details of the playback processing are described later.

Next, with reference to the flowchart shown in FIG. 18, both the arrival-time-stamp adding processing by the TS processing unit 300 and the encryption processing by the cryptosystem unit 150, which are executed in accordance with data recording processing, are described below.

In step S1801, the recording/playback device reads a master key and the cognizant key or the non-cognizant key from the memory 180. The recording/playback device reads a stamper ID from a disk as a recording medium.

In step S1802, the recording/playback device determines whether a disk ID has already been recorded as identification information on the disk. If the determination is affirmative, in step S1803, the disk ID is read. If the determination is negative, in step S1804, the disk ID is generated randomly or by a predetermined method, and is recorded on the recording medium. In step S1805, a master key and a stamper ID are used to generate a disk unique key. The disk unique key is found by applying, for example, a method using hash function SHA-1 defined in FIPS PUB 180-1, a method using a hash function based on block encryption, etc.

In step S1806, a title key is generated as a unique key for each time of recording, and is recorded on the disk, with the recording mode and the generation number of the master key. The recording mode represents a type of information recording mode, namely, either the cognizant mode or the non-cognizant mode.

In step S1807, a title unique key is generated by using the disk unique key, the title key, and the cognizant key (in the case of the cognizant mode) or the non-cognizant key (in the case of the non-cognizant mode).

Figure 24:
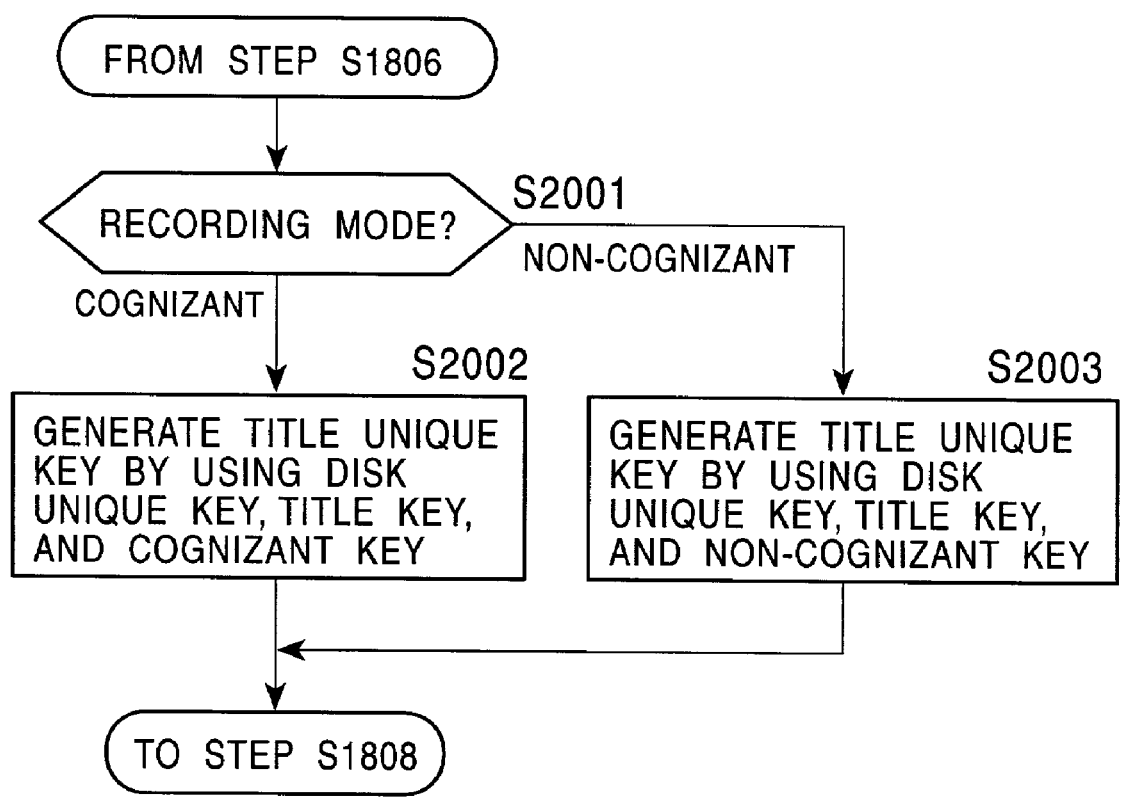
FIG. 24 is a flowchart illustrating a process for generating a title unique key in an information recording/playback device of the present invention.

FIG. 24 is a detailed flowchart showing the generation of the title unique key. In step S2001, the cryptosystem unit 150 proceeds to different steps depending the recording mode. This branching is determined based on the program of the recording/playback device and designation data input by a user of the recording/playback device.

In step S2001, if the cryptosystem unit 150 has determined that the recording mode is the cognizant mode, it proceeds to step S2002, and generates the title unique key by using the disk unique key, the title key, and the cognizant key.

In step S2001, if the cryptosystem unit 150 has determined that the recording mode is the non-cognizant mode, it proceeds to step S2003, and generates the title unique key by using the disk unique key, the title key, and the non-cognizant key. The title unique key is generated by using a method using hash function SHA-1 defined in FIPS PUB 180-1, and a method using a hash function based on block encryption.

In step S1808, the recording/playback device receives, in the form of TS packets, data to be encrypted of content data to be recorded. In step S1809, the TS processing unit 300 adds each arrival time stamp (ATS) as information on a time at which each TS packet is received. Alternatively, the TS processing unit 300 adds each value obtained by combining copy control information, an arrival time stamp, and other information.

In step S1810, the recording/playback device sequentially receives the ATS-added TS packets, and determines whether the received packets has reached, for example, X=32 which forms one block, or whether it has received identification data indicating the end of the packets. If either condition is satisfied, the recording/playback device goes to step S1811, and forms one block of block data by arranging X ATS-added TS packets or ATS-added TS packets up to the end packet.

In step S1812, the cryptosystem unit 150 generates a block key as an encryption key for encrypting the block data by using the first 32 bits (the block seed including the arrival time stamp) and the title unique key generated in step S1807.

In step S1813, the generated block key is used to the block data formed in step S1811. As described above, the encryption range is the (m+1)th byte to the end byte of the block data. The Data Encryption Standard defined in the FIPS 46-2 is applied to the encryption algorithm.

In step S1814, the encrypted block data is recorded on the recording medium. In step S1815, the recording/playback device determines whether all data have been recorded. If the determination is affirmative, the recording is terminated. If the determination is negative, the recording/playback device goes back to step S1808, and the remaining data is processed.

In accordance with the above process, the content recording processing is executed using the cognizant mode or the non-cognizant mode. When the content recording processing is executed by the cognizant mode, a key for use in content encryption is generated based on the cognizant key. When the content recording process is executed using the non-cognizant mode, a key for use in content encryption is generated based on the non-cognizant key. Accordingly, for the content recorded on the disk, it is required that a decryption key be generated by using either of the cognizant key and the non-cognizant key, or a single key. This can prevent recording and playback processing in which both modes are used.

Writing and Playback of Secret Information

Figure 16:
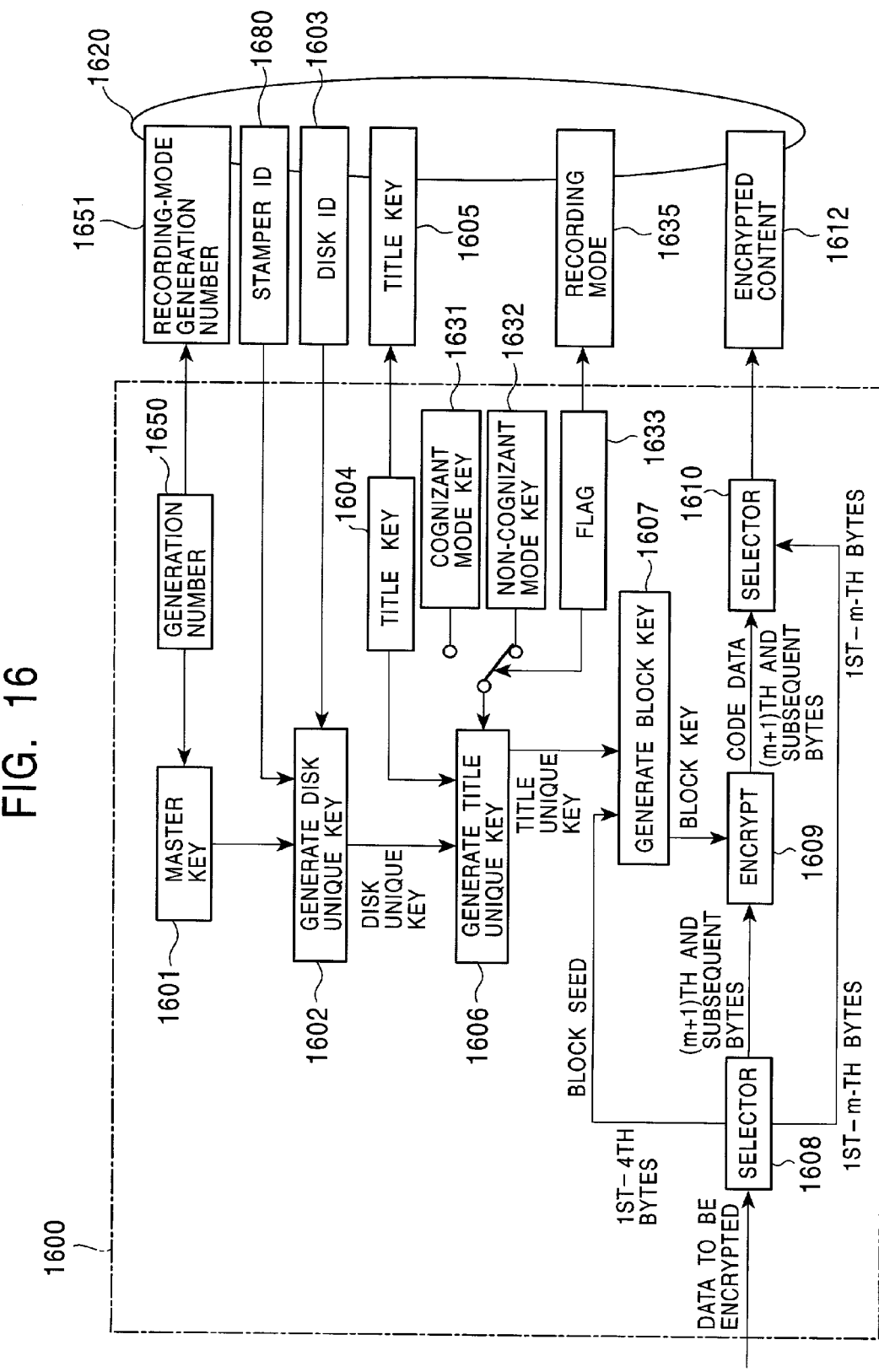
FIG. 16 is a block diagram illustrating encryption in data recording mode in an information recording/playback device of the present invention.
Figure 17:
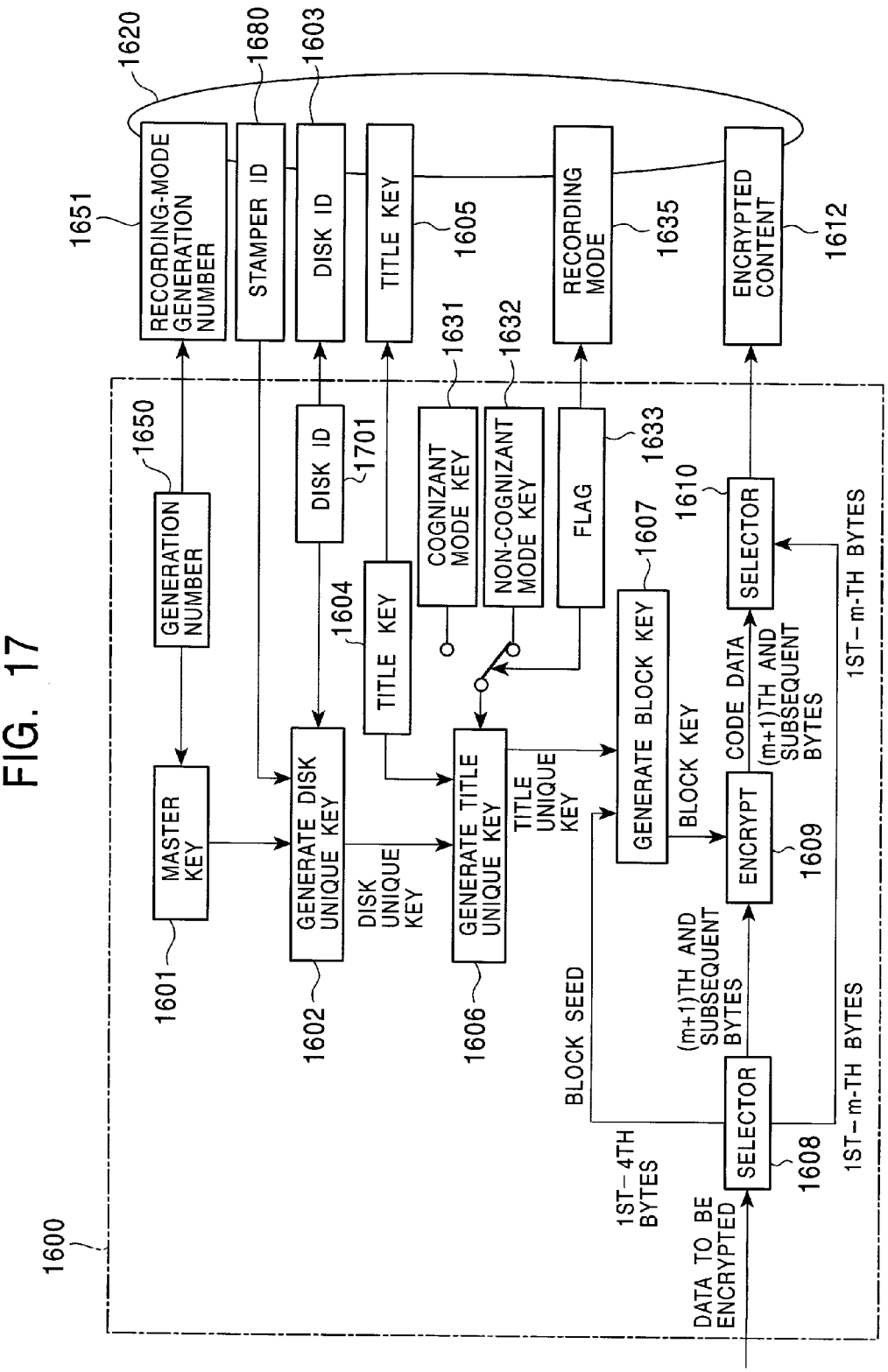
FIG. 17 is a block diagram illustrating encryption in data recording mode in an information recording/playback device of the present invention.

Next, secret-information writing and reading processes are described below in which secret information, such as the stamper ID 1680 shown in FIG. 16 or 17, is written on the disk by using a manner different from an ordinary data-writing technique and in which the written secret information is allowed to be read only in the case of applying a manner different from an ordinary data-reading technique.

Generation of Secret Information By Signal Disturbance

First, a structure in which various types of information signals, such as the stamper ID 1680, are recorded after being disturbed using M-series signals is described below.

Figure 25:
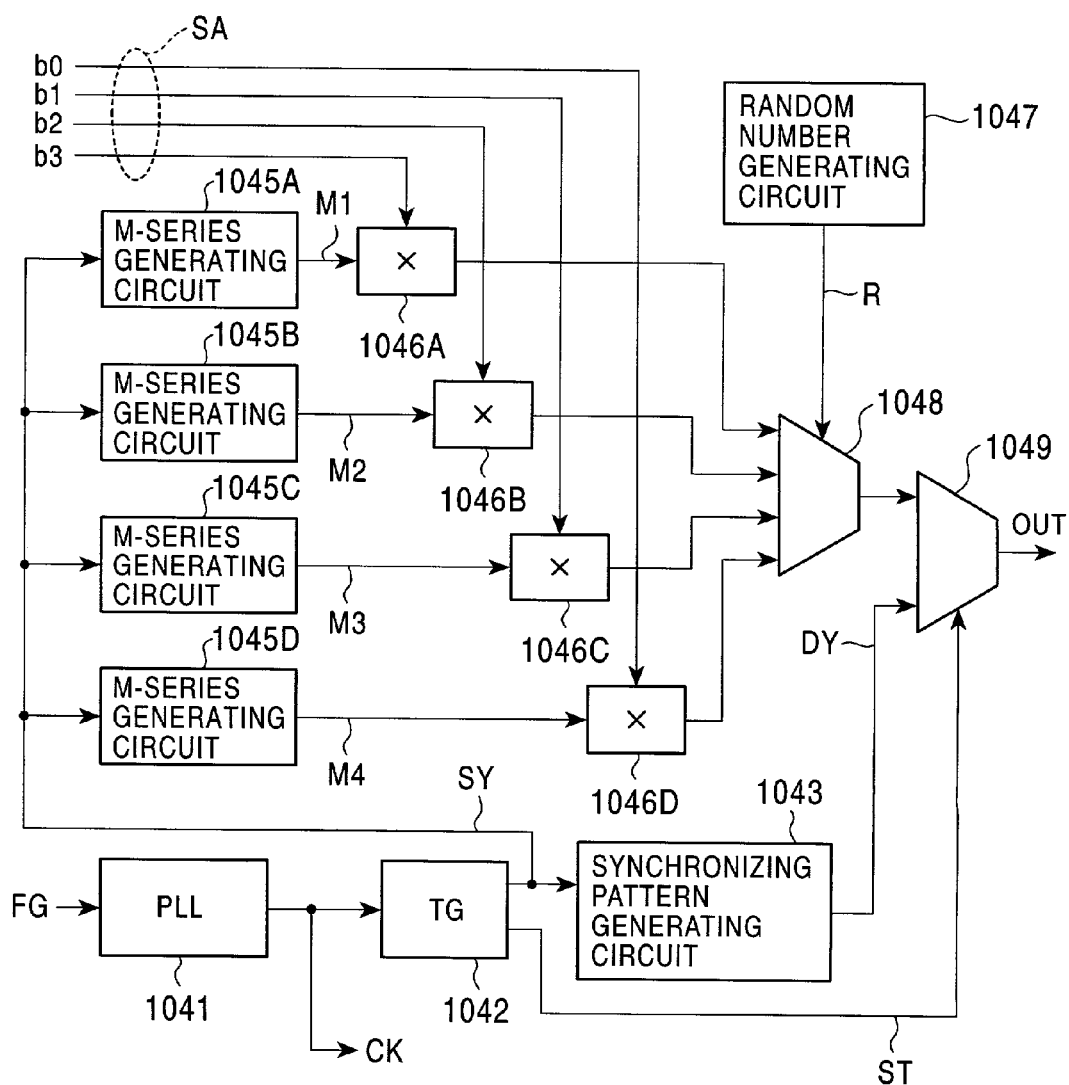
FIG. 25 is a block diagram showing a modulation circuit applied to the recording of secret information such as stamper ID in an information recording/playback device of the present invention.

FIG. 25 shows the structure of a write-signal generating modulation circuit. The circuit shown in FIG. 25 writes secret information (such as the stamper ID 1680) modulated based on an FG signal which rises whenever a disk on which data is written rotates by a predetermined angle.

After generating, based on the FG signal, channel clocks CK which is synchronized with the rotation of the disk, a PLL circuit 1041 supplies the channel clocks CK to the components of the circuit.

A timing generator (TG) 1042 generates an initialization pulse signal SY for initializing M-series generating circuits 1045A to 1045D at predetermined intervals by counting the channel clocks CK. The timing generator 1042 also generates and outputs a synchronization pattern selection signal ST which is synchronized with the initialization pulse signal SY.

Secret information, such as the stamper ID 1680, is input to the modulation circuit in FIG. 25 at a bit rate which is extremely smaller than that of the channel clocks CK. A synchronizing pattern generating circuit 1043 generates and outputs a predetermined synchronizing pattern DY based on the initialization pulse signal SY.

The M-series generating circuits 1045A to 1045D are initialized by the initialization pulse signal SY, and output M-series M1 to M4, respectively. The M-series signals M1 to M4 are strings of data which have randomly changing logical values and in which a possibility that logic "1" occurs and a possibility that logic "0" occurs are equal to each other. The M-series M1 to M4 signals do not have any mutual relationship.

Arithmetic circuits (indicated by "X" in FIG. 25) 1046A to 1046D are formed by exclusive OR circuits, and output the results of exclusive OR operations on the M-series signals M1 to M4 and the bits b0 to b3 of secret information such as a stamper ID and a disk ID. This causes the secret information to be disturbed by the M-series signals M1 to M4.

A random number generating circuit 1047 generates and outputs a 2-bit random number R (any value of 0, 1, 2, and 3) to a data selector 1048 in units of channel clocks CK. In response to the value of the random number R, the data selector 1048 selectively outputs the results of operations from the arithmetic circuits 1046A to 1046D. For example, when the random number R=0, the output of the arithmetic circuit 1046A is selected. When the random number R=1, the output of the arithmetic circuit 1046b is selected. When the random number R=2, the output of the arithmetic circuit 1046C is selected. When the random number R=3, the output of the arithmetic circuit 1046D is selected.

In the above construction, by performing decryption based on the M-series signals M1 to M4, the results of operations by the arithmetic circuits 1046A to 1046D are treated as a series and are further disturbed without being affected by other arithmetic operation results.

A data selector 1049 selectively outputs the initialization pulse signal SY which is output from the synchronizing pattern generating circuit 1043 based on the synchronization pattern selection signal ST, and the output of the data selector 1048. Accordingly, after the initialization pulse signal SY rises, and a synchronizing pattern (e.g., "11011") in a predetermined clock period (e.g., a 5-clock period) occurs, the data selector 1048 is controlled to perform outputting.

On the disk, in a predetermined secret information write area, the output of the modulation circuit in FIG. 25 is written. Even if the same secret information is input to the modulation circuit, the form of write data differs depending on the random number R. This makes it possible to perform writing of data that cannot be analyzed in ordinary reading processing.

Next, with reference to FIG. 26, the playback process on the secret information written in the above-described technique is described below.

Figure 26:
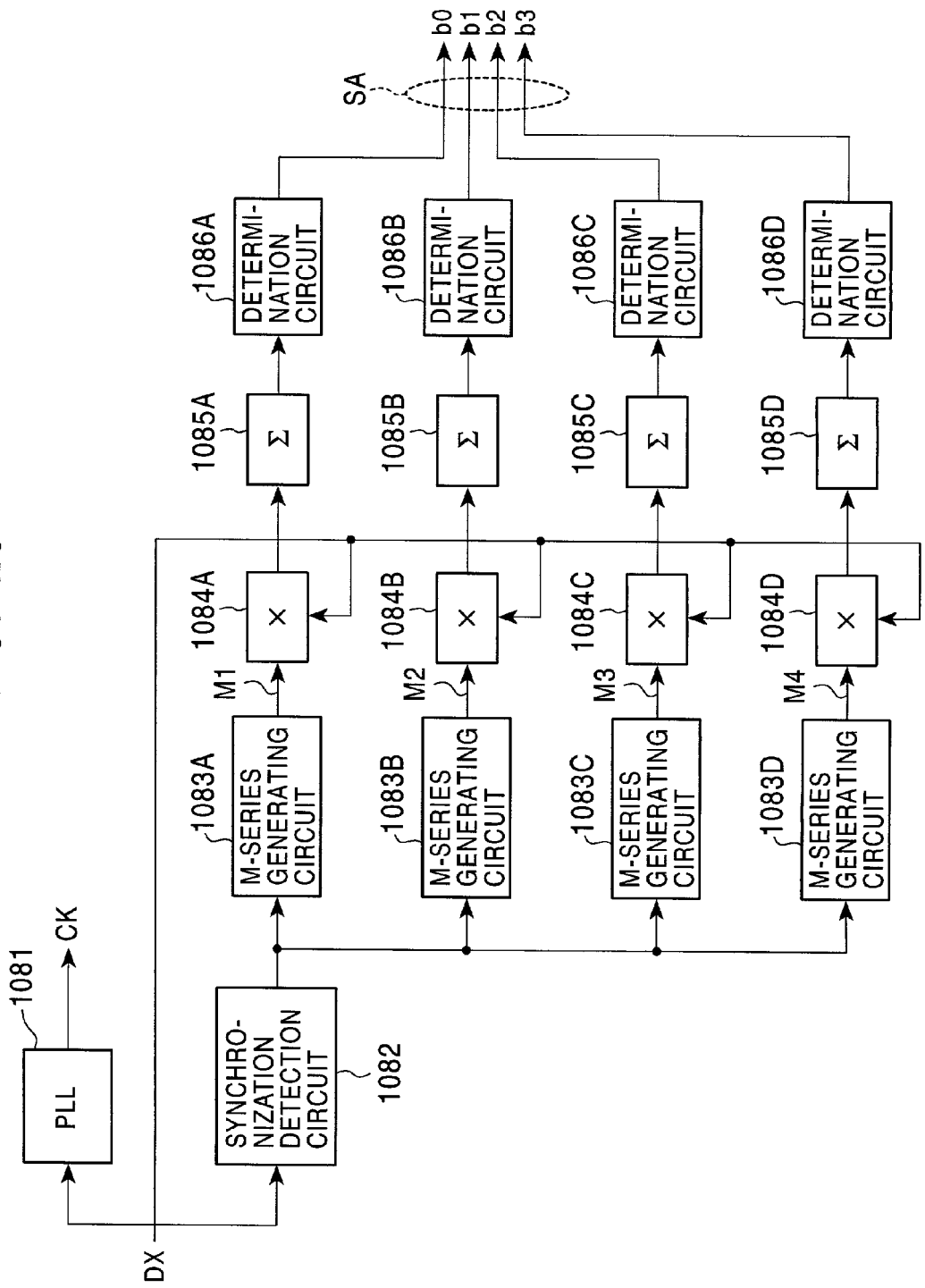
FIG. 26 is a block diagram showing a decryption processor used for the secret information playback described using FIG. 25.

FIG. 26 shows the structure of a decryption processor that plays back the secret information such as a stamper ID by decrypting a digital playback signal DX read from the disk. Based on the digital playback signal DX, a PLL circuit 1081 reproduces and outputs the channel clocks CK to the components of the decryption processor.

After detecting a synchronizing pattern by identifying the digital playback signal DX based on the channel clocks CK, a synchronization detection circuit 1082 reproduces the initialization pulse signal SY from the result of detection. Based on the initialization pulse signal SY and the channel clocks CK, M-series generating circuits 1083A to 1083D output the M-series signals M1 to M4 generated in the writing mode.

Multiplication circuits (indicated by "X" in FIG. 26) 1084A to 1084D multiply the M-series signals M1 to M4 by the digital playback signal DX, respectively, and output the products. In the multiplication circuits 1084A to 1084D, the polarity of the digital playback signal DX is inverted in accordance with the logical value of each of the M-series signals M1 to M4, whereby the multiplications are executed. The digital playback signal DX is played back only by decryption based on the M-series signals M1 to M4.

Integrating circuits (indicated by "Σ" in FIG. 26) 1085A to 1085D integrate, based on the initialization pulse signal SY, the products output by the multiplication circuits 1084A to 1084D, and output the integrated results in accordance with the logical values of bits b1 to b3 of the secret information (e.g., stamper ID). Determination circuits 1086A to 1086D perform binary identification based on the initialization pulse signal SY of the integrated results output by the integrating circuits 1085A to 1085D, whereby the values of bits b0 to b3 are reproduced and output.

As described above, the secret information is input, as a string of four parallel bits b0 to b3, to the modulation circuit (FIG. 25), and are recorded after being disturbed by the four M-series signals M1 to M4 and the random number R. Thus, it is difficult to read the recorded secret information in the ordinary reading processing. When playback is performed, the M-series signals M1 to M4 can be generated based on the synchronizing pattern DY, and the generated M-series signals M1 to M4 and the decryption of the read signal enable the secret information to be output.

A recording/playback device which reads a stamper ID written by the above-described recording technique and which generates a content-encryption key based on the stamper ID or the like has a secret information decrypting unit having the structure shown in FIG. 26.

Recording Secret Information in Inner Circumferential Part of Disk

Next, concerning other secret-information writing and reading processes, a construction is described below in which secret information (such as a stamper ID) is written in an area of the disk different from a write area for music data, etc., and the written information is stably read.

Figure 27:
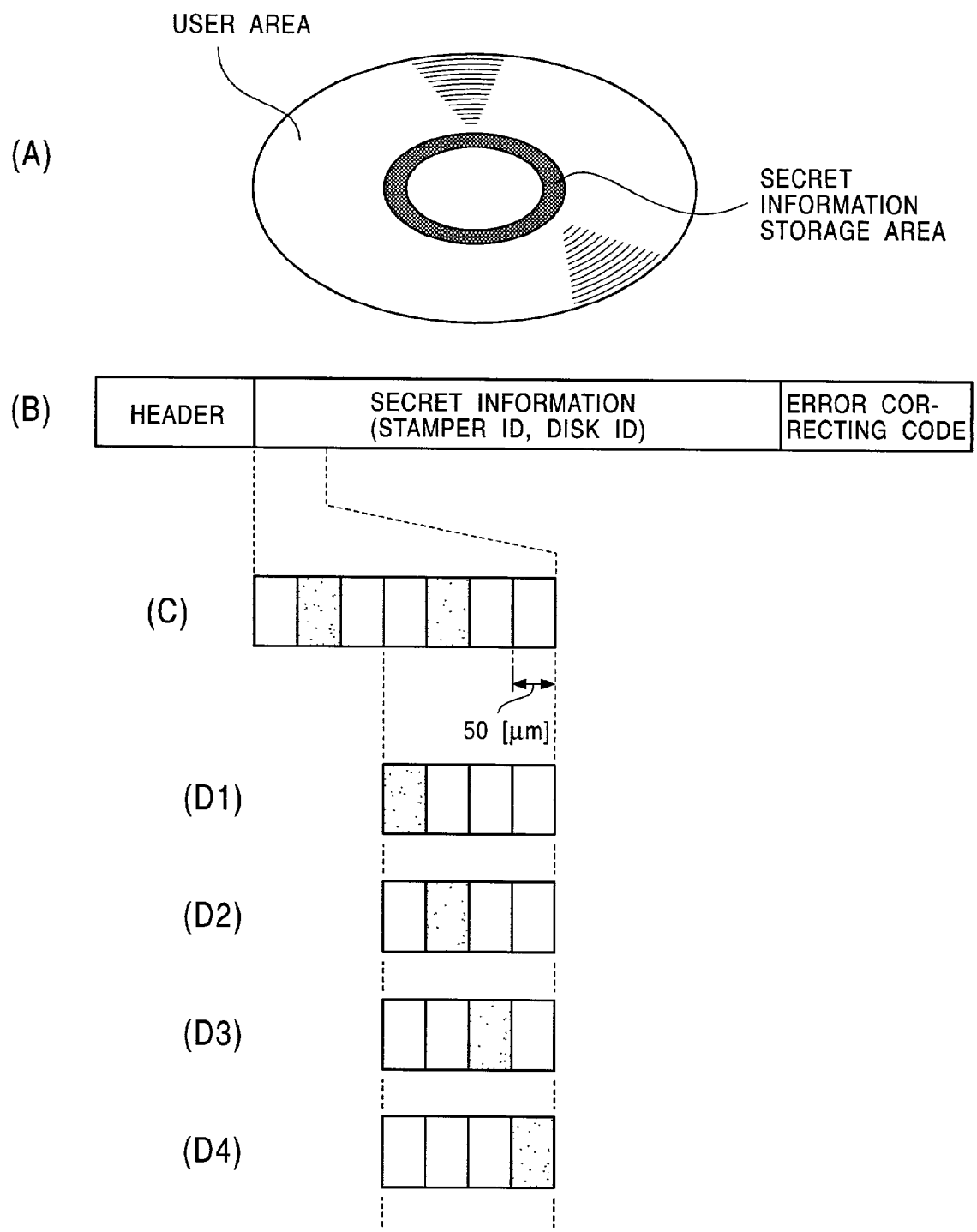
FIG. 27 consists of illustrations of recorded secret information such as stamper ID in an information recording/playback device of the present invention.

The top part (A) of FIG. 27 is a perspective view of a disk containing secret information such as a stamper ID. The secret information is recorded four times on one track of the disk, so that the secret information can be played back, even if the disk is partly damaged. The secret information includes areas for a header, a stamper ID, etc., and an error correcting code. Each bit of bit patterns indicating the information is formed by a minute area unit having a dimension of 50 μm, which is greatly longer than that of each bit of a data area recorded as user data. In each of the stamper ID area and the error correcting code area, a synchronizing pattern is formed in which among three minute areas, only the center area has a pattern formed by changing the optical property of the recording surface. The synchronizing pattern enables timing control in the playback mode.

The data of the information area and the error correcting code area is divided into two-bit parts. When two-bit data (b1, b0) is logic "00", the optical property of only the first minute area is changed, and the logic is converted to logic "1000" for recording, as shown in the part (D1) of FIG. 27. As shown in the part (D2) of FIG. 27, when two-bit data (b1, b0) is logic "01", logic "0100" is recorded. As shown in the part (D3) of FIG. 27, when two-bit data (b1, b0) is logic "10", logic "0010" is recorded. As shown in the part (D3) of FIG. 27, when two-bit data (b1, b0) is logic "11", logic "0001" is recorded. Accordingly, on the disk, the percentage of presence of optical-property-changed areas is 0.3 or less, so that in the inner circumferential part of the disk, data reading can be performed since focussing servo control based on sufficient reflected light can be performed.

Figure 28:
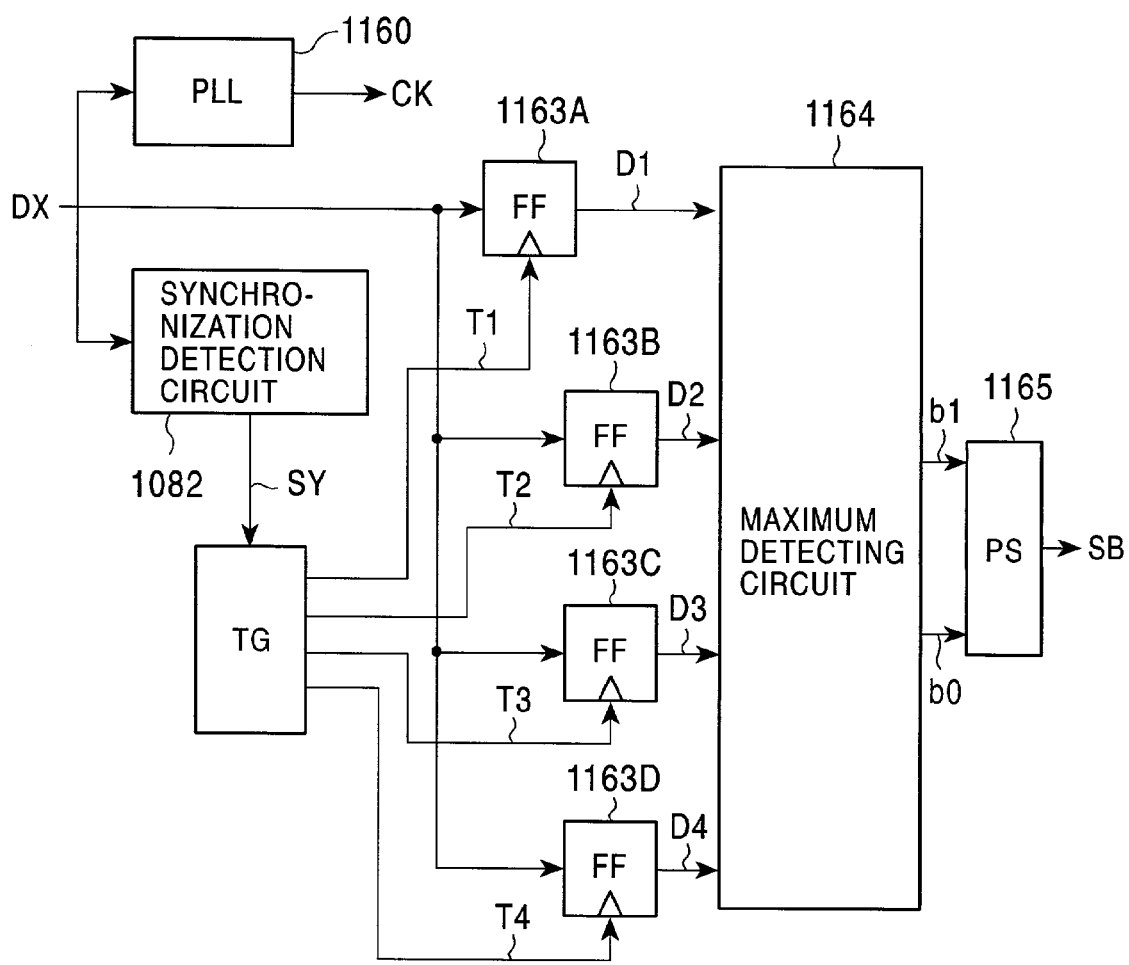
FIG. 28 is a block diagram showing a decryption unit for the secret information shown in FIG. 27.

FIG. 28 shows the structure of an decryption unit used for reading the secret information recorded in the inner circumferential part of the disk. A PLL circuit 1160 uses the digital playback signal DX to reproduce and output the channel clocks CK.

By determining the signal level of the digital playback signal DX based on the channel clocks CK, a synchronization detection circuit 1161 detects a synchronizing pattern and outputs an initialization pulse signal SY.

For the minute areas (parts (D1) to (D4) of FIG. 27) following the synchronizing pattern (part (C) of FIG. 27), a timing generator (TG) 1162 outputs, based on the initialization pulse signal SY, sampling pulse signals T1 to T4 which rise in the centers of the minute areas.

Flip-flops (FFs) 1163A to 1163D latch, based on the sampling pulse signals T1 to T4, digital playback signals. Accordingly, the signal levels of playback signals which are obtained from the four minute areas assigned to the two-bit data (b1, b0) of the information areas and the error correcting code area are latched and retained in the flip-flops 1163A to 1163D.

By determining the magnitudes of the playback signal levels from the flip-flops 1163A to 1163D, the two-bit data (b1, b0) of the information areas and the error correcting code area are played back and output by a maximum detecting circuit 1164. A parallel/serial conversion circuit (PS) 1165 sequentially converts the two-bit data (b1, b0) into serial data and outputs the serial data.

A recording/playback device which reads the stamper ID written by the above-described recording technique and which generates a content-encryption key based on the stamper ID includes the decryption unit structure shown in FIG. 28.

As described above, by employing special secret-information writing and reading techniques different from those for contents, secret information such as a stamper ID is recorded on a disk, and the stamper ID is used as source data for keys for use in content encryption and decryption. Thus, if another processing key leaks, it is impossible to read the secret information, and a possibility of leak can be greatly reduced. This enables security-enhanced content protection.

This Specification describes a case in which the secret information required for writing and playback of specified information to be recorded on the disk is set as a stamper ID. However, the secret information is not limited to the stamper ID. It is possible that various types of identification data, such as IDs set for disks, and different content IDs set for contents, or encryption keys or the like, be set as secret information to be recorded on the disk. By applying these types of secret information, a content-encryption key is generated.

The above recording/playback device has a structure capable of selectively using a key for generating an encryption/decryption key for recording using the cognizant mode and a key for generating an encryption/decryption key for recording using the non-cognizant mode, as shown in FIG. 16 or 17. A recording/playback device that executes only one of the modes stores either key, that is, a cognizant key or a non-cognizant key, and generates, based on the stored key, a block key for content encryption and decryption. Block diagrams that show the process of generating a content-encryption key in each recording/playback device storing a single key are shown in FIGS. 29 and 30.

Figure 29:
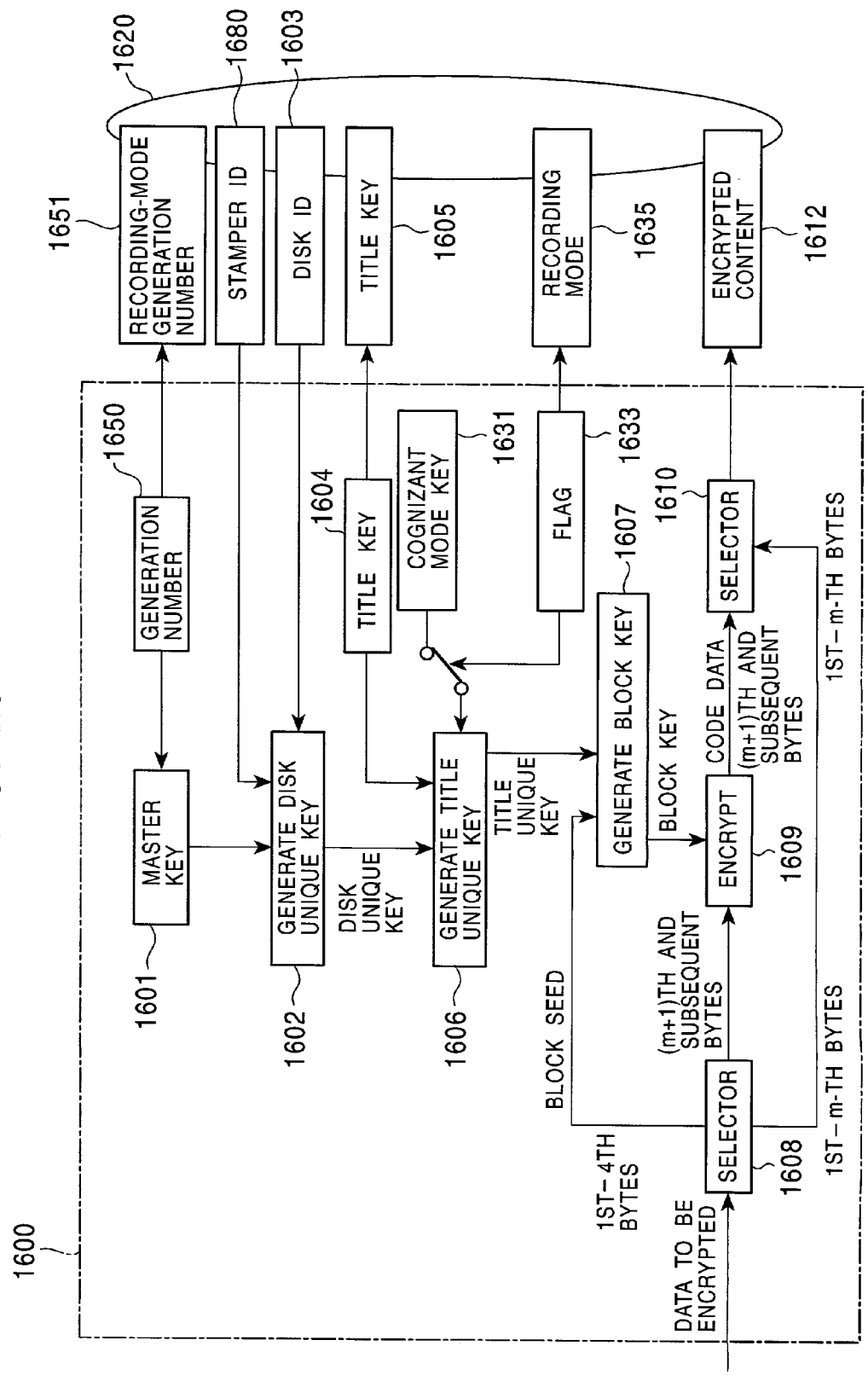
FIG. 29 is a block diagram showing an example of an information recording/playback device of the present invention which stores a cognizant key.

FIG. 29 shows a recording/playback device having only a cognizant key. This recording/playback device generates, based on the cognizant key and key generating data, an encryption key and a decryption key which are used for data recording on a recording medium and data playback from the recording medium in order to execute content encryption and decryption.

Figure 30:
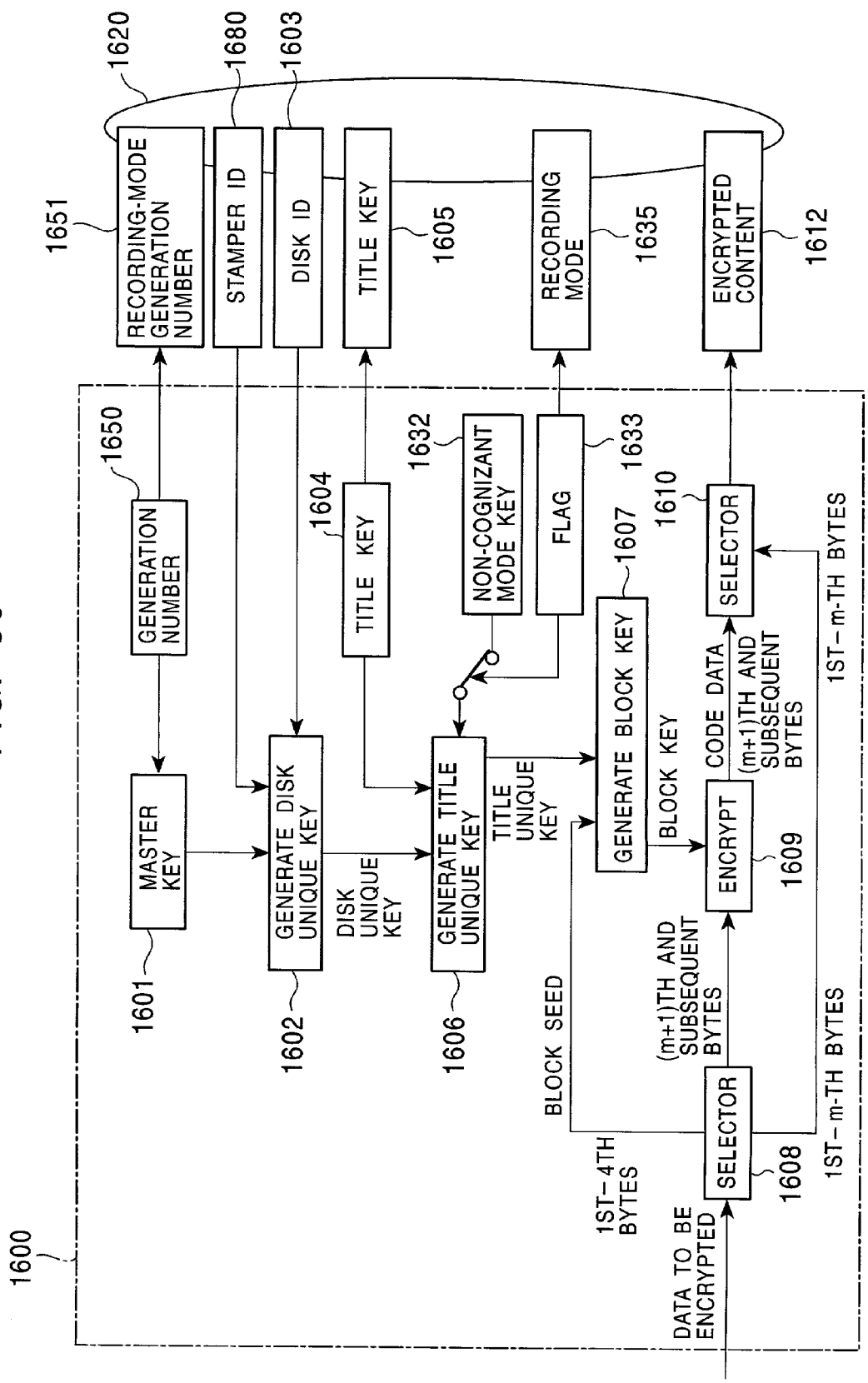
FIG. 30 is a block diagram showing an example of an information recording/playback device of the present invention which stores a non-cognizant key.

FIG. 30 shows a recording/playback device having only a non-cognizant key. This recording/playback device generates, based on the non-cognizant key and key generating data, an encryption key and a decryption key which are used for data recording on a recording medium and data playback from the recording medium in order to execute content encryption and decryption.

In each recording/playback device storing a single type of key, data recording/playback can be executed only in either mode.

Content-Data Decryption and Playback Processing Using Generation-Controlled Master Key Next, processing in which encrypted contents recorded as described above on the recording medium are decrypted and played back is described below using the block diagram shown in FIG. 31 and the flowcharts shown in FIGS. 32 to 34.

Figure 31:
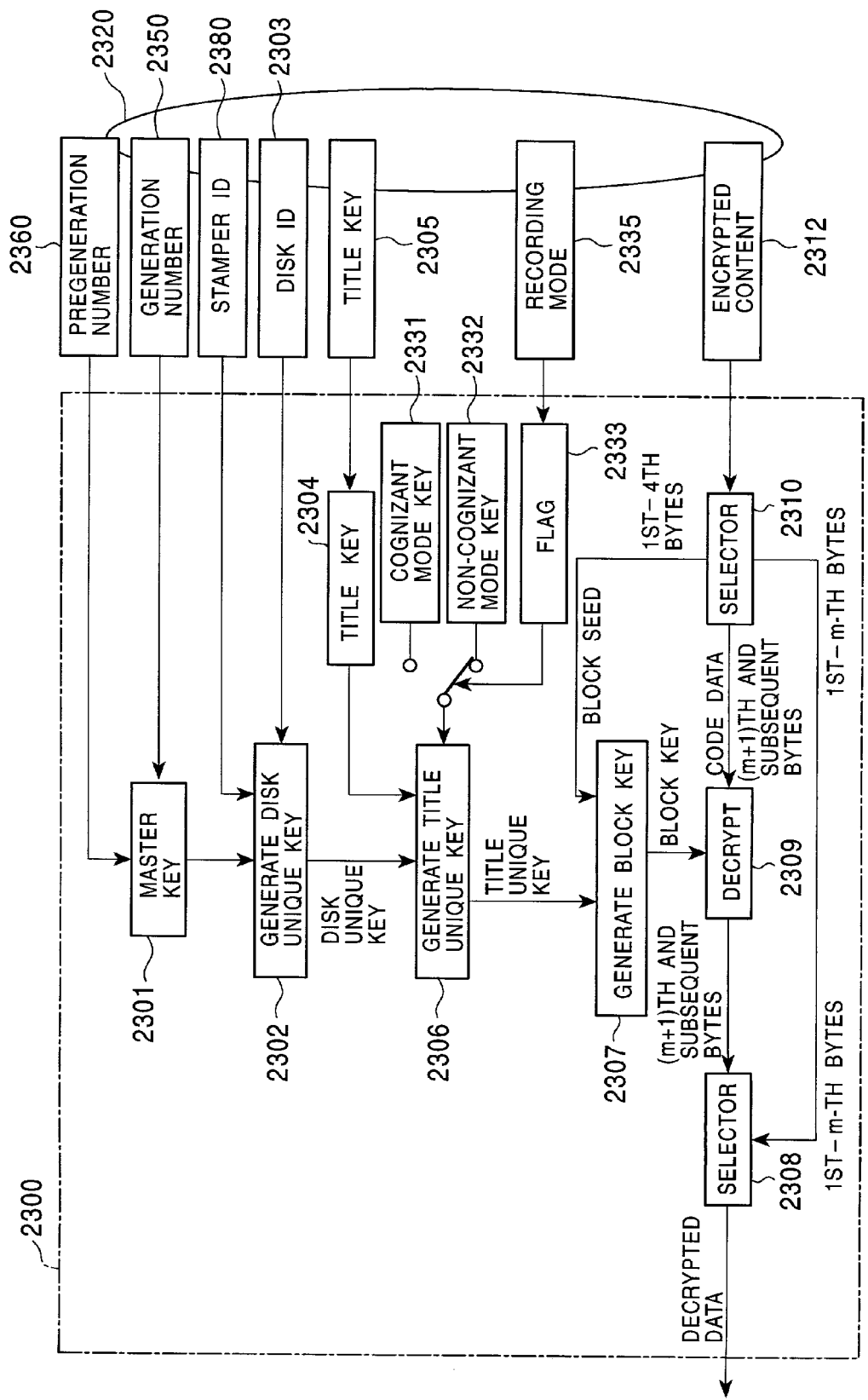
FIG. 31 is a block diagram showing a recording/playback device of the present invention in which decryption of content data in playback of data is performed.
Figure 32:
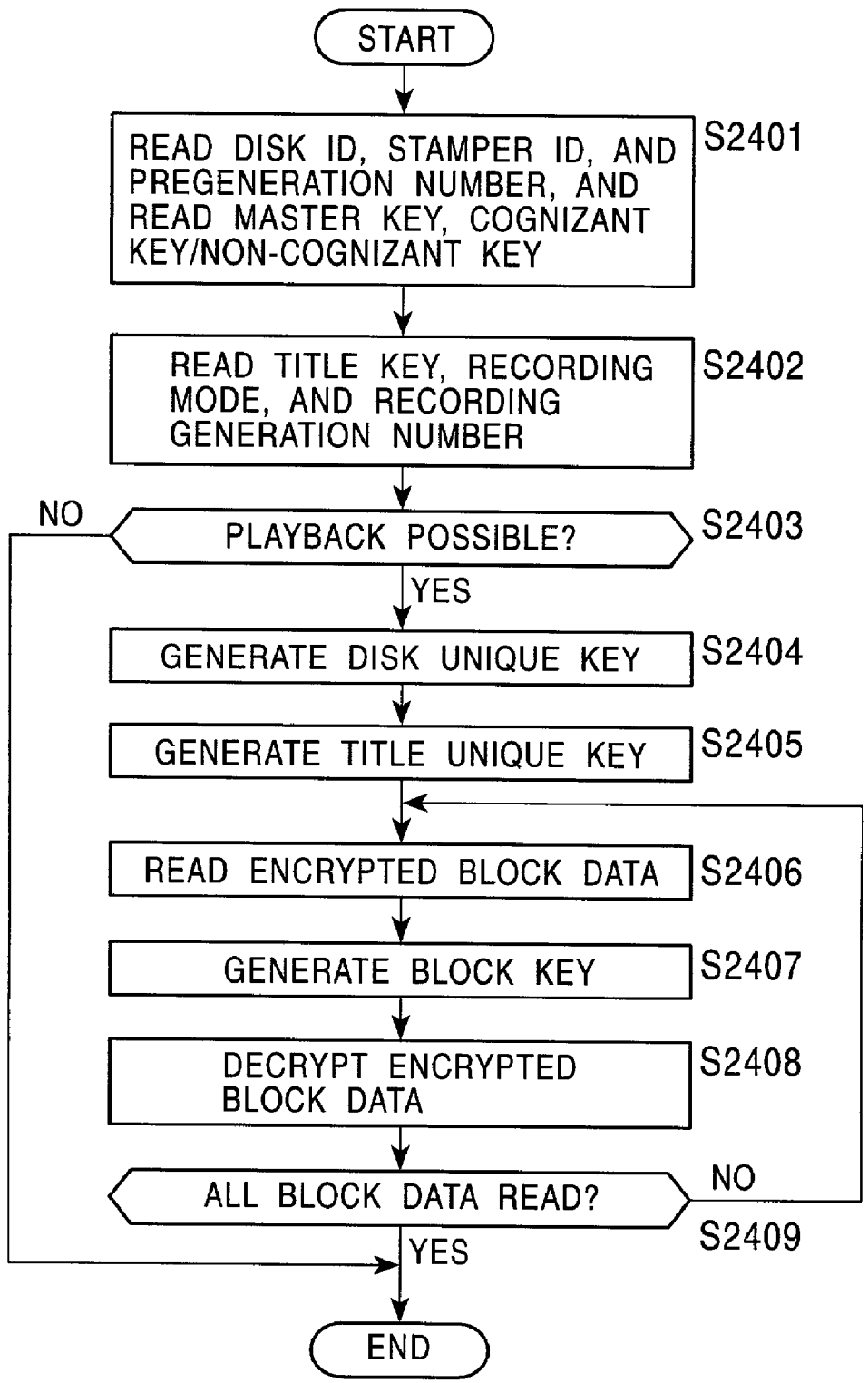
FIG. 32 is a flowchart illustrating a data playback process in an information recording/playback device of the present invention.

Concerning the decryption and playback process, the process flow is described in accordance with the flowchart in FIG. 32, with reference to the block diagram in FIG. 31.

In FIG. 32, in step S2401, a recording/playback device 2300 (FIG. 31) reads a disk ID 2302, a pre-recording-mode generation number 2350, and a stamper ID 2380 from a disk 2320, and also reads a master key 2301, a cognizant key 2331 and/or a non-cognizant key 2332 from its memory. As is clear from the above description of the recording process, the disk ID 2303 is recorded on the disk 2320 beforehand, or if it is not recorded, the disk ID 2303 is a disk unique identifier in which the identifier is generated in the recording/playback device 2300 and is recorded on the disk 2320.

The pre-recording-mode generation number 2360 is generation information which is beforehand stored on the disk 2320 as a recording medium and which is unique to the disk 2320. By comparing the pre-recording-mode generation number 2360 and the generation of the master key 2301 which is obtained in data recording, that is, a recording-mode generation number 2350, determination of whether or not the playback process can be performed. The master key 2301 is a generation-controlled secret key which is stored in the memory of the recording/playback device 2300 in accordance with the flow in FIG. 14. The cognizant key and the non-cognizant key are secret keys common in system, which correspond to the cognizant mode and the non-cognizant mode, respectively.

In step S2402, the recording/playback device 2300 reads, from the disk 2320, a title key 2305 corresponding to data to be read, a (data) recording mode 2335, and the generation number of a master key used when recording data, that is, the recording-mode generation number 2350. In step S2403, the recording/playback device 2300 determines whether or not data to be read can be played back. The detailed flowchart of the determination is shown in FIG. 33.

Figure 33:
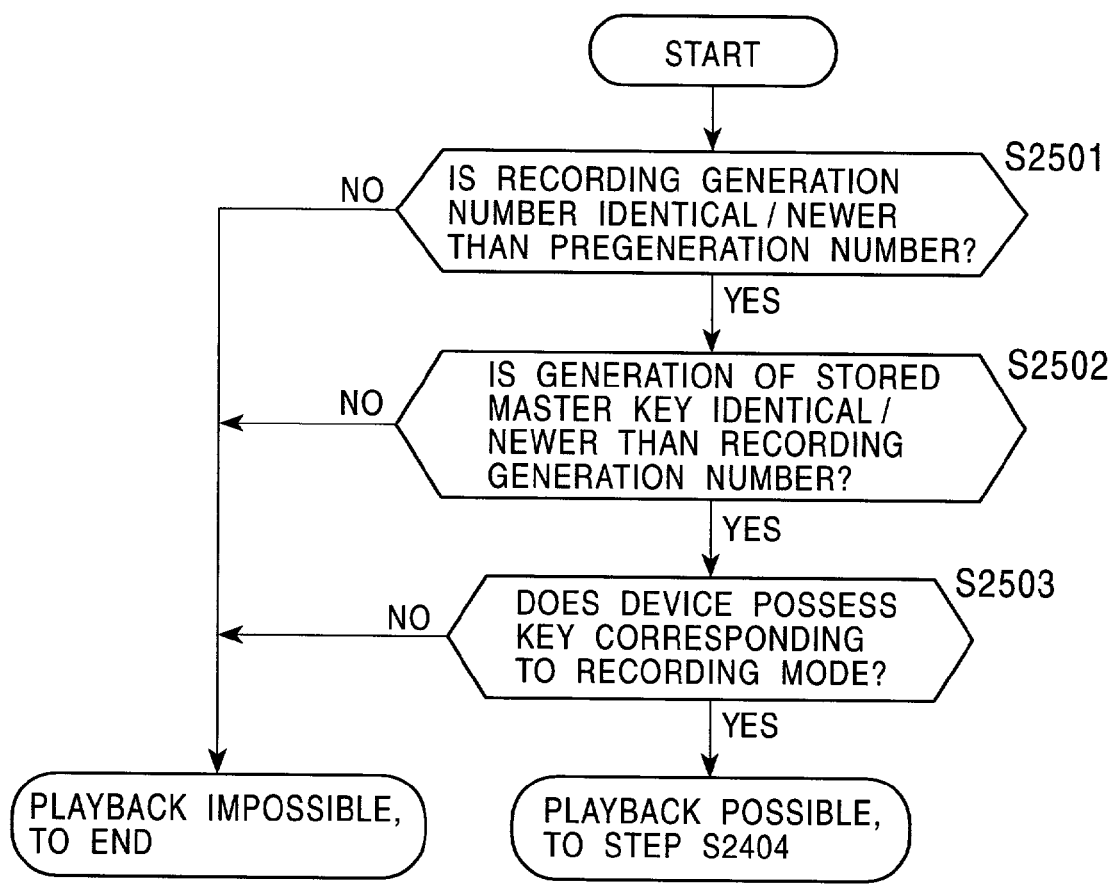
FIG. 33 is a flowchart illustrating a detailed process of whether or not data can be played back, which is performed in an information recording/playback device of the present invention.
Figure 34:
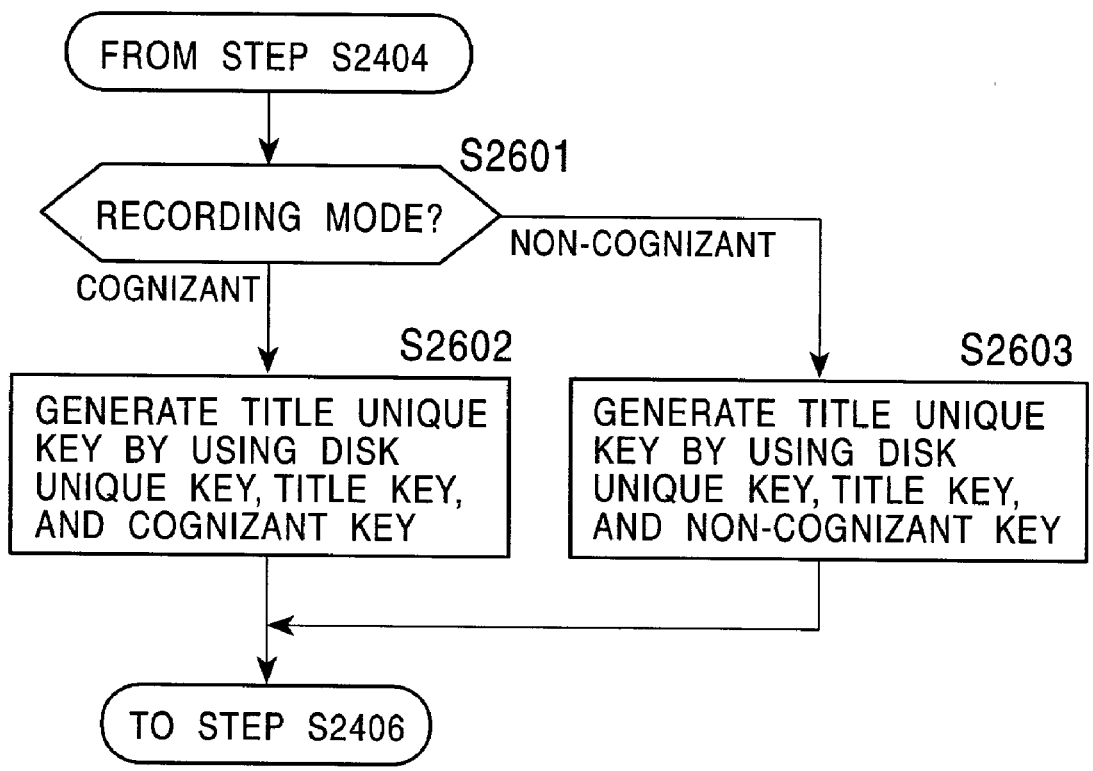
FIG. 34 is a flowchart illustrating a process of generating a title unique key in data playback in an information recording/playback device of the present invention.

In FIG. 33, in step S2501, the recording/playback device 2300 determines whether or not the recording-mode generation number 2350 read in step S2402 is newer than the pre-generation number 2360 read in step S2401. If the recording/playback device 2300 has determined that the generation represented by the recording-mode generation number 2350 does not follow the generation represented by the pre-generation number 2360, in other words, when the generation represented by the recording-mode generation number 2350 is older than the generation represented by the pre-generation number 2360, the recording/playback device 2300 determines that playback is impossible. The recording/playback device 2300 skips over steps 2404 to S2409 and terminates the process without performing playback. Accordingly, when the contents recorded on the disk 2320 are encrypted based on the master key 2301 having a generation older than the generation represented by the pre-recording generation number 2360, a playback of the contents is not allowed and the playback is not performed.

Specifically, when an unauthorized conduct is detected, the above processing determines that the unauthorized conduct corresponds to a case in which data is encrypted based on an old master key by using an authorized recorder which is not supplied with a latest generation master key and the encrypted data is recorded, whereby the above processing prevents a recording medium containing the inappropriately recorded data from being played back. This can exclude the use of the unauthorized recorder.

In step S2501, if the recording/playback device 2300 has determined that the generation represented by the recording-mode generation number 2350 follows the generation represented by the pre-generation number 2360, in other words, when the generation represented by the recording-mode generation number 2350 is identical to or newer than the generation represented by the pre-generation number 2360, and the recorded contents are encrypted based on a master key whose generation follows the generation represented by the pre-generation number 2360, the recording/playback device 2300 goes to step S2502. In step S2502, after the recording/playback device 2300 acquires generation information on encryption master key C stored in its memory, it determines whether or not the generation of the encryption master key C is identical to/newer than the generation represented by the recording-mode generation number 2350 and determines by comparing both generations.

In step S2502, if the recording/playback device 2300 has determined that the generation of the encryption master key C does not follow the generation represented by the recording-mode generation number 2350, in other words, when the generation of the encryption master key C which is stored in the memory is older than the generation represented by the recording-mode generation number 2350, the recording/playback device 2300 determines that a playback is impossible, and terminates this processing without performing the playback process by skipping over steps S2404 to S2409.

Conversely, in step S2502, if the recording/playback device 2300 has determined that the generation of the encryption master key C follows the generation represented by the recording-mode generation number 2350, in other words, when the generation of the encryption master key C which is stored in the memory is identical to or newer than the generation represented by the recording-mode generation number 2350, the recording/playback device 2300 goes to step S2503. In step S2503, the recording/playback device 2300 determines whether or not it possesses a key corresponding to the recording mode, that is, a cognizant key or a non-cognizant key.

In step S2503, if the recording/playback device 2300 has determined that it possesses the cognizant key or the non-cognizant key, it determines that a playback is possible. If it does not possess the cognizant key or the non-cognizant key, it determines that the playback is impossible.

When the playback is possible, the recording/playback device 2300 goes to step S2404. In step S2404, the disk ID 2303, the master key 2301, and the stamper ID 2380 are used to generate (2302 in FIG. 31) a disk unique key. Methods of generating the disk unique key include the following two methods: in one method, after inputting, to hash function SHA-1 defined in the FIPS 180-1, data generated by bit concatenation of the a master key and a disk ID, only a necessary data length in the resultant 160-bit output is used as the disk unique key; and in another method, by inputting, to a hash function using a block encryption function, a master key and a disk ID, the obtained result is used. The master key being used here is one read in step S2402 in FIG. 32, which has the generation (time) represented by the recording-mode generation number. If the recording/playback device 2300 retains a master key having a newer generation, the above method is used to create a master key having the generation represented by the recording-mode generation number, and a disk unique key may be generated using the generated master key.

In step S2405, a title unique key is generated. A detailed flowchart for generating the title unique key is shown in FIG. 34. In step S2601, the cryptosystem unit 150 executes determination of a recording mode. This determination is executed based on the recording mode 2335 read from the disk 2320.

In step S2601, if the cryptosystem unit 150 has determined that the recording mode is the cognizant mode, it goes to step S2602, and generates the title unique key by using the disk unique key, the title key, and the cognizant key.

In step S2601, if the cryptosystem unit 150 has determined that the recording mode is the non-cognizant mode, it goes to step S2603, and generates the title unique key by using the disk unique key, the title key, and the non-cognizant key. For generating the title unique key, a method using hash function SHA-1, and a hash function based on block encryption are used.

In the above description, by using a master key, a stamper ID, and a disk ID, the disk unique key is generated, and by using the generated disk unique key, and a cognizant key or a non-cognizant key, a title unique key is generated. However, without using the disk unique key, by using the master key, the stamper ID, the disk ID, the title key, and the cognizant key or the non-cognizant key, the title unique key may be directly generated. Also, without using the title key, by using the master key, the stamper ID, the disk ID, and the cognizant key or the non-cognizant key, a key corresponding to the title unique key may be generated.

In step S2406, block data is sequentially read from encrypted content 2312 recorded in encrypted form on the disk 2320. In step S2407, a selector 2310 separates first four bytes as a block seed from the block data. The block seed, and the title unique key generated in step S2405 are used to generate a block key.

Figure 23A:
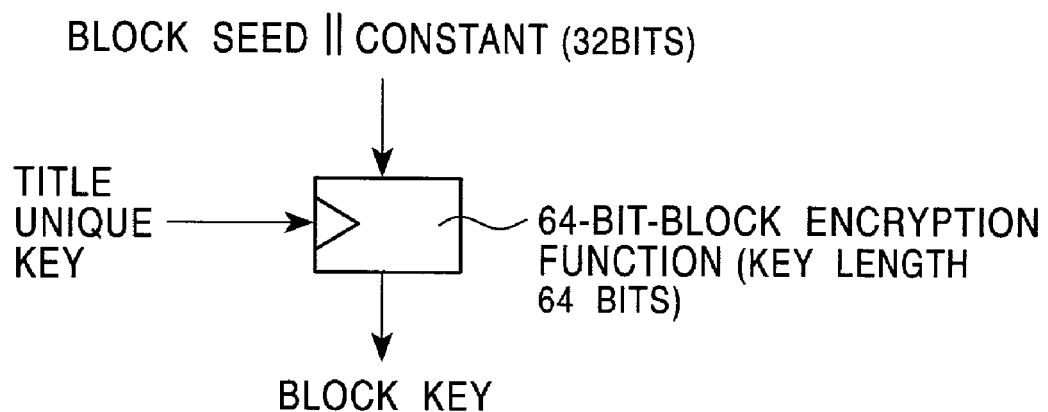
FIGS. 23A and 23B are illustrations of the generation of block keys in an information recording/playback device of the present invention.
Figure 23B:
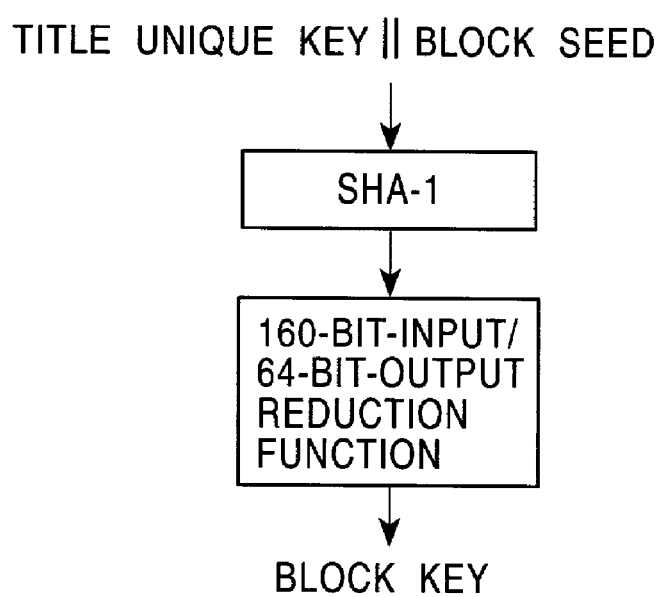

For generating the block key, the above constructions in FIGS. 23A and 23B can be applied. In other words, a technique can be applied in which by using a 32-bit block seed and a 64-bit title unique key, a 64-bit block key can be generated.

In the above description, each of the disk unique key, the title unique key, and the block key is generated. However, for example, without executing the generation of the disk unique key and the title unique key, the block key may be generated for each block by using the master key, the stamper ID, the disk ID, the title key, the block seed, and the cognizant key or the non-cognizant key.

After the block key is generated, in step S2408, the block data encrypted using the block key is decrypted (2309), and is output as decrypted data via a selector 2308. In the decrypted data, arrival time stamps are added to transport packets constituting a transport stream. In the above-described TS processing unit 300, stream processing based the arrival time stamps is executed. After that, data can be used in the form of, for example, displaying an image, and playing music.

As described above, contents recorded on a recording medium after being encrypted in units of blocks can be played back such that the contents are decryption-processed using a block key generated based on a block seed including a arrival time stamp.

After using the block key to decrypt the encrypted block data, in step S2409, the recording/playback device 2300 determines whether the reading of all data is completed. If all data have already been read, this process ends. If the determination is negative, the recording/playback device 2300 goes back to step S2406 and reads the remaining data.

The above recording/playback device 2300 has a structure capable of selectively using an encryption/decryption-key generating key (cognizant key) for the cognizant mode and an encryption/decryption-key generating key (non-cognizant key) for the non-cognizant mode, as shown in FIG. 31. As shown in FIGS. 29 and 30, in a recording/playback device that stores only one of the keys, that is, the cognizant key or the non-cognizant key, only the recording mode corresponding to the stored key of either mode is executed, and a content-decrypting block key is generated based on the stored key.

Processing Configuration Using Media Key Effective Only in Recording Medium

In the above embodiment, an enabling key block is used to transmit a master key to each recording/playback device. The recording/playback device uses the master key to record and play back data.

A master key is a key that is effective in the entire record of data at the point thereof. A recording/playback device that has obtained a master key at a point is allowed to decrypt data recorded at the point and data recorded in system prior to the point. However, from the property of the master key in which it is effective in the entirety of the system, a defect occurs in that the exposure of the master key affects the entirety of the system.

By setting a key transmitted using an enabling key block of a recording medium so that it is used not as a master key effective in the entire system but as a media key effective in only the recording medium, the influence of exposure of the key can be suppressed. A method that using a media key instead of a master key is described below as a second embodiment of the present invention. Differences from the above first embodiment are described.

Figure 35:
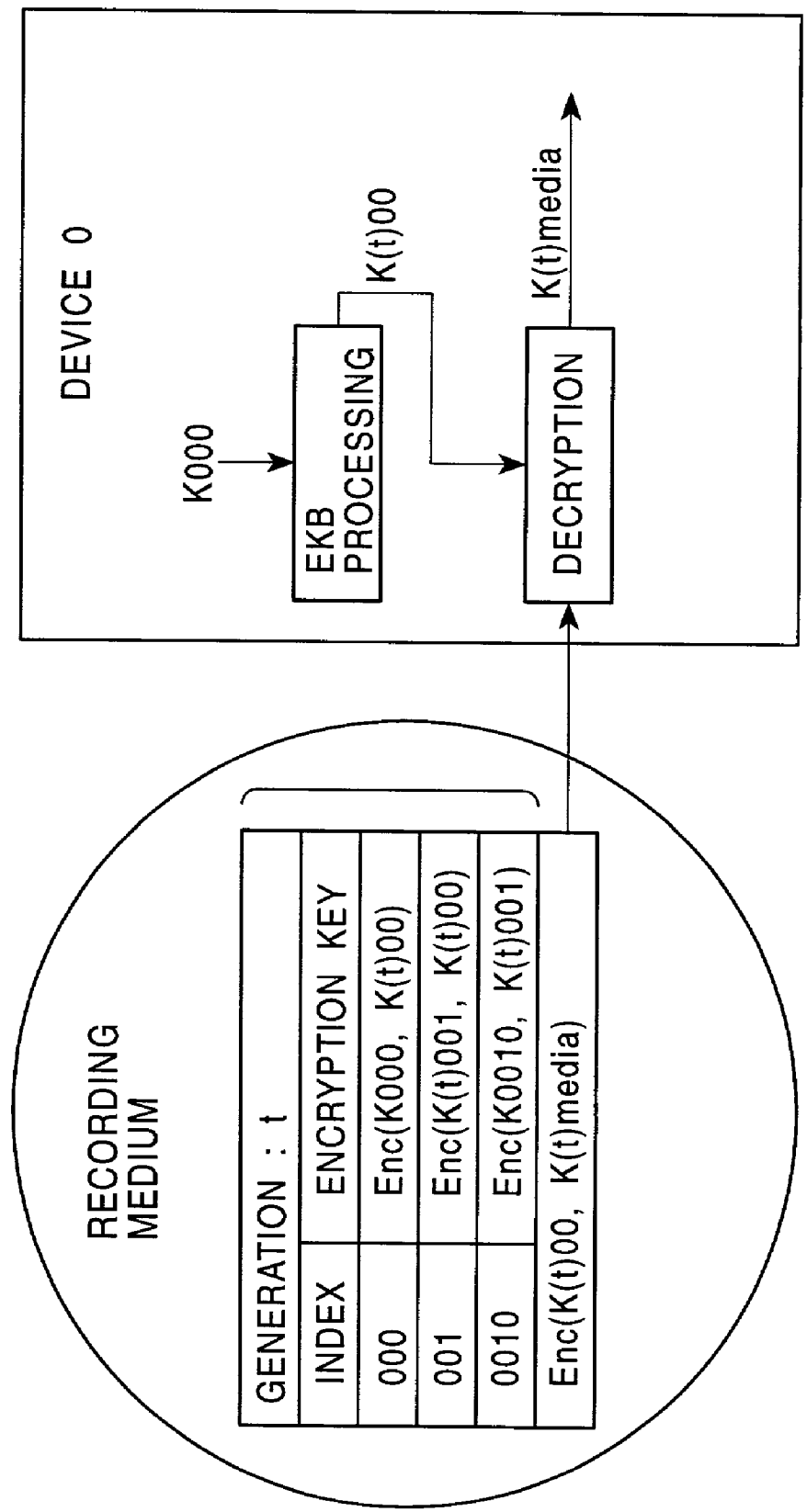
FIG. 35 is an illustration of the distribution and decryption by enabling key block of a media key in an information recording/playback device of the present invention.

Similarly to FIG. 13, FIG. 35 shows that after device 0 generates updating node key K(t)00 by using an enabling key block at a point t which is recorded on the recording medium, and leaf key K0000 and node keys K000 and K00 which are stored in device 0, device 0 uses node key K(t)00 to obtain updating media key $K(t)_{media}$. The obtained updating media key $K(t)_{media}$ is used when performing data recording on the recording medium and playback of the data.

In FIG. 35, the pre-recording generation number is not essential because concerning the media key, there is no concept of old and new generations, differently from the master key.

Figure 36:
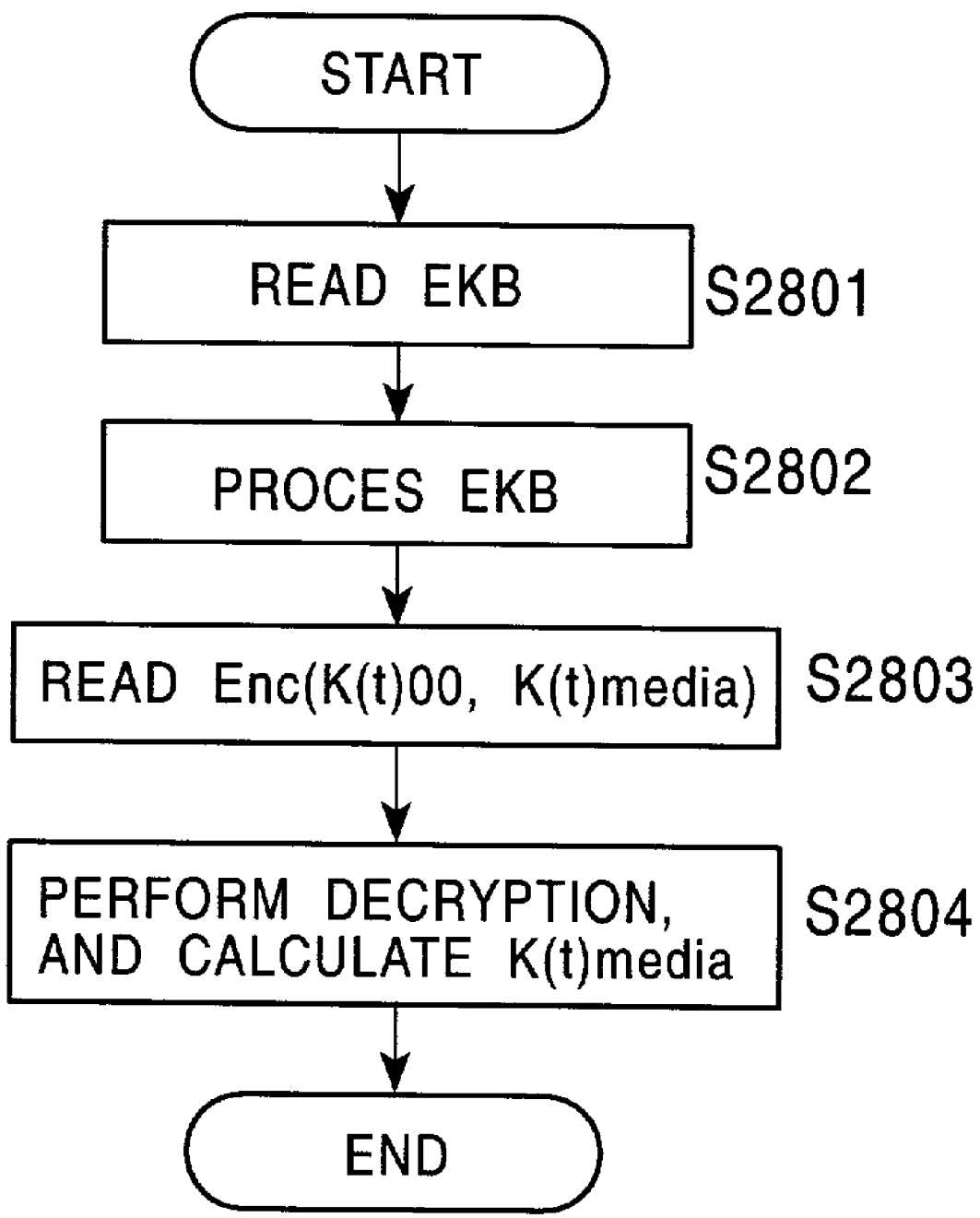
FIG. 36 is a flowchart illustrating a process of decryption by enabling key block of a media key in an information recording/playback device of the present invention.

When a recording medium is loaded into each recording/playback device for data recording or playback, the recording/playback device calculates media key $K(t)_{media}$ for the recording medium in accordance with the flowchart shown in FIG. 36, and uses the updating media key $K(t)_{media}$ to access the recording medium.

The reading of an enabling key block in step S2801 and the processing of the enabling key block in step S2802 (FIG. 36) are similar to steps S1403 and S1404 in FIG. 14.

In step S2803, the recording/playback device reads, from the recording medium, code $Enc(K(t)00, K(t)_{media})$ obtained by using node key K(t)00 to encode media key $K(t)_{media}$. In step S2804, the recording/playback device obtains the media key by decrypting the read code. If the recording/playback device is revoked from a group in the tree structure shown in FIG. 11, the media key cannot be obtained and recording on the recording medium and playback cannot be performed.

Figure 37:
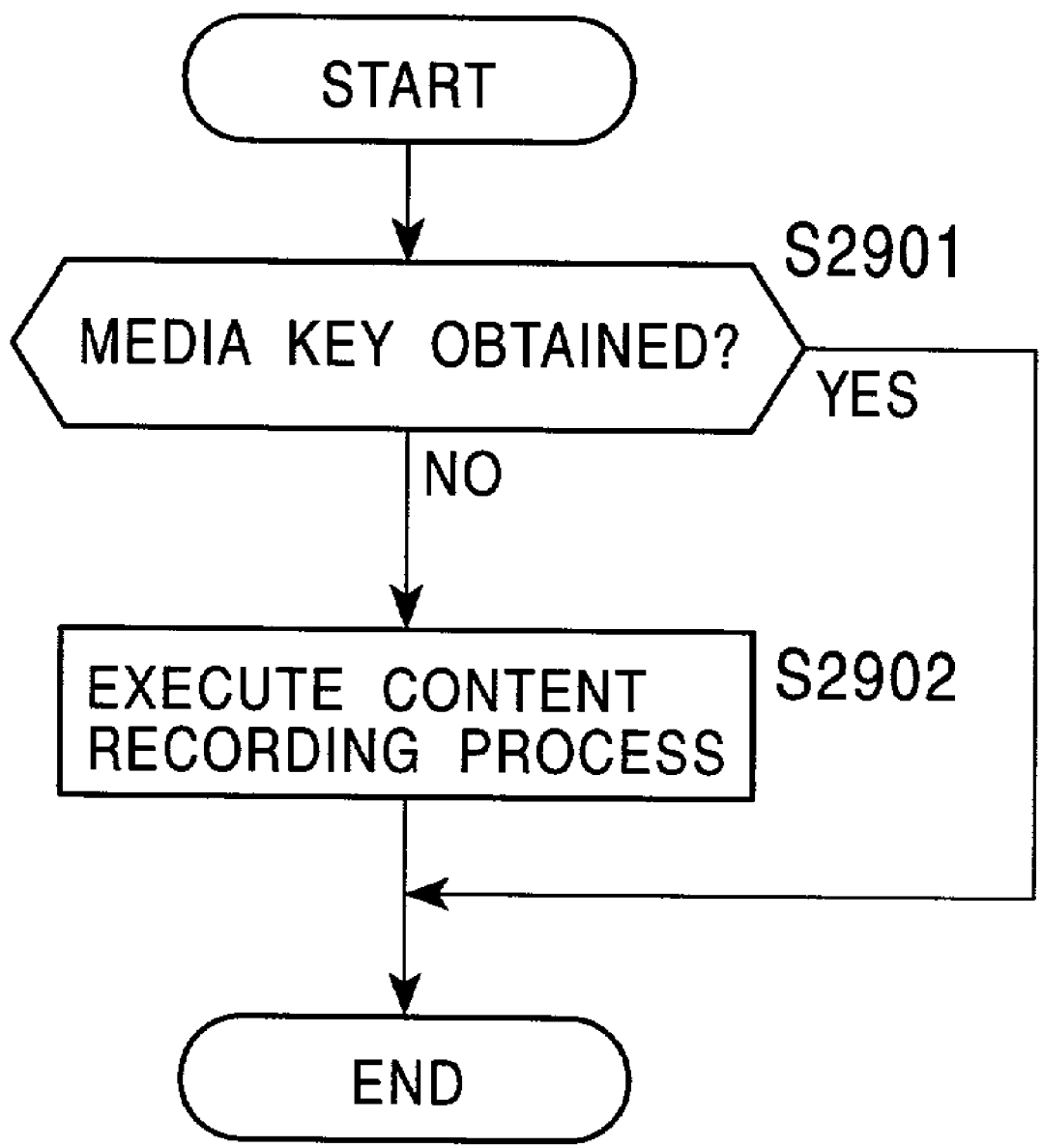
FIG. 37 is a flowchart illustrating a process of content recording using a media key in an information recording/playback device of the present invention.

Next, data recording on the recording medium is described. Concerning the media key, there is no concept of old and new generations, differently from the master key. Thus, determination in the first embodiment (FIG. 15) of whether or not recording can be performed by comparing the pre-recording generation information and the generation of the master key is not performed, and it is determined that recording is possible if the media key has been obtained in the above process. Specifically, this is shown in the flowchart shown in FIG. 37. In FIG. 37, in step S2901, the process determines whether the media key has already been obtained. If the media key has been obtained, a content recording process is executed in step S2902.

Data Recording Process Using Media Key Effective in Only Recording Medium

The content recording process is described below with the block diagrams shown in FIGS. 38 and 39 and with the flowchart shown in FIG. 40.

In the second embodiment, an optical disk is used as an example of a recording medium, similarly to the first embodiment. The first embodiment is also similar to the second embodiment in that in order that data on the recording medium may be prevented from being copied, a disk ID as identification information unique to the recording medium influences a data encrypting key.

Figure 38:
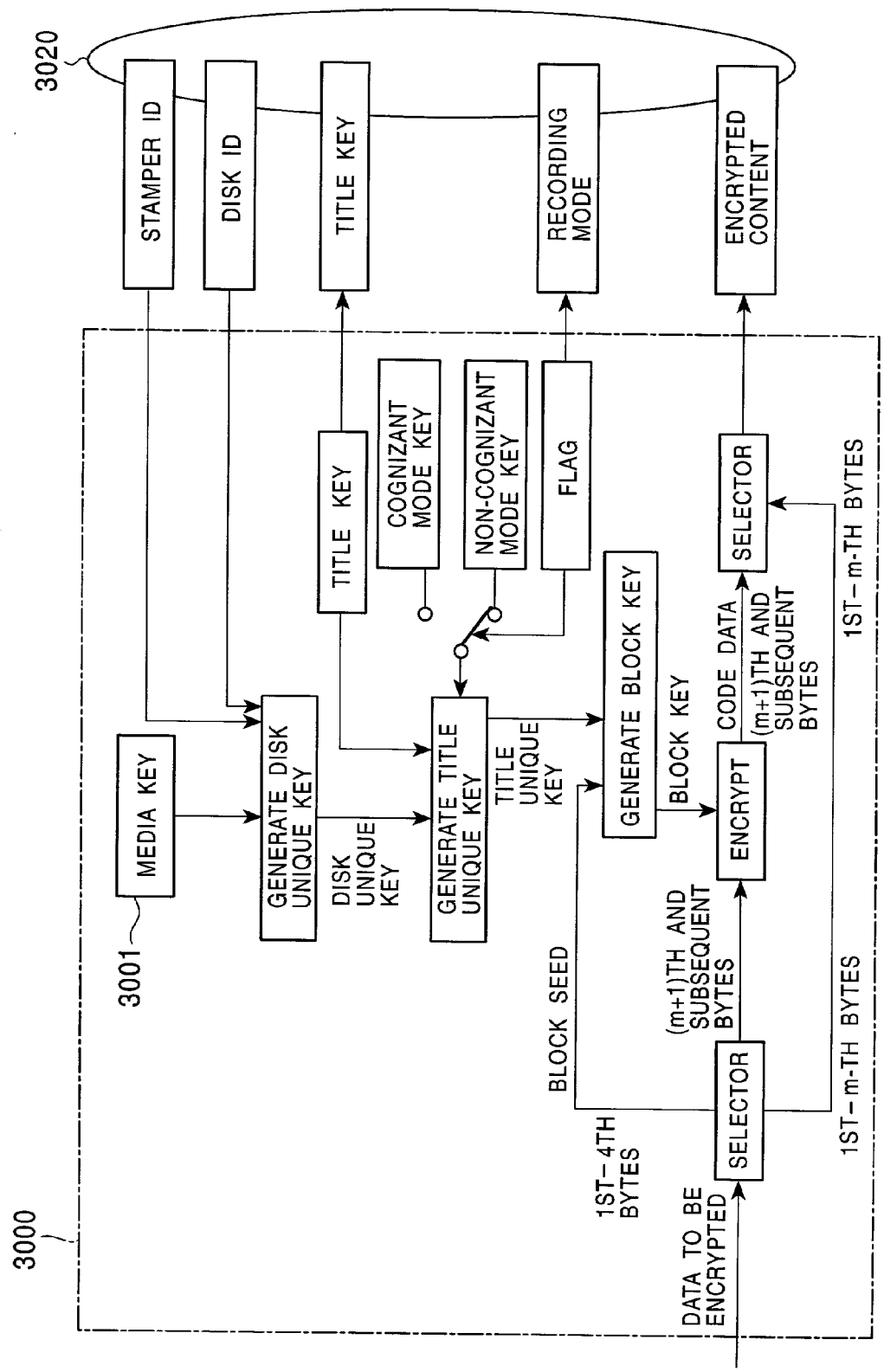
FIG. 38 is a block diagram showing media-key-used encryption in data recording.
Figure 39:
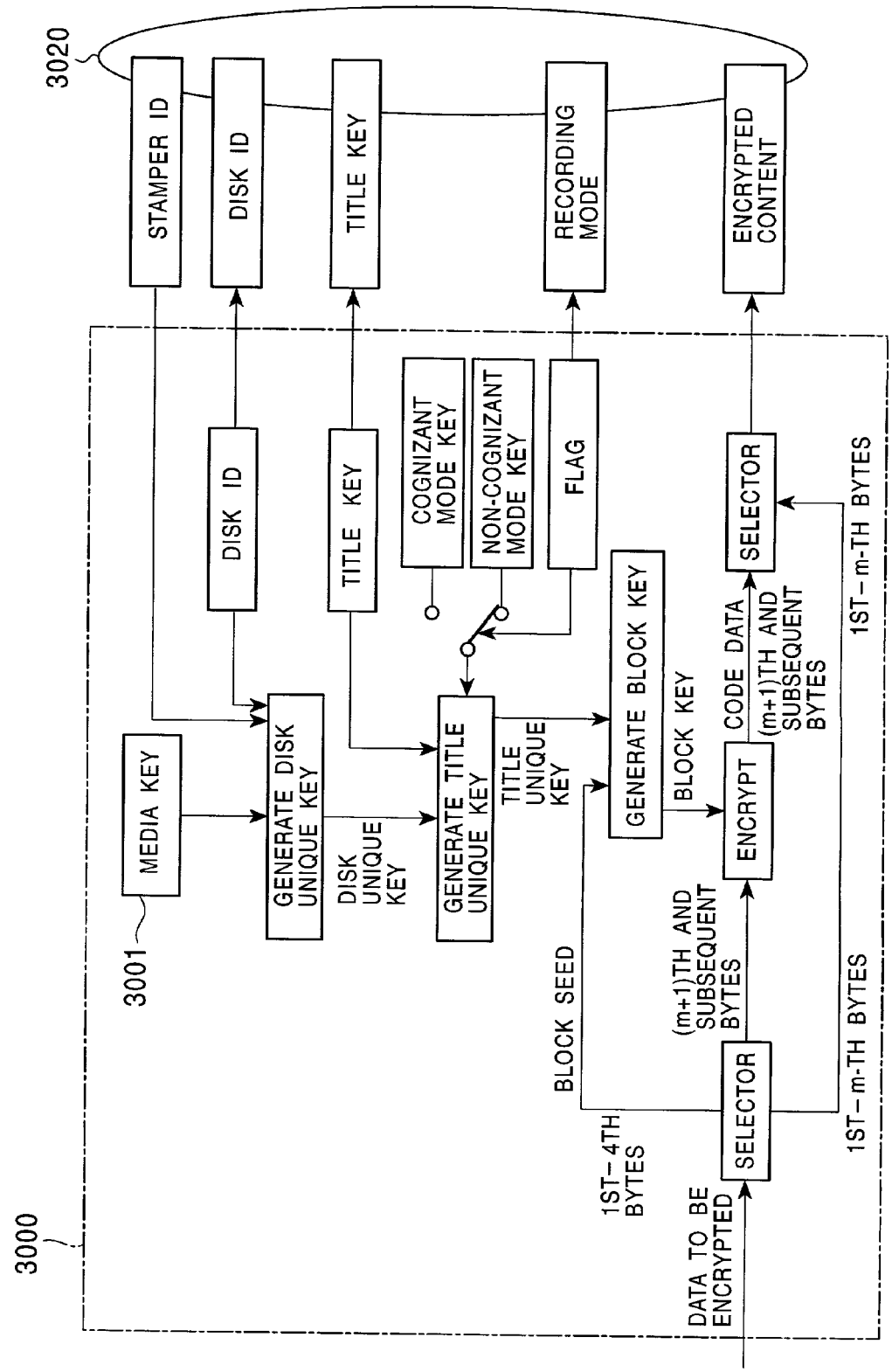
FIG. 39 is a block diagram showing media-key-used encryption in data recording.

FIGS. 38 and 39 correspond to FIGS. 16 and 17 in the first embodiment, and differ in that a media key is used instead of the master key and in that a recording-mode generation number that represents a master key generation is not used. FIG. 38 differs from FIG. 39 in that the writing of the disk ID is executed, similarly to the difference between FIG. 16 ad FIG. 17.

Figure 40:
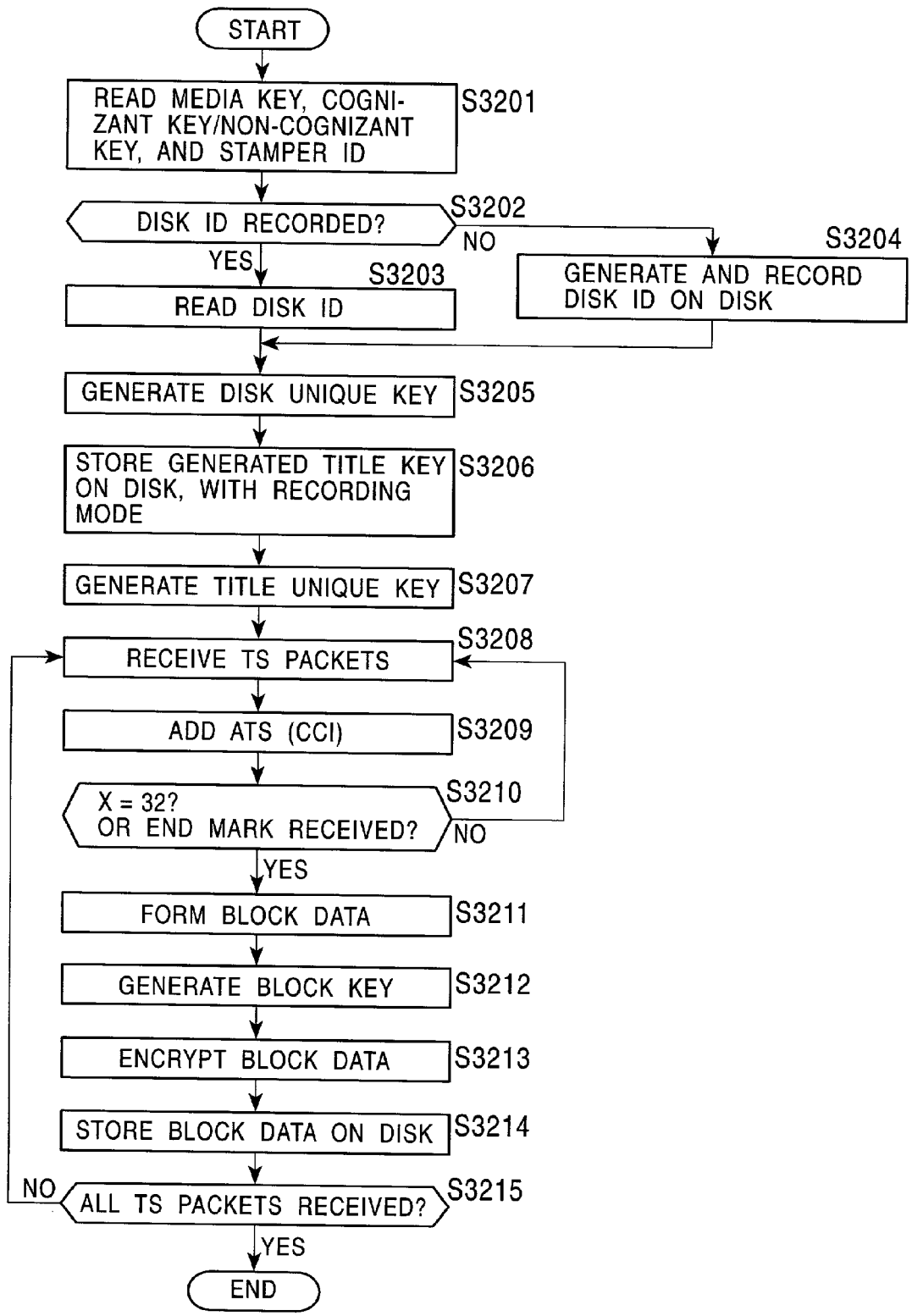
FIG. 40 is a flowchart illustrating a data recording process using a media key in an information recording/playback device of the present invention.

FIG. 40 shows the data recording process of the second embodiment which uses the media key. The flowchart in FIG. 40 corresponds to that in FIG. 18 (the first embodiment). The flowchart in FIG. 40 is described below, mainly concerning differences from the first embodiment.

In FIG. 40, in step S3201, a recording/playback device 3000 reads a cognizant key and/or a non-cognizant key which are stored in its memory, and the media key $K(t)_{media}$ temporarily stored after being calculated in step S2804 in FIG. 36. The recording/playback device 300 also reads a stamper ID from the disk.

In step S3203, the recording/playback device 3000 determines whether or not a disk ID has already been recorded as identification information on the recording medium (optical disk). If the disk ID has already been recorded, in step S3203, the recording/playback device 300 reads the disk ID (in the case of FIG. 38). If the disk ID has not already been recorded, in step S3204, a disk ID is generated by using a predetermined manner and is recorded on the disk (in the case of FIG. 39). The disk ID can be stored in a lead-in area or the like because the disk needs to have one disk ID. In either case, the recording/playback device 3000 goes to step S3205.

In step S3205, the media key and the stamper ID which are read in step S3201 are used to generate a disk unique key. A specific method of generating the disk unique key is identical to that used in the first embodiment, and the media key may be used instead of the master key.

In step S3206, a key that is unique to each time of recording, namely, a title key is generated randomly or by a predetermined method, and is recorded on the disk. Simultaneously, a recording mode activated when recording the title (data) is recorded on the disk.

The disk contains a data management file storing information that which data forms which title. The title key and the recording mode can be stored in the data management file.

Figure 18:
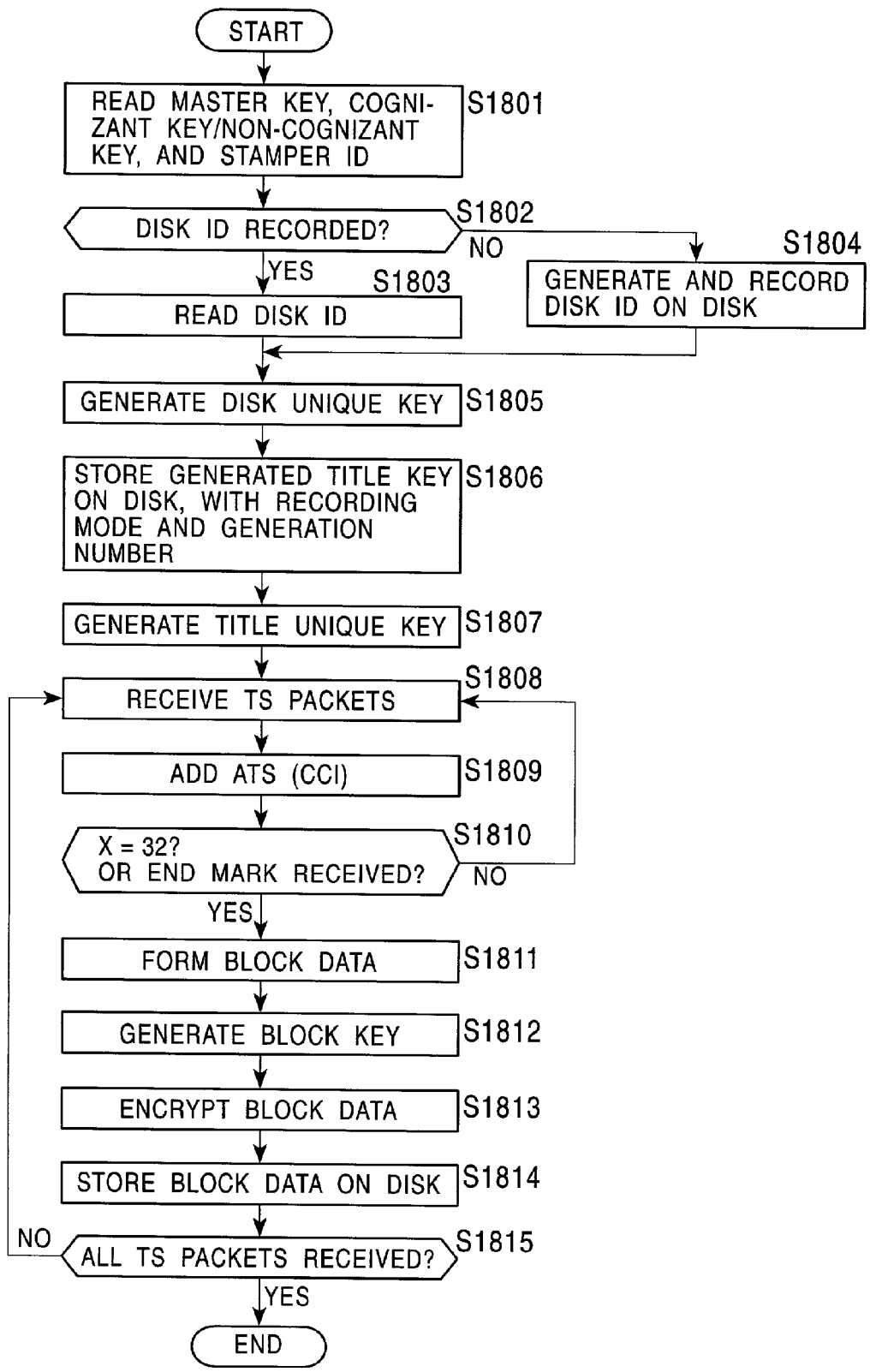
FIG. 18 is a flowchart illustrating a data recording process in an information recording/playback device of the present invention.

A description of steps S3207 to S3215 is omitted since they are similar to steps S1807 to S1815 in FIG. 18.

In the above description, a disk unique key is generated by using a media key, a stamper ID, and a disk ID, and a title unique key is generated by using the disk unique key, a title key, a cognizant key or a non-cognizant key. However, without using the disk unique key, by using the media key, the stamper ID, the disk ID, the title key, and the cognizant key or the non-cognizant key, the title unique key may be directly generated. Also, without using the title key, by using the stamper ID, the disk ID, and the cognizant key or the non-cognizant key, a key corresponding to the title unique key may be generated.

As described above, data can be recorded on the recording medium by using the media key.

Data Playback Process Using Media Key Effective in Only Recording Medium

A process for playing back the data recorded as described above is described below with reference to the block diagram shown in FIG. 41 and the flowchart shown in FIG. 42.

Figure 41:
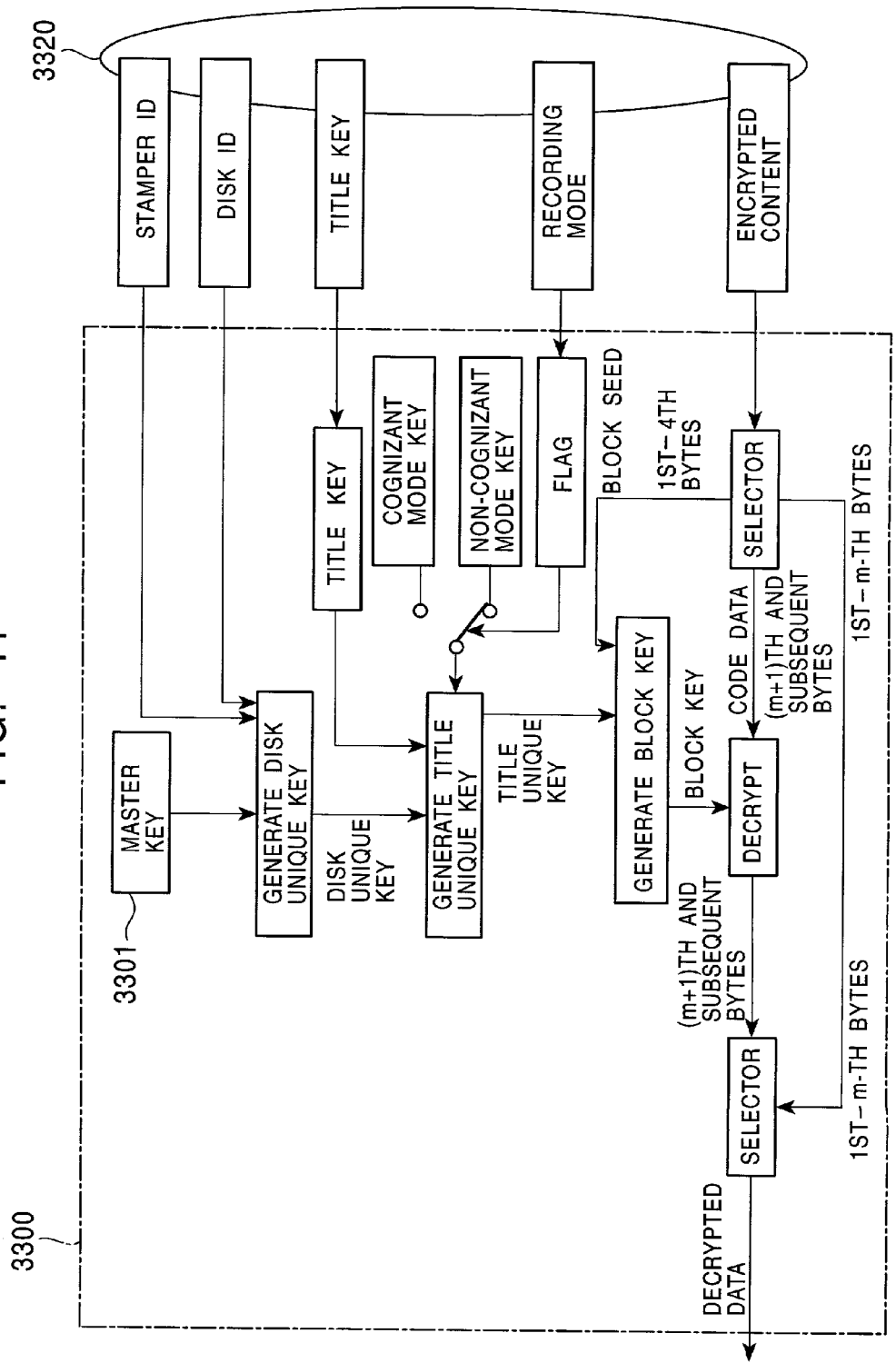
FIG. 41 is a block diagram showing media-key-used encryption in playback of data which is performed in an information recording/playback device of the present invention.

FIG. 41 corresponds to FIG. 31 in the first embodiment, and differs in that since a media key is used instead of the master key, a recording-mode generation number is omitted.

Figure 42:
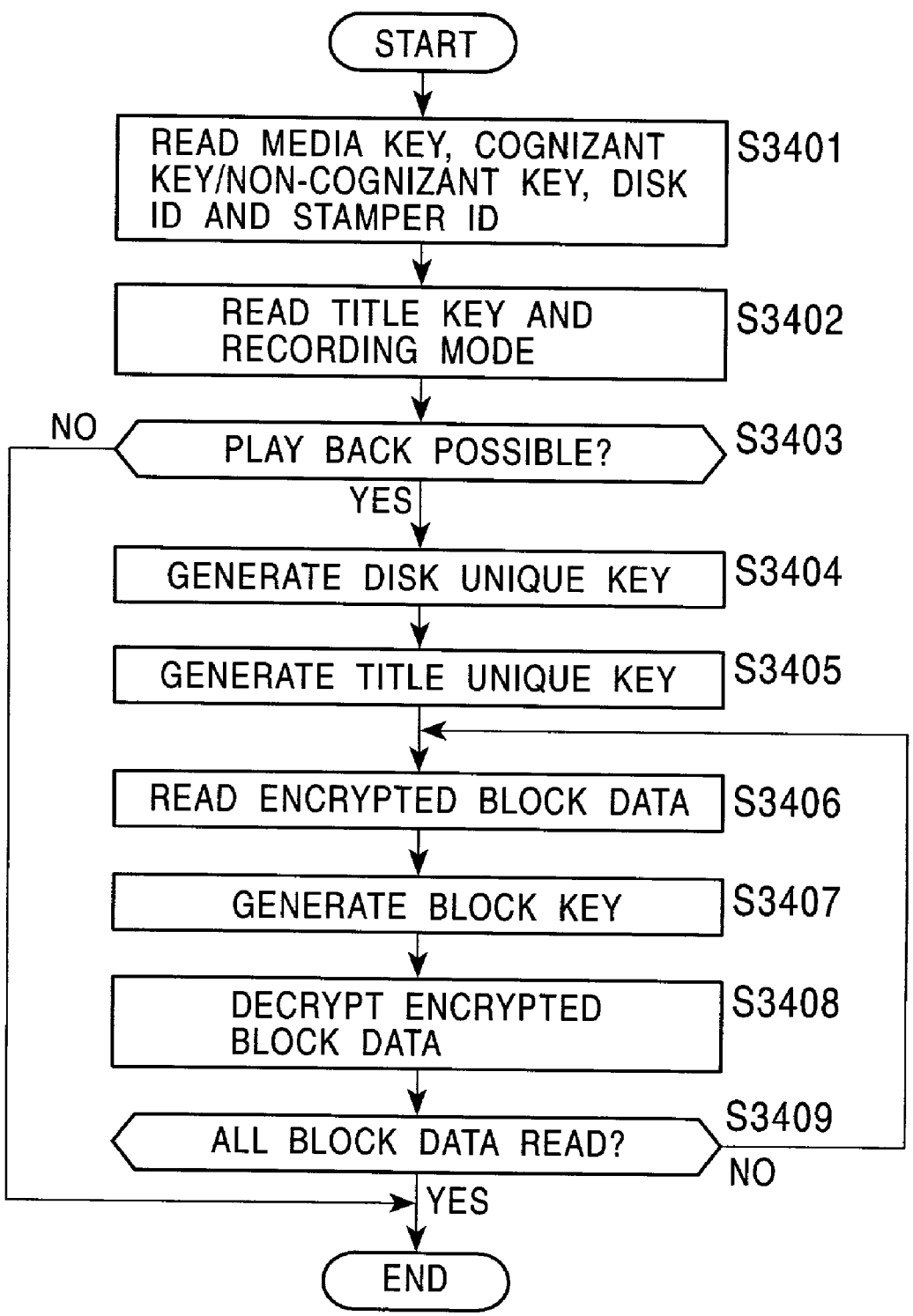
FIG. 42 is a flowchart illustrating media-key-used playback of data in an information recording/playback device of the present invention.

In FIG. 42, in step S3401, a recording/playback device 3400 reads a stamper ID and a disk ID from a disk 3420 as a recording medium, and also reads a cognizant key and/or a non-cognizant key and the media key temporarily stored after being calculated in step S2804 in step S36.

When the media key cannot be obtained by performing the process shown in FIG. 36 after loading the recording medium, the playback process is not performed and terminated.

In step S3402, the title key of data to be read from the disk 3320, and a recording mode stored when recording the data are read.

Figure 43:
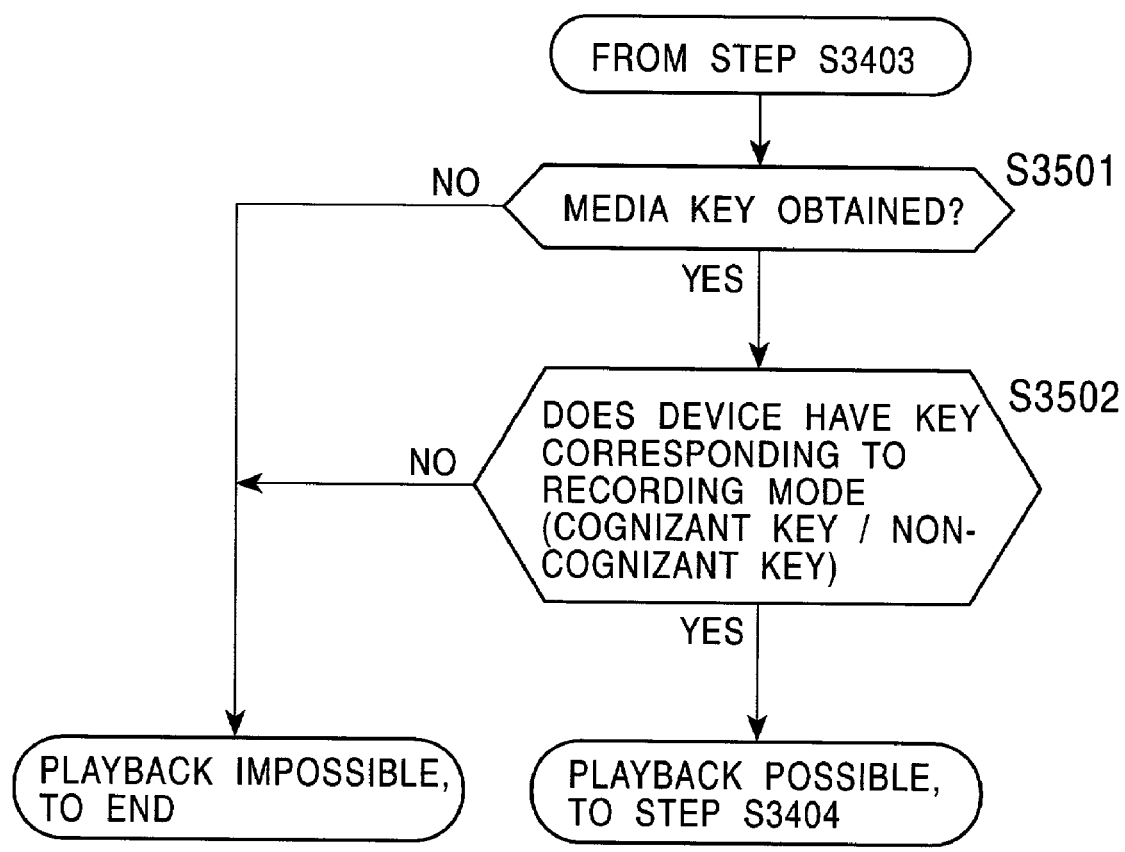
FIG. 43 is a flowchart illustrating a detailed process in media-key-used playback of data, which determines whether or not data can be played back in an information recording/playback device of the present invention.

In step S3403, the recording/playback device 3300 determines whether or not the data can be played back. The details of step S3403 are shown in FIG. 43.

In step S3501, the recording/playback device 3300 determines whether or not the media key is obtained. If the media key is not obtained, a playback is impossible. If the media key is obtained, the recording/playback device 3300 goes to step S3502. Step S3502 is similar to step S2503 in FIG. 33. When the recording/playback device 3300 possesses a key corresponding to a recording mode used when recording the data (a cognizant key for the cognizant mode or a non-cognizant key for the non-cognizant mode), the recording/playback device 3300 determines that a playback is possible, and goes to step S3404. When the recording/playback device 3300 possesses the key, it determines that a playback is impossible, and skips over steps S3404 to S3409 and terminates the process without performing the playback.

A description of steps S3404 to S3409 is omitted since they are similar to steps S2404 to S2409 in FIG. 32.

In the above description, by using a media key, a stamper ID, and a disk ID, a disk unique key is generated, and by using the disk unique key, a title key, a cognizant key or a non-cognizant key, a title unique key is generated. However, without using the disk unique key, by using the media key, the stamper ID, the disk ID, the title key, and the cognizant key or the non-cognizant key, the title unique key may be directly generated. Also, without using the title key, by using the media key, the stamper ID, the disk ID, and the cognizant key or the non-cognizant key, a key corresponding to the title unique key may be generated.

As described above, data recording on the recording medium and the playback from the recording medium are executed.

Copy Control in Recording Process

To protect advantages of a content copyrighter, content copying must be controlled in a licensed device.

Specifically, when a content is recorded on a recording medium, it is required that after determining whether the content may be copied, only a content allowed to be copied be recorded. When a content recorded on the recording medium is played back and output, it is required that unauthorized copying of the output content be prevented.

Accordingly, processing by the recording/playback device 100 or 200 in FIG. 1 or 2 in a case in which content recording and playback is performed while performing the content copy control is described below with reference to the flowcharts shown in FIGS. 44A to 45B.

Figure 44B:
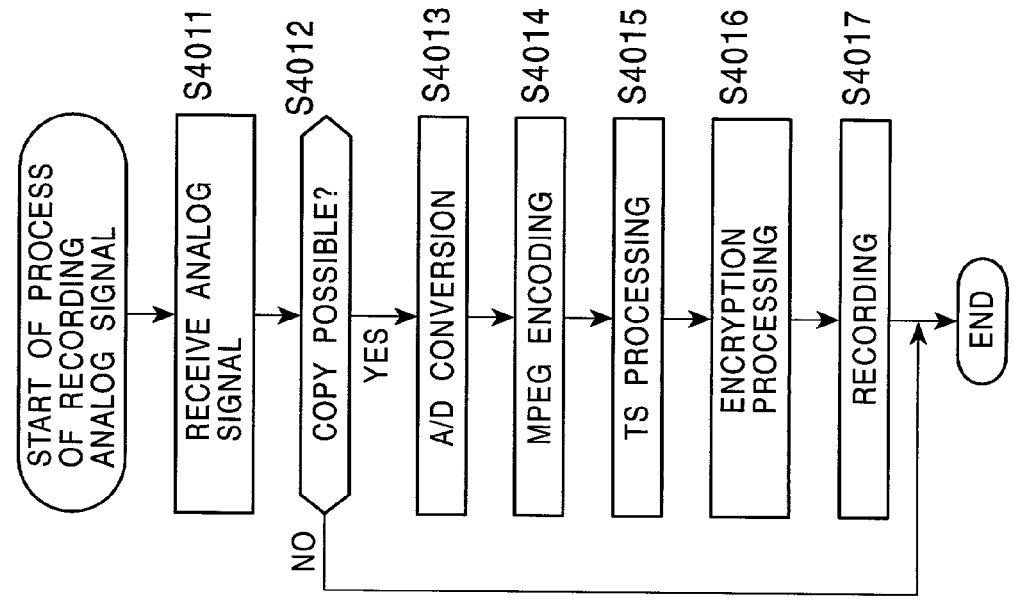
FIGS. 44A and 44B are flowcharts illustrating copy-control processes in the recording of data in an information recording/playback device of the present invention.
Figure 44A:
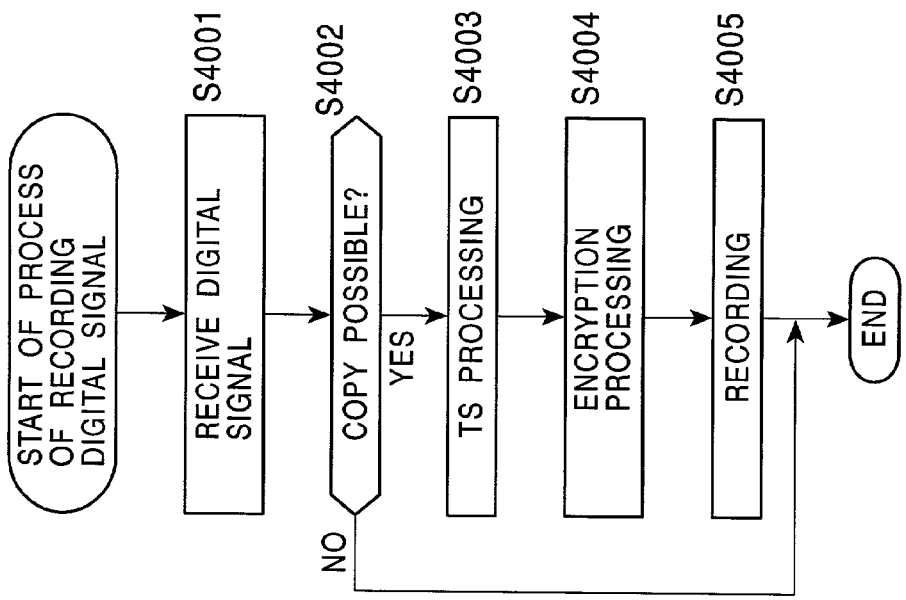

When a digital signal content from the exterior is recorded on the recording medium, the recording process shown in FIG. 44A is performed. This recording process is described using the recording/playback device 100 shown in FIG. 1 as an example. When a digital signal content (digital content) is supplied to the input/output I/F 120 via, for example, an IEEE 1394 serial bus, in step S4001, the input/output I/F 120 receives the digital content and goes to step S4002.

In step S4002, the input/output I/F 120 determines whether the received digital content may be copied. Specifically, when the content received by the input/output I/F 120 is not encrypted, for example, when a plaintext content is supplied to the input/output I/F 120 without using the above-described DTCP, the input/output I/F 120 determines that the received content may be copied.

It is assumed that the recording/playback device 100 is a device based on the DTCP which executes the process in accordance with the DTCP. The DTCP defines 2-bit Encryption Mode Indicator as copy control information for controlling copying. When the Encryption Mode Indicator is "00B" where B indicates that the adjacent value is a binary number, the content is of "Copy-freely" type. When the Encryption Mode Indicator is "01B", the content is of a "No-more-copies" type in which the content may not be more copied. When the Encryption Mode Indicator is "10B", the content is "Copy-one-generation" type in which the copying of the content can be performed once. When the Encryption Mode Indicator is "11B", the content is "Copy-never" type in which copying of the content is inhibited.

When the signal supplied to the input/output I/F 120 in the recording/playback device 100 includes an Encryption Mode Indicator, and the Encryption Mode Indicator is of a type among Copy-freely and Copy-one-generation types, the input/output I/F 120 determines that the content may be copied. When the Encryption Mode Indicator is of a type among No-more-copies and Copy-never types, the input/output I/F 120 determines that the content is not allowed to be copied.

In step S4002, if the input/output I/F 120 has determined that the content may not be copied, steps S4003 to S4005 are skipped over and the recording process is terminated. Accordingly, in this case, the content is not recorded on the recording medium 195.

In step S4002, if the input/output I/F 120 has determined that the content may be copied, the process goes to step S4003. After that, steps S4003, S4004, and S4005 are performed which are similar to steps S302, S303, and S304 shown in FIG. 3B. In other words, the addition by the TS processing unit 300 of the arrival time stamp to the transport packet, and encryption processing by the cryptosystem unit 150 are executed. The resultant encrypted content is recorded on the recording medium 195, and the recording process is terminated.

The Encryption Mode Indicator is included in the digital signal supplied to the input/output I/F 120, so that when the digital content is recorded, an Encryption Mode Indicator or information (e.g., embedded copy control information in the DTCP, etc.) which represents a copy-control status similarly to the Encryption Mode Indicator are also recorded, with the digital content.

In the recording, in general, information which represents Copy-One-Generation type is recorded after being converted into information which represents No-more-copies type so that more copies are not allowed.

In a recording/playback device of the present invention, copy control information, such as Encryption Mode Indicator and embedded copy control information, is recorded in a form in which it is added to the TS packet. In other words, 32 bits which include an arrival time stamp having 24 to 30 bits and copy control information, as shown in examples 2 and 3 of FIG. 10, are added to each transport stream (TS) packet, as shown in FIG. 5.

When an analog signal content from the exterior is recorded on the recording medium 195, the recording process shown in FIG. 44B is performed, which is described below.

When the analog signal content is supplied to the input/output I/F 140, the input/output I/F 140 receives the analog signal content in step S4011 and goes to step S4012. In step S4012, the analog signal content determines whether the received analog signal content may be copied.

The determination in step S4012 is performed by, for example, determining whether or not the signal received by the input/output I/F 140 includes a Macrovision signal or a CGMS-A (Copy Generation Management System-Analog) signal. The Macrovision signal is a signal that becomes noise after being recorded on a VHS videocassette tape. When this is included in the signal received by the input/output I/F 140, the input/output I/F 140 determines that the analog content is not allowed to be copied.

The CGMS-A signal is such that a CGMS signal for use in digital signal copy control is applied to analog signal copy control. The CGMS-A signal represents one of Copy-freely type in which the content is allowed to be freely copied, Copy-one-generation type in which the copying of the content can be performed only once, and Copy-never type in which copying of the content is inhibited.

Accordingly, when the CGMS-A signal is included in the signal received by the input/output I/F 140 and represents one of the Copy-freely type and the Copy-one-generation type, it is determined that the analog content may be copied. The CGMS-A signal represents the Copy-never type, it is determined that the analog content is not allowed to be copied.

In addition, for example, when the Macrovision signal and the CGMS-A signal are not included in the received by the input/output I/F 140, it is determined that the analog content may be copied.

In step S4012, if the input/output I/F 140 has determined that the analog content is not allowed to be copied, it skips over steps S4013 to S4017 and terminates the recording process. Accordingly, in this case, the content is not recorded on the recording medium 195.

In step S4012, if the input/output I/F 140 has determined that the analog content may be copied, it goes to step S4013. After that, steps S4013 to S4017 are performed which are similar to steps S322 to S326 shown in FIG. 3B, whereby after performing MPEG encoding, TS processing, and encryption processing, the content is recorded on the recording medium 195 and the recording ends.

When the analog signal received by the input/output I/F 140 includes the CGMS-A signal, and the analog content is recorded on the recording medium 195, the CGMS-A signal is also recorded. The CGMS-A signal is recorded in the copy control information or the other information shown in FIG. 10. In the recording, in general, information which represents Copy-One-Generation type is recorded after being converted into information which represents No-more-copies type so that more copies are not allowed. Although in the system, copy control information such as the Copy-one-generation type is recorded without being converted into the No-more-copies type, this does not apply to a case in which there is a rule that the copy control information is treated as the No-more-copies type.

Copy Control in Playback Process

Figure 45A:
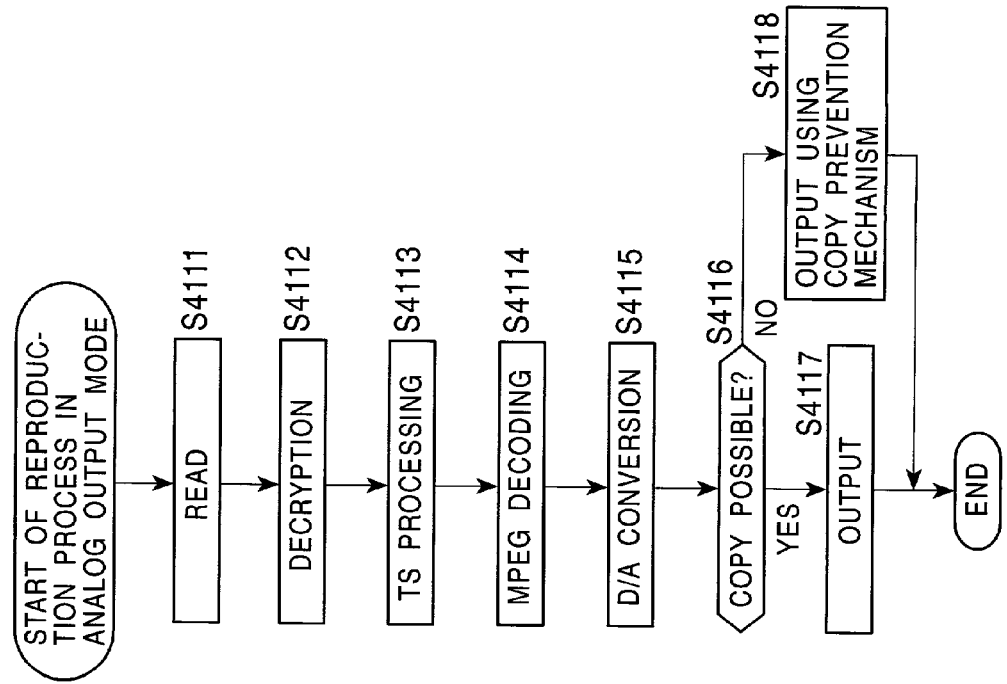
FIGS. 45A and 45B are flowcharts illustrating copy-control processes in the playback of data in an information recording/playback device of the present invention.

Next, in a case in which the content recorded on the recording medium 195 is played back and output as a digital content to the exterior, the playback process shown in FIG. 45A is performed, which is described below.

First, steps S4101, S4102, and S4103 are performed which are similar to steps S401, S402, and S403, whereby the encrypted content read from the recording medium 195 is decrypted in the cryptosystem unit 150 and is processed by transport stream processing. The processed digital content is supplied to the input/output I/F 120 via the bus 110.

In step S4104, the input/output I/F 120 determines whether or not the supplied digital content may not be copied later. In other words, when the digital content supplied to the input/output I/F 120 does not include an Encryption Mode Indicator or information (copy control information) representing a copy control status, it is determined that the content may not be copied later.

When the digital content supplied to the input/output I/F 120 includes copy control information such as Encryption Mode Indicator, accordingly, when copy control information such as Encryption Mode Indicator is recorded in accordance with the DTCP in content recording, the recorded copy control information (recorded Encryption Mode Indicator) is of Copy-freely type, it is determined that the content may not be copied later. When copy control information such as Encryption Mode Indicator is of No-more-copies type, it is determined that the content is not allowed to be later copied.

In general, there is no case in which the recorded copy control information (Encryption Mode Indicator) is of Copy-one-generation type or Copy-never type. This is because the Copy-one-generation type of Encryption Mode Indicator is converted to No-more-copies type of Encryption Mode Indicator when performing recording and because a digital content having Copy-never type of Encryption Mode Indicator is not recorded on a recording medium.

In step S4104, if the input/output I/F 120 has determined that the digital content may not be copied later, it goes to step S4105, and outputs the digital content to the exterior. After that, the playback process ends.

In step S4104, if the input/output I/F 120 has determined that the digital content may not be copied later, it goes to step S4106. In step S4106, the input/output I/F 120 outputs the digital content to the exterior in accordance with the DTCP so that the digital content cannot be later copied. After that, the playback process ends.

In other words, when the recorded copy control information (Encryption Mode Indicator) is of No-more-memories type, or in a case in which the system has a rule that Copy-one-generation type of copy control information is recorded without being converted into No-more-memories type of copy control information, and copy control information (Encryption Mode Indicator) recorded under the rule is of Copy-one-generation type, the content may not be more copied.

Accordingly, the input/output I/F 120 performs mutual authentication with another device in accordance with the DTCP standard. When the device is right (or is based on the DTCP standard), the digital content is encrypted and output to the exterior.

Figure 45B:
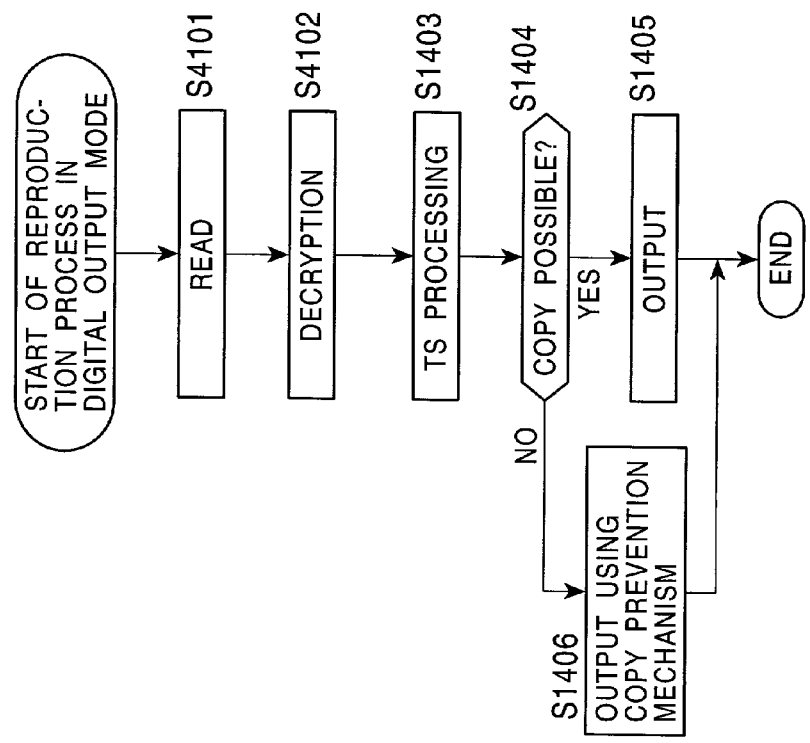

Next, in a case in which the content recorded on the recording medium is played back and output as an analog content to the exterior, the playback process shown in FIG. 45B is performed, which is described below.

Figure 4B:
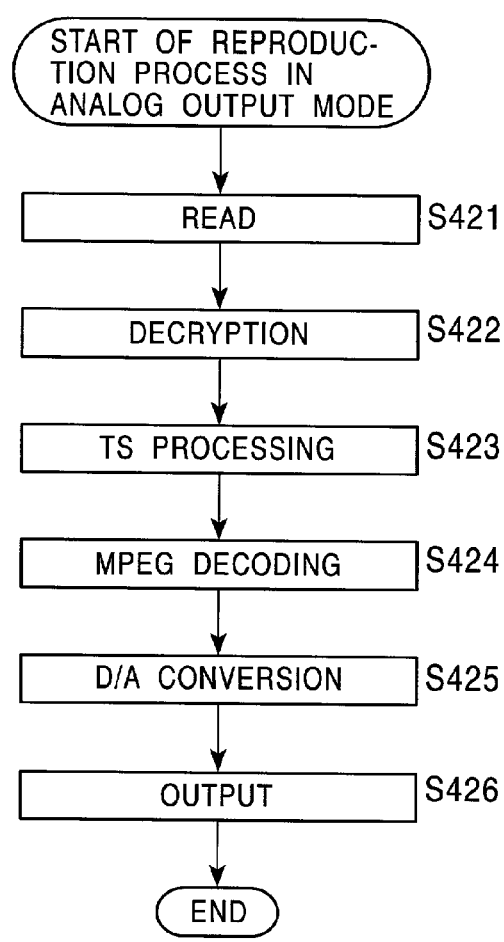

Steps S4111 to S4115 are performed which are similar to steps S421 to S425 shown in FIG. 4B. In other words, the reading of the encrypted content, transport stream processing, MPEG decoding, and D/A conversion are executed. The obtained analog content is received by the input/output I/F 140.

In step S4116, the input/output I/F 140 determines whether or not the supplied content may be copied. If copy control information such as Encryption Mode Indicator is not recorded with the content, the input/output I/F 140 determines that the content may be copied.

In a case in which when recording the content, copy control information such as Encryption Mode Indicator is recorded in accordance with the DTCP, and the copy control information is of Copy-freely type, the input/output I/F 140 determines that the content may not be copied later.

When the copy control information is of No-more-copies type, or when in the system there is, for example, a rule that Copy-one-generation type of copy control information is recorded without being converted and is treated as No-more-copies type of copy control information, and copy control information recorded under the condition is of Copy-one-generation type, the input/output I/F 140 determines that the content may not be copied later.

When the analog content supplied to the input/output I/F 140 includes, for example, a CGMS-A signal, in other words, in a case in which when recording the content, the CGMS-A signal is recorded with the content, and the CGMS-A signal represents Copy-freely type, it is determined that the analog content may not be copied later. If the CGMS-A signal represents Copy-never type, it is determined that the analog content may not be copied later.

In step S4116, if the input/output I/F 140 has determined that the analog content may not be copied later, it goes to step S4117. In step S4117, the input/output I/F 140 outputs the supplied analog signal to the exterior and terminates the playback process.

In step S4116, if the input/output I/F 140 has determined that the content may not be copied later, it goes to step S4118. In step S4118, the input/output I/F 140 outputs the analog content to the exterior in a form in which the analog content cannot be later copied, and the playback process ends.

For example, when the recorded copy control information is of No-more-copies type, as described above, or in a case in which in the system there is a rule that Copy-one-generation type of copy control information is recorded without being converted and is treated as No-more-copies type, and copy control information recorded under the condition is Copy-one-generation type, the content may not be more copied.

Therefore, after adding, for example, a Macrovision signal or a CGMS-A signal representing Copy-never type to the analog content, the input/output I/F 140 outputs the obtained content to the exterior. Also when the recorded CGMS-A signal represents Copy-never type, the content may not be more copied. Accordingly, after changing the CGMS-A signal to represent Copy-never type, the input/output I/F 140 outputs the changed CGMS-A signal to the exterior, with the analog content.

As described above, by recording or playing back a content while performing content-copy control, copying (unauthorized copying) beyond the allowable range of the content can be prevented.

Structure of Data Processing Unit

Figure 46:
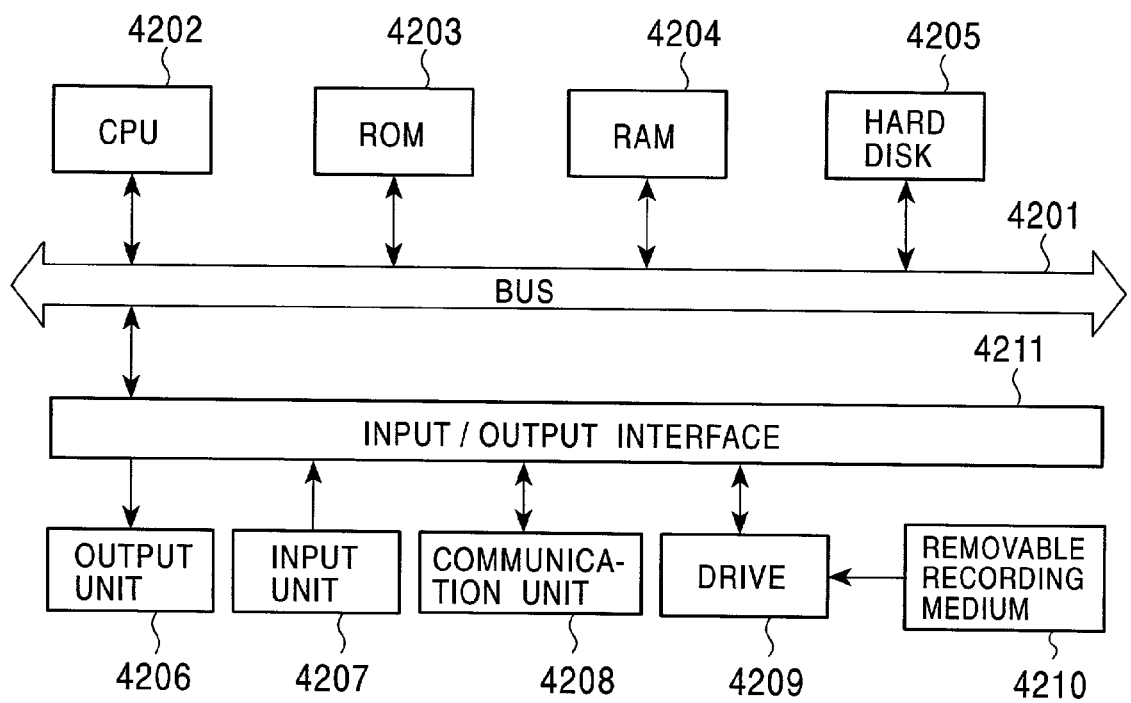
FIG. 46 is a block diagram showing a processing structure used when data processing is executed by software in an information recording/playback device of the present invention.

The above successive processes can be performed not only by hardware but also by software. For example, although the cryptosystem unit 150 can be formed by an encryption/decryption LSI, processing by the cryptosystem unit 150 can be executed such that a general-purpose computer or a single-chip microcomputer executes programs. Similarly, processing by the TS processing unit 300 can be also performed by software. When software is used to perform successive processes, programs constituting the software are installed in a device such as a general-purpose computer or a single-chip microcomputer. FIG. 46 shows an example of a computer in which programs for executing the successive processes are installed.

The programs can be recorded beforehand on a hard disk 4205 or a read-only memory (ROM) 4203 as a recording medium which is built into the computer. Alternatively, the programs can be temporarily or eternally stored (recorded) in a removable recording medium 4210 such as a floppy disk, a CD-ROM, a magneto-optical disk, a digital versatile disk, a magnetic disk, or a semiconductor memory. The removable recording medium 4210 can be provided in the form of so-called "package software".

In addition to the installation of the programs from the removal recording medium 4210 in the computer, after transmitting the programs from a download site to the computer by radio via a satellite for digital satellite broadcasting or by wire via a network such as the Internet, the transmitted programs are received in a communication unit 4208 and can be installed in the hard disk 4205 in the computer.

The computer includes a CPU 4202. An input/output interface 4211 is connected to the CPU 4202 via a bus 4201. When a command is input by a user operating an input unit 4207 having a keyboard and a mouse, the CPU 4202 executes a program stored in a ROM 4203 in accordance with the input command.

Also, the program stored in the hard disk 4205, the program installed in the hard disk 4205 after being transmitted via a satellite or a network and received by the communication unit 4208, or the program installed in the hard disk 4205 after being read from the removal recording medium 4210 is loaded and executed in the CPU 4202.

This allows the CPU 4202 to perform the above processes in accordance with the above flowcharts or the processes performed by the block diagrams. The CPU 4202 outputs the obtained results from an output unit 4206 having a liquid crystal display, a speaker, etc., transmits them from the communication unit 4208, and records them on the hard disk 4205, as required.

Here, in this Specification, processing steps that describe each program for controlling the computer to perform various types of processing do not always need to be time-sequentially performed along the order in flowchart form, and include processes (e.g., parallel processes or object-based processes) which are executed in parallel or separately.

Each program may be executed either by a single computer or by a plurality of computers. Each program may be executed after being transferred to a remote computer.

In the second embodiment a case in which a content encryption/decryption block is formed by a single-chip encryption/decryption LSI has been mainly described. However, the content encryption/decryption block can be implemented as a software module executed by the CPU 170 in FIG. 1 or 2. Similarly, also processing by the TS processing unit 300 can be implemented as a software module executed by the CPU 170.

Apparatus and Method for Producing Recording Medium

Next, an apparatus and method according to the present invention that produce the above information recording medium are described below.

Figure 47:
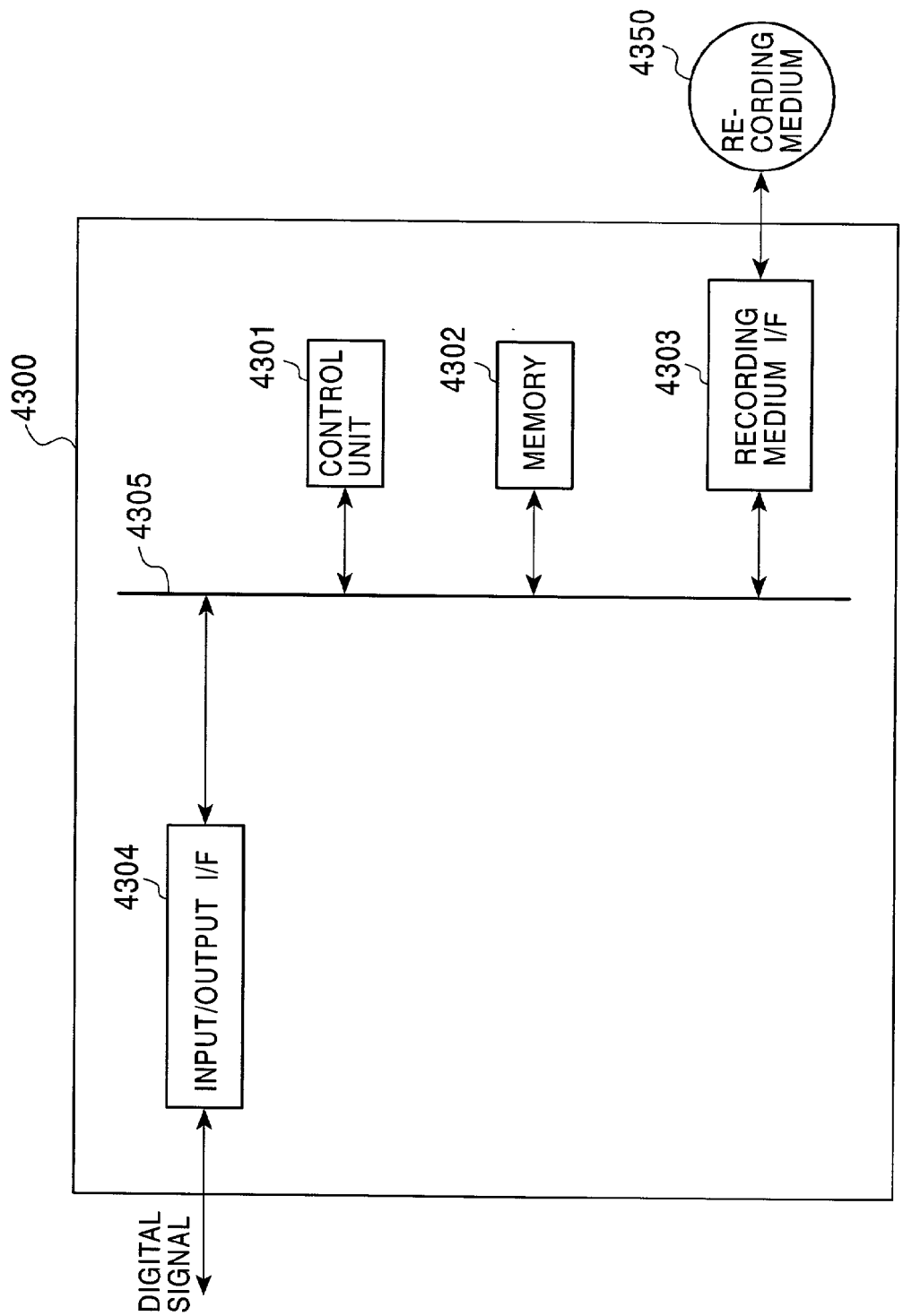
FIG. 47 is a block diagram showing a producing apparatus that produces an information recording medium for use in an information recording/playback device of the present invention.

FIG. 47 shows a schematic structure of a disk production apparatus 4300 which produces a recording medium 4350 and records a disk ID, an enabling key block, and an encrypted master key or an encrypted media key on a recording medium.

In the disk production apparatus 4300, a disk ID, an enabling key block, and an encrypted master key or an encrypted media key are recorded on a recording medium 4350 which has already been assembled, with the above-described secret information. Also, pre-recording generation information of the master key is recorded, as required.

The disk production apparatus 4300 includes a memory 4302, or another storage unit, which contains disk IDs, enabling key blocks, and encrypted master keys or encrypted media keys, a recording medium I/F 4303 that performs reading/writing from/to the recording medium 4350, an input/output I/F 4304 as an interface with another apparatus, a control unit 4301 for controlling the above units, and a bus 4305 for establishing connection.

Although FIG. 47 shows the structure in which the memory 4302 and the recording medium I/F 4304 are included in the disk production apparatus 4300, they may be externally provided.

The disk ID, the enabling key block, and the encrypted master key or the encrypted media key, the secret information such as stamper ID, and the pre-recording generation information of master key are issued by an identifier management department, a key issuing center, etc., which are not shown, and are stored beforehand in the internal or external memory 4302.

The disk ID, the enabling key block, and the encrypted master key or the encrypted media key, the secret information, the pre-recording generation information of master key, which are stored in the memory 4302, are recorded on the recording medium 4350 via the recording medium I/F 4303 under control of the control unit 4301. The pre-recording generation information of master key is also recorded, as required.

The secret information is data generated by a secret information generator having the construction described in the Writing and Playback of Secret Information section, which are shown in, for example, FIGS. 25 and 27. In accordance with the controller, data conversion of the secret information is performed, and the resultant converted data is written on the recording medium 4350.

Concerning the disk ID, the enabling key block, and the encrypted master key or the encrypted media key, the secret information such as stamper ID, and the pre-recording generation information of master key, not only those stored in the memory 4302, but also those sent from the key issuing center via the input/output I/F 4304 can be used.

Figure 48:
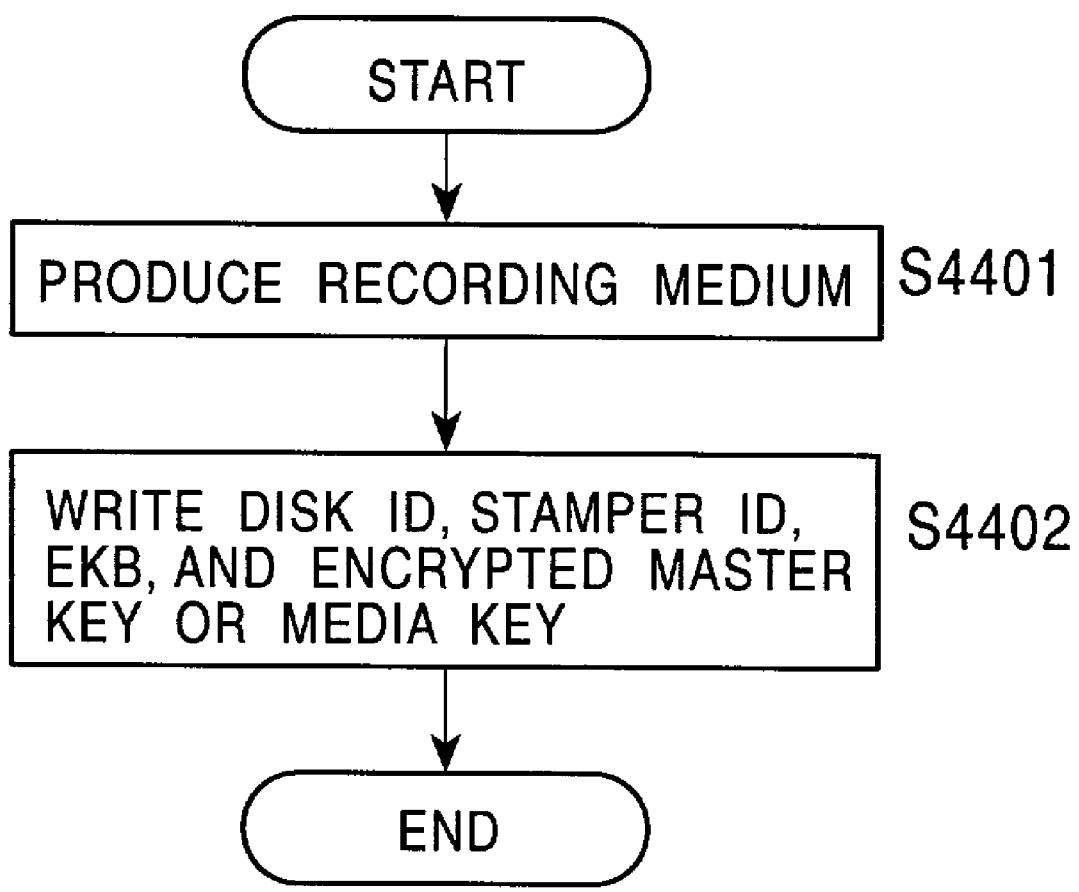
FIG. 48 is a flowchart illustrating a production process that produces an information recording medium for use in an information recording/playback device of the present invention.

FIG. 48 shows a production flow in a recording medium production method according to the present invention in which in the production of a recording medium, the disk ID, the enabling key block, and the encrypted master key or the encrypted media key, the secret information, and the pre-recording generation information of master key are recorded on a recording medium.

Referring to FIG. 48, in step S4401, a known assembly process (not shown) is used to assemble a recording medium such as a DVD or a Cited document.

In step S4402, the recording medium production apparatus shown in FIG. 47 executes processing of recording, on the assembled recording medium, a disk ID, a stamper ID as secret information, an enabling key block, and an encrypted master key or an encrypted media key. Pre-recording generation information is also recorded, as required.

By using the above disk production process, the recording medium is shipped from a production factory in the form of containing the disk ID, the stamper ID as secret information, the enabling key block, the encrypted master key or the encrypted media key. Also, the recording medium is shipped from the production factory after the pre-recording generation number is recorded on the recording medium, as required.

The recorded secret information is not limited to the stamper ID. A disk ID set for each disk, a content ID for each content, a cryptographic key, various types of identification data, and an encryption key may be recorded as the secret information. A recording/playback device of the present invention uses the various types of secret information to generate a content-encryption key.

Format of Enabling Key Block

Figure 49:
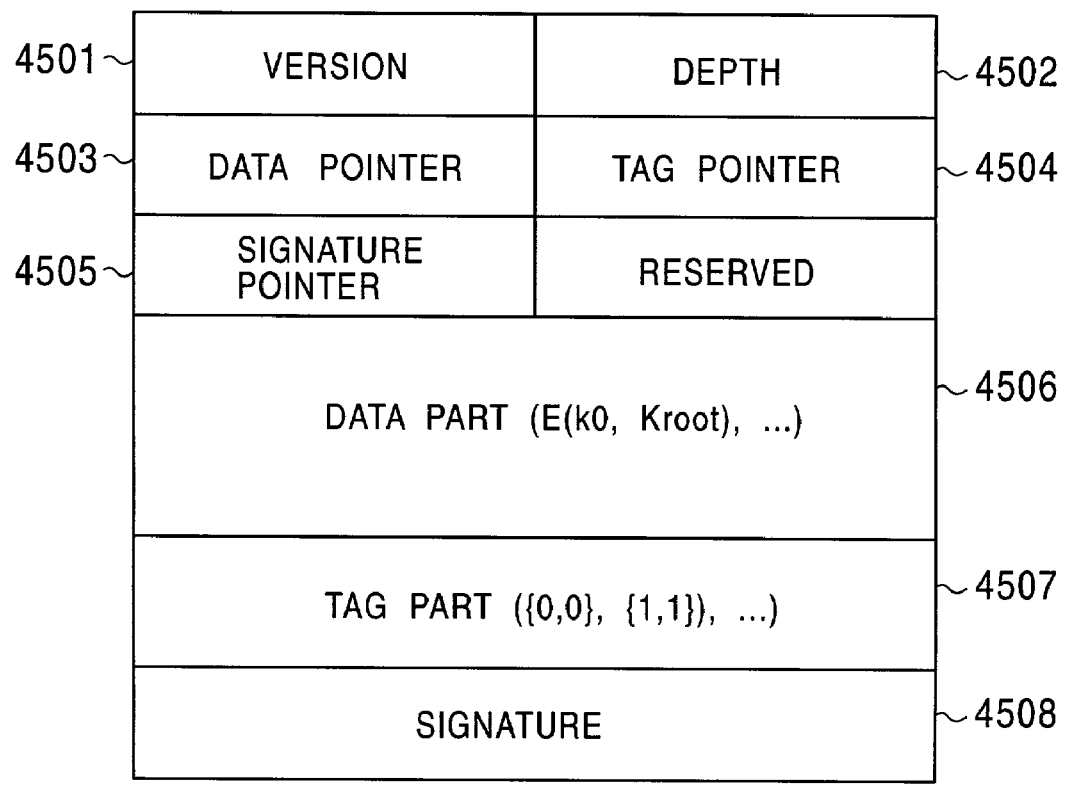
FIG. 49 is an illustration of a format of an enabling key block used in an information recording/playback device of the present invention.

FIG. 49 shows an example of a format of the enabling key block. In FIG. 49, a version 4501 is an identifier indicating the version of an enabling key block. A depth 4502 indicates a hierarchical-tree level number of a device to which the enabling key block is distributed. A data pointer 4503 indicates the position of a data part in the enabling key block. A tag pointer 4504 indicates the position of a tag part in the enabling key block. A signature 4508 indicates the position of a signature in the enabling key block. A data part 4506 stores, for example, data generated by encrypting a node key to be updated.

Figure 50:
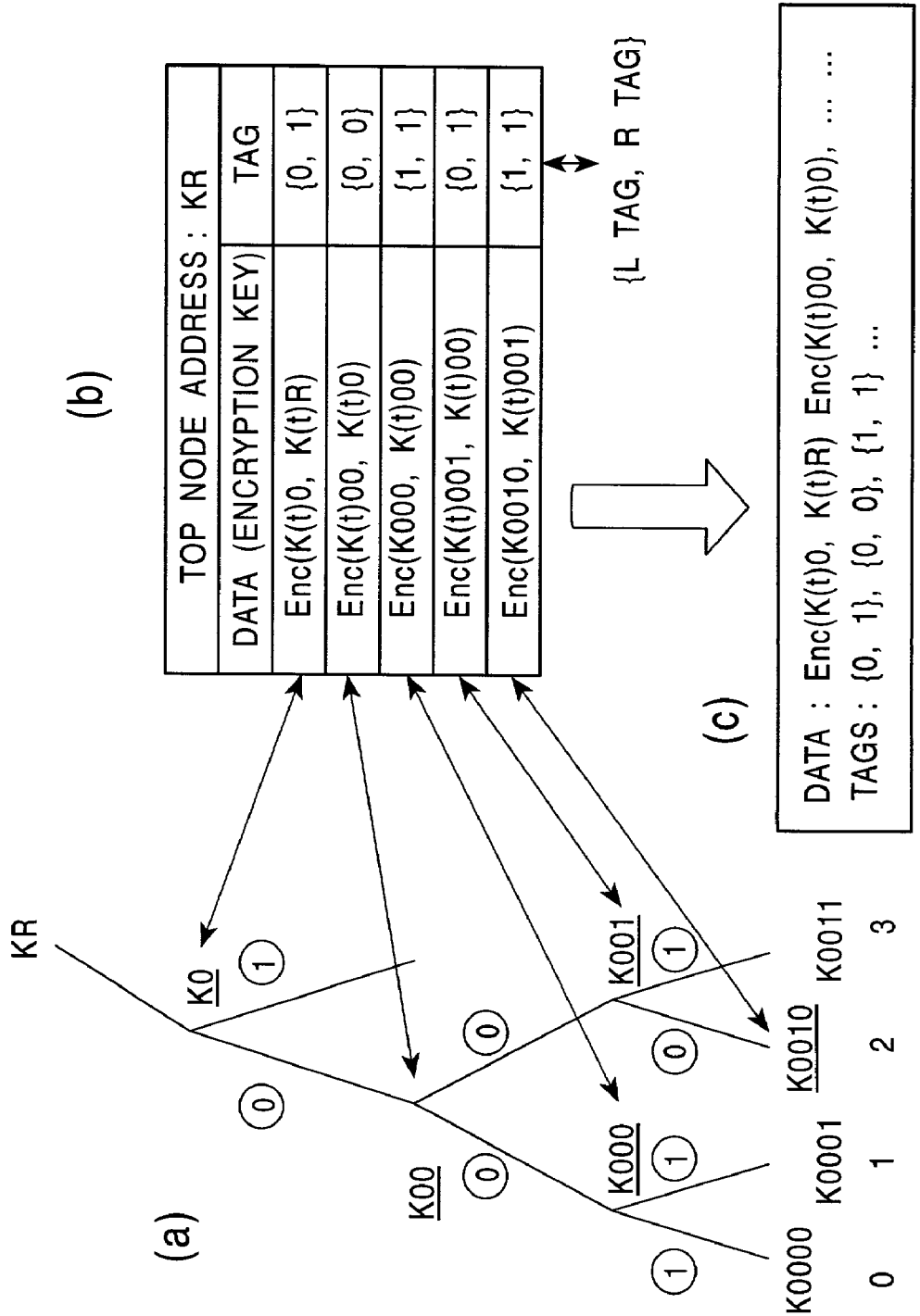
FIG. 50 is an illustration of the structure of a tag in an enabling key block used in an information recording/playback device of the present invention.

The tag part 4507 indicates the positional relationship of the encrypted node keys and leaf key which are stored in the data part 4506. A rule of providing the tag is described with reference to FIG. 50. FIG. 50 shows an example of sending, as data, the enabling key block described using FIG. 12A. The data is as shown in the table of the right portion (b) of FIG. 50. The address of a top node included in an encryption key in this case is used as a top node address. As shown in the table, the top node address is KR because updating key K(t)R of root key is included.

Top encryption-key data Enc(K(t)0, K(t)R) corresponds to a denoted position in the hierarchical tree of the left portion (a) of FIG. 50. Next data is represented by Enc(K(t)0, K(t)0) and corresponds to a lower left position from the previous data. The presence of data is indicated by a tag value of "0", while the absence of data is indicated by a tag value of "1". Each tag is set as {left (L) tag, right (R) tag}. Since the left of top encryption-key data Enc(K(t)0, K(t)R) has data, L tag=0. Since the right of top encryption-key data Enc(K(t)0, K(t)R) has no data, R tag=1. Tags are set for all of data, so that a data string and a tag string are formed, as shown in the bottom portion (c) of FIG. 50.

Concerning the order of node processing in the tree, it is preferable to use one of breadth first processing in which widthwise processing at the same level is first performed, and depth first processing in which depth-wise processing is first performed.

Referring back to FIG. 49, the format of the enabling key block is further described below.

The signature is a digital signature performed by an authority that issues the enabling key block, such as key-management center, content provider, settlement authority. A device that receives the enabling key block uses signature verification to verify that the received enabling key block is issued by a right enabling key block issuer.

With reference to specified embodiments, the present invention has been described. However, it is obvious that a person skilled in the art will make a modification or substitution of the embodiments without departing the spirit of the present invention. For example, as described above, the foregoing embodiments describe a case in which a stamper ID is used as the secret information required for writing of data to be stored on a disk and playback processing. However, the secret information is not limited to the stamper ID, but may be a disk ID differently set for each disk, a content ID set for each content, a cryptosystem key, various identification data, and an encryption key. In the foregoing embodiments, the present invention has been exemplified and should not be limitedly interpreted. To determine the spirit of the present invention, the appended claims should be considered.

What is claimed is:

1. An information recording device for recording information on a recording medium, said information recording device comprising:

an input/output interface; and means for selectively executing information recording using a cognizant mode which analyzes embedded copy control information in a data part of a packet having a header part and the data part, and information recording using a non-cognizant mode which does not analyze the embedded copy control information, wherein:

when the information recording using the cognizant mode is selected, said means executes the generation of record information in which a block seed including copy control information based on the embedded copy control information is added to block data formed by at least one packet and is encrypted by a first encryption key, the first encryption key being generated using a cognizant key; and when the information recording using the non-cognizant mode is selected, said means executes the generation of record information in which a block seed including copy control information based on an encryption-mode indicator as copy control information included in the packet is added to said block data and is encrypted by a second encryption key, the second encryption key being generated using a non-cognizant key.

2. An information recording device according to claim 1, further comprising:

cryptosystem means for executing encryption processing on data to be stored on said recording medium; and transport-stream processing means for adding an arrival time stamp to each of transport packets constituting a transport stream;

wherein said cryptosystem means generates a block key as an encryption key for block data formed by at least one transport packet to which said arrival time stamp is added, and executes encryption processing on the block data by using said block key.

3. An information recording method for recording information on a recording medium, comprising the steps of:

selectively executing information recording using a cognizant mode which analyzes embedded copy control information in a data part of a packet having a header part and the data part, and information recording using a non-cognizant mode which does not analyze the embedded copy control information;

executing, when the information recording using the cognizant mode is selected, the generation of record information in which a block seed including copy control information based on the embedded copy control information is added to block data formed by at least one packet and is encrypted by a first encryption key, the first encryption key being generated using a cognizant key; and executing, when the information recording using the non-cognizant mode is selected, the generation of record information in which a block seed including copy control information based on an encryption-mode indicator as copy control information included in the packet is added to said block data and is encrypted by a second encryption key, the second encryption key being generated using a non-cognizant key.

4. An information recording method according to claim 3, further comprising:

a transport-stream processing step which adds an arrival time stamp to each of transport packets constituting a transport stream; and an encryption step which generates a block key as an encryption key for block data formed by at least one transport packet to which said arrival time stamp is added, and executes encryption processing on the block data by using said block key.

5. A program providing medium for providing a computer program which controls a computer system to execute information recording processing for recording information on a recording medium, said computer program comprising the steps of:
- selectively executing information recording using a cognizant mode which analyzes embedded copy control information in a data part of a packet having a header part and the data part, and information recording using a non-cognizant mode which does not analyze the embedded copy control information;
- executing, when the information recording using the cognizant mode is selected, the generation of record information in which a block seed including copy control information based on the embedded copy control information is added to block data formed by at least one packet and is encrypted by a first encryption key, the first encryption key being generated using a cognizant key; and
- executing, when the information recording using the non-cognizant mode is selected, the generation of record information in which a block seed including copy control information based on an encryption-mode indicator as copy control information included in the packet is added to said block data and is encrypted by a second encryption key, the second encryption key being generated using a non-cognizant key.

* * * * *